(12) United States Patent
Do

(10) Patent No.: US 7,330,318 B2
(45) Date of Patent: Feb. 12, 2008

(54) IMAGING LENS

(75) Inventor: Satoshi Do, 1-2-56 Miyado, Asaka-shi, Saitama 351-0031 (JP)

(73) Assignees: Milestone Co., Ltd., Tokyo (JP); Satoshi Do, Saitama (JP)

( * ) Notice: Subject to any disclaimer, the term of this patent is extended or adjusted under 35 U.S.C. 154(b) by 0 days.

(21) Appl. No.: 11/596,021

(22) PCT Filed: May 31, 2005

(86) PCT No.: PCT/JP2005/009921

§ 371 (c)(1),
(2), (4) Date: Nov. 9, 2006

(87) PCT Pub. No.: WO2006/077663

PCT Pub. Date: Jul. 27, 2006

(65) Prior Publication Data

US 2007/0223111 A1    Sep. 27, 2007

(30) Foreign Application Priority Data

Jan. 21, 2005    (JP) .............................. 2005-014122

(51) Int. Cl.
*G02B 9/14* (2006.01)
*G02B 9/12* (2006.01)
*G02B 3/02* (2006.01)

(52) U.S. Cl. ........................ 359/785; 359/784; 359/716

(58) Field of Classification Search ................ 359/716, 359/738, 784, 785
See application file for complete search history.

(56) References Cited

U.S. PATENT DOCUMENTS

| 5,940,219 | A | 8/1999 | Yamada |
| 6,028,713 | A | 2/2000 | Ohno |
| 6,466,377 | B1 | 10/2002 | Saito et al. |
| 6,724,547 | B2 | 4/2004 | Sato |
| 6,795,253 | B2 | 9/2004 | Shinohara |
| 6,980,372 | B1 * | 12/2005 | Do .............................. 359/716 |
| 6,985,307 | B2 * | 1/2006 | Do .............................. 359/716 |
| 6,989,947 | B2 * | 1/2006 | Do .............................. 359/791 |

(Continued)

FOREIGN PATENT DOCUMENTS

JP    2002-221659    8/2002

(Continued)

*Primary Examiner*—David N. Spector
(74) *Attorney, Agent, or Firm*—Venable, LLP; James R. Burdett

(57) ABSTRACT

In an imaging lens of the present invention, various types of aberration are corrected favorably, the optical length is short, and a sufficient back focus is secured. The imaging lens comprises an aperture diaphragm S1, a first lens L1, a second lens L2, and a third lens L3, and is constituted such that the aperture diaphragm, first lens, second lens, and third lens are arranged in succession from the object side toward the image side. The first lens has a positive refractive power and convex surfaces facing the object side and the image side. The second lens has a negative refractive power, a meniscus shape, and a convex surface facing the image side. The third lens L3 has a positive refractive power and convex surfaces facing the object side and the image side. Both surfaces of the first lens, both surfaces of the second lens, and both surfaces of the third lens L3 are aspherical.

12 Claims, 31 Drawing Sheets

U.S. PATENT DOCUMENTS

| | | |
|---|---|---|
| 2003/0193605 A1 | 10/2003 | Yamaguchi |
| 2004/0212901 A1 | 10/2004 | Nanba et al. |
| 2005/0002116 A1 | 1/2005 | Nakamura |

FOREIGN PATENT DOCUMENTS

| | | |
|---|---|---|
| JP | 2002-244030 | 8/2002 |
| JP | 2003-066342 | 3/2003 |
| JP | 2003-149545 | 5/2003 |
| JP | 2004-302058 | 10/2004 |
| JP | 2004-302059 | 10/2004 |
| JP | 2004-302060 | 10/2004 |
| JP | 2004-317743 | 11/2004 |

* cited by examiner

IMAGING LENS

TECHNICAL FIELD

This invention relates to an imaging lens, and more particularly to an imaging lens which uses a CCD (Charge Coupled Device) or a CMOS (Complementary Metal Oxide Semiconductor) as an imaging element and is suitable for installation in an image input apparatus for a portable telephone or personal computer, a digital camera, a monitoring CCD camera, a surveying apparatus, and so on.

BACKGROUND ART

In this type of imaging lens, the optical length, which is defined as the distance from an entrance plane on the object side of the imaging lens to an imaging plane (the imaging surface of the CCD or the like) must be short. In other words, measures must be taken during lens design to reduce the ratio of the optical length to the combined focal length of the imaging lens. Hereafter, an imaging lens in which the optical length is short and the ratio of the optical length to the focal length is small will occasionally be referred to as a compact lens.

Taking a portable telephone as an example, at least the optical length must be shorter than the thickness of the portable telephone main body. On the other hand, the back focus, which is defined as the distance from an exit plane on the image side of the imaging lens to the imaging surface is preferably as long as possible. In other words, measures must be taken during lens design to make the ratio of the back focus to the focal length as large as possible so that components such as a filter and cover glass can be inserted between the imaging lens and the imaging surface.

In addition to the above, demands have been made for an imaging lens in which various kinds of aberration are corrected in accordance with the density of the imaging elements (also known as "pixels") to a small enough degree that image distortion is not visible to the human eye. In other words, various kinds of aberration must be corrected favorably, and hereafter, an image in which various kinds of aberration have been corrected favorably will occasionally be referred to as a "favorable image".

As will be described below, imaging lenses having a three-layer structure, which are suitable for use in an imaging apparatus such as a portable computer or videophone apparatus employing a CCD, CMOS, or other solid state imaging element, have been disclosed. These lenses all secure a wide viewing angle, and are small and lightweight.

Of these lenses, an imaging lens which produces images with favorably corrected aberrations while securing a wide viewing angle has been disclosed as a first three-layer lens (see Patent Document 1, for example).

However, of the three lenses arranged in sequence from the object side as a first lens, a second lens, and a third lens, the first lens is a meniscus lens having a positive refractive power and a convex surface facing the image side, the second lens is a meniscus lens having a negative refractive power and a convex surface facing the object side, and the third lens is a convex lens having a positive refractive power, and hence the optical length is too long in relation to the back focus. As a result, a compact lens cannot be provided.

Imaging lenses in which various aberrations are favorably corrected and a short focus is realized while securing a wide viewing angle have been disclosed respectively as second through fourth three-layer lenses (see Patent Document 2, Patent Document 3 and Patent Document 4, for example).

However, similarly to the imaging lens described above, the refractive power of the three lenses of these imaging lenses, constituted by first, second, and third lenses arranged in sequence from the object side, is positive in the first lens, negative in the second lens, and positive in the third lens. Hence, although these imaging lenses have a short combined focal length, the back focus is long in relation to the combined focal length, and therefore the optical length is also too long. In addition, the lenses use glass materials and are therefore expensive.

An imaging lens which uses aspherical lenses and is reduced in size by appropriately setting the power distribution and surface shape of the lenses has been disclosed as a fifth three-layer imaging lens (see Patent Document 5, for example)

However, the refractive power of the three lenses of this imaging lens, constituted by first, second, and third lenses arranged in succession from the object side, is negative in the first lens, positive in the second lens, and negative in the third lens. As a result, the imaging lens has a long optical length in relation to the combined focal length. In addition, the lenses use glass materials and are therefore expensive.

An imaging lens in which a pair of meniscus lenses whose concave surfaces face each other are constituted by plastic lenses each having at least one aspherical surface, and in which the entire lens system has a three-layer structure, has been disclosed as a sixth three-layer imaging lens. This lens achieves compactness and low cost, and is capable of suppressing focus movement due to temperature change with ease (see Patent Document 6, for example).

However, the refractive power of the three lenses in this imaging lens, which are arranged as first, second, and third lenses in succession from the object side, is weak in the first lens, weak in the second lens, and positive in the third lens. Hence the refractive power of the first lens and second lens cannot be fully compensated for by the third lens alone. As a result, the back focus lengthens in relation to the combined focal length, causing an increase in the optical length. Furthermore, the third lens uses a glass material, and therefore cost reduction is incomplete.

A telephoto-type lens system in which the entire lens system is divided into front and rear groups, the front group having a positive refractive power and the rear group having a negative refractive power, has been disclosed as a seventh three-layer lens. This lens system has a short optical length and is low in cost (see Patent Document 7, for example).

However, the refractive power of the three lenses in this lens system, which are arranged as first, second, and third lenses in succession from the object side, is negative in the first lens, positive in the second lens, and negative in the third lens, and the interval between the second lens and third lens is great. As a result, the optical length is long in relation to the combined focal length, and the aperture of the third lens is large. Accordingly, this lens system is unsuitable for installation in an image input device of a portable telephone or personal computer, a digital camera, a CCD camera used for monitoring purposes, a surveying apparatus, and so on.

An imaging lens comprising, in succession from the object side, two positive lenses, and a negative lens having a concave surface facing the image side, two aspherical surfaces, and a negative power which gradually weakens from the center of the lens toward the periphery so as to become a positive power on the periphery, has been disclosed as an eighth three-layer lens (see Patent Document 8, for example).

However, in this lens system, the negative power of a lens corresponding to a third lens L3 gradually weakens from the center of the lens toward the periphery, and the point at which the negative power becomes positive power exists within a range of 0.7 times to 1.0 times the effective aperture of the lens from the center of the lens. In lenses disclosed as embodiments, the positions at which the negative power becomes positive power are set at 0.96 times and 0.97 times the effective aperture of the lens from the center of the lens, respectively, and hence the positive power is set substantially on the peripheral portion of the lens.

By setting the position at which negative power turns to positive power on the peripheral portion of the lens, light entering the peripheral portion and the vicinity of the intersection between the optical axis and imaging surface of the lens enters the imaging element at an angle of incidence which is almost a right angle, but in an intermediate position between the peripheral portion of the lens and the intersection between the optical axis and imaging surface of the lens, the angle of incidence of the light entering the imaging element is greatly removed from a right angle. Hence, in intermediate positions relative to the peripheral portion of the lens, which occupies an important part of the image, the angle of incidence of the light is greatly removed from a right angle, and as a result, the light enters the imaging element from a diagonal direction to the imaging element, leading to an increase in the amount of reflection on the entrance plane and a reduction in the amount of optical energy reaching the photoelectric conversion surface of the imaging element. Accordingly, the image darkens in this part.

An imaging lens comprising an aperture diaphragm, a biconvex first lens having a positive refractive power, a second lens having a negative refractive power and a concave surface facing the object side, and a third lens having a meniscus shape and a convex surface facing the object side, which are arranged in sequence from the object side, has been disclosed as a ninth three-layer lens (see Patent Document 9, for example).

This lens system is designed to obtain favorable images when an aperture diaphragm is disposed on the object side of the first lens. By disposing the aperture diaphragm on the object side of the first lens, the entrance pupil can be formed near the object, and as a result, principal rays can be caused to enter at a near-perpendicular angle to the image surface. When the principal rays enter the image surface diagonally, the amount of light entering the pixels (imaging elements) disposed on the image surface decreases, leading to shading in which the image darkens in the peripheral portion of the image surface.

This problem is caused when a light ray enters an imaging element from a diagonal direction to the imaging element, leading to an increase in the amount of reflection on the surface of the imaging element and a reduction in the amount of optical energy reaching the photoelectric conversion surface of the imaging element. By disposing an aperture diaphragm on the object side of the first lens, an imaging lens in which shading is unlikely to occur can be designed.

In a lens system designed on the basis of this design principle, a further diaphragm may be disposed between the first lens and second lens to prevent flare, which is a phenomenon in which the contrast of the image decreases, or smear, which is a phenomenon in which the image runs. When a diaphragm is disposed between the first lens and second lens, the principal rays which enter at a large angle of incidence in relation to the optical axis of the imaging lens, from among the principal rays that pass through the aperture diaphragm, are blocked by the second diaphragm.

As a result, a part of the principal rays is blocked rather than the stray light which causes flare, smear, and other phenomena leading to a reduction in image quality, and hence in certain cases the amount of light on the periphery of the image may decrease, causing the peripheral portion of the image to darken.

Also in this lens system, the lens corresponding to the third lens is a meniscus lens, and hence the back focus is short in relation to the optical length. Therefore, when the back focus is increased so that a component such as a filter or cover glass can be inserted between the imaging lens and the imaging surface, the optical length also increases, and as a result, the lens system itself becomes too large.

An imaging lens comprising, in sequence from the object side, a first lens having a positive refractive power and a convex surface on the object side, a diaphragm, a second lens made of a plastic material and having at least one aspherical surface, a positive or negative refractive power, and a concave surface facing the object side, and a third lens having a positive refractive power, two aspherical surfaces, and a convex surface facing the object side, has been disclosed as a tenth three-layer lens (see Patent Document 10, for example).

The tenth three-layer lens is designed on the assumption that a diaphragm is set between the first lens and second lens, and this diaphragm caused to function as an aperture diaphragm so that favorable images can be obtained. Hence, when a shutter or the like is disposed on the object side of the first lens, the entrance aperture of the lens is narrowed by the shutter or the like. In other words, the shutter or the like functions essentially as a diaphragm such that a part of the principal rays entering the diaphragm is blocked. The principal rays which enter at a large angle in relation to the optical axis of the lens are the rays which form the peripheral portion of the image, and since these rays are blocked by the shutter or the like disposed on the object side of the first lens, the peripheral parts of the image may darken.

In this lens system, as in the ninth three-layer lens described above, the lens corresponding to the third lens L3 is a meniscus lens. Hence, in this lens system, as in the ninth three-layer lens, an increase in the back focus leads to an increase in the optical length, and as a result, the lens system itself becomes too large.

An imaging lens comprising, in sequence from the object side, a first lens made of a glass material and having a positive refractive power, the object-side surface of which is a convex surface, a diaphragm, a second lens made of a plastic material and having at least one aspherical surface, a positive refractive power, and a concave surface facing the object side, and a third lens made of a plastic material and having a negative refractive power, two aspherical surfaces, and a convex surface facing the object side, has been disclosed as an eleventh three-layer lens (see Patent Document 11, for example).

The eleventh three-layer lens has an identical basic structure to the tenth three-layer lens, and hence displays similar problems to those of the tenth three-layer lens.

An imaging lens comprising, in sequence from the object side, a biconvex first lens having a positive refractive power and at least one aspherical surface, a diaphragm, a second lens having at least one aspherical surface, a positive refractive power, a concave surface facing the object side, and a meniscus shape, and a third lens made of a plastic material and having a positive or negative refractive power and two aspherical surfaces, the object-side surface of which is a convex surface, has been disclosed as a twelfth three-layer lens (see Patent Document 12, for example).

The twelfth three-layer lens has an identical basic structure to the tenth and eleventh three-layer lenses described above, and hence displays similar problems to those of the tenth and eleventh three-layer lenses.

An imaging lens comprising, in sequence from the object side, a first lens having a mainly positive refractive power and a convex surface facing the object side, a second lens having a meniscus shape, a negative refractive power, and a convex surface facing the image side, and a third lens having a positive refractive power and a convex surface facing the object side, has been disclosed as a thirteenth three-layer lens. An imaging lens in which a diaphragm is disposed on the object side of the first lens and an imaging lens in which a diaphragm is disposed between the first lens and second lens is also disclosed (see Patent Document 13, for example).

More specifically, an imaging lens designed to obtain favorable images by having a diaphragm disposed on the object side of the first lens function as an aperture diaphragm, and an imaging lens designed to obtain favorable images by having a diaphragm disposed between the first lens and second lens function as an aperture diaphragm, are disclosed.

When another diaphragm is disposed between the first lens and second lens of an imaging lens that is designed to obtain favorable images by having a diaphragm disposed on the object side of the first lens function as an aperture diaphragm, the principal rays which enter the imaging lens at a large angle of incidence in relation to the optical axis of the imaging lens, from among the principal rays which pass through the aperture diaphragm, are blocked by the additional diaphragm. Similarly, when another diaphragm is disposed on the object side of the first lens of an imaging lens that is designed to obtain favorable images by having a diaphragm disposed between the first lens and second lens function as an aperture diaphragm, the principal rays which enter the imaging lens at a large angle of incidence in relation to the optical axis of the imaging lens, from among the principal rays which pass through the aperture diaphragm, are blocked by the additional diaphragm.

Hence, as described above, a part of the principal rays is blocked rather than the stray light which causes flare, smear, or other phenomena leading to a reduction in image quality, and therefore in certain cases the amount of light on the periphery of the image may decrease, causing the peripheral portion of the image to darken.

Patent Document 13 discloses an embodiment in which the imaging lens having the aperture diaphragm on the object side of the first lens and the imaging lens having the aperture diaphragm between the first lens and second lens are designed individually and independently. In other words, the shape and arrangement of the first through third lenses are designed in accordance with the placement position of the aperture diaphragm so that favorable images are obtained in each imaging lens. Accordingly, an imaging lens in which a diaphragm is disposed on the object side of the first lens and a further diaphragm serving as an aperture diaphragm is disposed between the first lens and second lens is not disclosed. In other words, an imaging lens which comprises both an aperture diaphragm for securing the entrance pupil position and a diaphragm for preventing flare or smear in order to improve the lens performance is not disclosed.

Furthermore, in the thirteenth three-layer lens, similarly to the ninth three-layer lens, the lens corresponding to a third lens L3 is a meniscus lens. Hence in this lens system, as in the ninth three-layer lens, a long back focus leads to a long optical length, and therefore the lens system itself becomes too large.

Patent Document 1: Japanese Unexamined Patent Application Publication 2001-075006
Patent Document 2: Japanese Unexamined Patent Application Publication 2003-149548
Patent Document 3: Japanese Unexamined Patent Application Publication 2002-221659
Patent Document 4: Japanese Unexamined Patent Application Publication 2002-244030
Patent Document 5: Japanese Unexamined Patent Application Publication 2003-149545
Patent Document 6: Japanese Unexamined patent Application Publication H10-301022
Patent Document 7: Japanese Unexamined Patent Application Publication H10-301021
Patent Document 8: Japanese Unexamined Patent Application Publication 2003-322792
Patent Document 9: Japanese Unexamined Patent Application Publication 2004-4566
Patent Document 10: Japanese Unexamined Patent Application Publication 2004-302058
Patent Document 11: Japanese Unexamined Patent Application Publication 2004-302059
Patent Document 12: Japanese Unexamined Patent Application Publication 2004-302060
Patent Document 13: Japanese Unexamined Patent Application Publication 2005-4045

DISCLOSURE OF THE INVENTION

Problems to be Solved by the Invention

An object of this invention is to provide an imaging lens which is suitable for installation in a camera which uses a CCD or CMOS as an imaging element, has a short optical length, has aback focus which is as long as possible, and with which favorable images are obtained. A short optical length specifically means that the ratio of the optical length to the focal distance is small. A long back focus specifically means that the ratio of the back focus to the focal length is large.

Another object of this invention is to provide an imaging lens in which all of the lenses (three lenses) constituting the imaging lens are realized in a plastic material, enabling reductions in cost and weight. Here, the term "plastic material" indicates a polymeric substance which can be formed into a lens by being molded through plastic deformation upon the application of heat, pressure, or both, and a material which is transparent to visible light.

Means for Solving the Problems

To achieve the objects described above, an imaging lens according to a first invention comprises an aperture diaphragm S1, a first lens L1, a second lens L2, and a third lens L3, and is constituted such that the aperture diaphragm S1, first lens L1, second lens L2, and third lens L3 are arranged in succession from an object side toward an image side. The first lens L1 has a positive refractive power and convex surfaces facing the object side and the image side. The second lens L2 is has a negative refractive power, a meniscus shape, and a convex surface facing the image side. The third lens L3 has a positive refractive power and convex surfaces facing the object side and the image side.

Further, both surfaces of the first lens L1, both surfaces of the second lens L2, and both surfaces of the third lens L3 are aspherical surfaces.

Further, this imaging lens satisfies the following conditions (1-1) through (1-7).

$$0.55<|r_2/r_3|<0.70 \tag{1-1}$$

$$0.08<d_3/f<0.12 \tag{1-2}$$

$$0.140 \leq d_4/f<0.270 \tag{1-3}$$

$$0.24<d_6/f<0.40 \tag{1-4}$$

$$0.90<L/2Y<1.10 \tag{1-5}$$

$$0.40<b_f/f<0.52 \tag{1-6}$$

$$2.70<F_{NO}<3.60 \tag{1-7}$$

where f is the combined focal length of the imaging lens, $r_2$ is the radius of curvature (optical axial radius of curvature) of the object-side surface of the first lens L1 in the vicinity of the optical axis, $r_3$ is the radius of curvature (optical axial radius of curvature) of the image-side surface of the first lens L1 in the vicinity of the optical axis, $d_3$ is the interval on the optical axis between the first lens L1 and second lens L2, $d_4$ is the thickness at the center of the second lens L2, $d_6$ is the thickness at the center of the third lens L3, L is the distance (atmospheric) from the object-side surface of the first lens L1 to the imaging surface, 2Y is the image height (effective diagonal length of the image surface), $b_f$ is the distance (atmospheric) on the optical axis from the image-side surface of the third lens L3 to the imaging surface, and $F_{NO}$ is the aperture ratio (F number)

The back focus $b_f$, which is defined as the distance from the exit surface on the image side of the imaging lens to the imaging surface, is defined here as the distance on the optical axis from the image-side surface of the third lens L3 to the imaging surface. The image height 2Y is the effective diagonal length of the image surface, or in other words the length of the diagonal on a rectangular light-receiving surface of a solid state imaging element disposed on the imaging surface of the imaging lens.

An imaging lens according to a second invention comprises a first lens L1, an aperture diaphragm S2, a second lens L2, and a third lens L3, and is constituted such that the first lens L1, aperture diaphragm S2, second lens L2, and third lens L3 are arranged in succession from an object side toward an image side. The first lens L1 has a positive refractive power and convex surfaces facing the object side and the image side. The second lens L2 has a negative refractive power, a meniscus shape, and a convex surface facing the image side. The third lens L3 has a positive refractive power and convex surfaces facing the object side and the image side.

Further, both surfaces of the first lens L1, both surfaces of the second lens L2, and both surfaces of the third lens L3 are aspherical surfaces.

Further, this imaging lens satisfies the following conditions (2-1) through (2-7).

$$0.55<|r_1/r_2|<0.70 \tag{2-1}$$

$$0.08<D_3/f<0.12 \tag{2-2}$$

$$0.140 \leq d_4/f<0.270 \tag{2-3}$$

$$0.24<d_6/f<0.40 \tag{2-4}$$

$$0.90<L/2Y<1.10 \tag{2-5}$$

$$0.40<b_f/f<0.52 \tag{2-6}$$

$$2.70<F_{NO}<3.60 \tag{2-7}$$

where f is the combined focal length of the imaging lens, $r_1$ is the radius of curvature (optical axial radius of curvature) of the object-side surface of the first lens L1 in the vicinity of the optical axis, $r_2$ is the radius of curvature (optical axial radius of curvature) of the image-side surface of the first lens L1 in the vicinity of the optical axis, $D_3$ is the interval on the optical axis between the first lens L1 and second lens L2, $d_4$ is the thickness at the center of the second lens L2, $d_6$ is the thickness at the center of the third lens L3, L is the distance (atmospheric) from the object-side surface of the first lens L1 to the imaging surface, 2Y is the image height (effective diagonal length of the image surface), $b_f$ is the distance (atmospheric) on the optical axis from the image-side surface of the third lens L3 to the imaging surface, and $F_{NO}$ is the aperture ratio (F number).

The back focus $b_f$, which is defined as the distance from the exit surface on the image side of the imaging lens to the imaging surface, is defined here as the distance on the optical axis from the image-side surface of the third lens L3 to the imaging surface. The image height 2Y is the effective diagonal length of the image surface, or in other words the length of the diagonal on a rectangular light-receiving surface of a solid state imaging element disposed on the imaging surface of the imaging lens.

In the imaging lens of the second invention, the aperture diaphragm S2 is disposed between the first lens L1 and second lens L2, and hence the interval $D_3$ on the optical axis between the first lens L1 and second lens L2 is defined as the sum of the interval from the image-side surface of the first lens L1 to the aperture diaphragm S2 and the interval from the aperture diaphragm S2 to the object-side surface of the second lens L2.

An imaging lens according to a third invention comprises an aperture diaphragm S1, a first lens L1, an aperture diaphragm S2, a second lens L2, and a third lens L3, and is constituted such that the aperture diaphragm S1, first lens L1, aperture diaphragm S2, second lens L2, and third lens L3 are arranged in succession from an object side toward an image side. The first lens L1 has a positive refractive power and convex surfaces facing the object side and the image side. The second lens L2 has a negative refractive power, a meniscus shape, and a convex surface facing the image side. The third lens L3 has a positive refractive power and convex surfaces facing the object side and the image side.

Further, both surfaces of the first lens L1, both surfaces of the second lens L2, and both surfaces of the third lens L3 are aspherical surfaces.

Further, this imaging lens satisfies the following conditions (3-1) through (3-7).

$$0.55<|r_2/r_3|<0.70 \tag{3-1}$$

$$0.08<D_3/f<0.12 \tag{3-2}$$

$$0.140 \leq d_4/f<0.270 \tag{3-3}$$

$$0.24 < D_6/f < 0.40 \quad (3\text{-}4)$$

$$0.90 < L/2Y < 1.10 \quad (3\text{-}5)$$

$$0.40 < b_f/f < 0.52 \quad (3\text{-}6)$$

$$2.70 < F_{NO} < 3.60 \quad (3\text{-}7)$$

where f is the combined focal length of the imaging lens, $r_2$ is the radius of curvature (optical axial radius of curvature) of the object-side surface of the first lens L1 in the vicinity of the optical axis, $r_3$ is the radius of curvature (optical axial radius of curvature) of the image-side surface of the first lens L1 in the vicinity of the optical axis, $D_3$ is the interval on the optical axis between the first lens L1 and second lens L2, $D_4$ is the thickness at the center of the second lens L2, $D_6$ is the thickness at the center of the third lens L3, L is the distance (atmospheric) from the object-side surface of the first lens L1 to the imaging surface, 2Y is the image height (effective diagonal length of the image surface), $b_f$ is the distance (atmospheric) on the optical axis from the image-side surface of the third lens L3 to the imaging surface, and $F_{NO}$ is the aperture ratio (F number).

The back focus $b_f$, which is defined as the distance from the exit surface on the image side of the imaging lens to the imaging surface, is defined here as the distance on the optical axis from the image-side surface of the third lens L3 to the imaging surface. The image height 2Y is the effective diagonal length of the image surface, or in other words the length of the diagonal on a rectangular light-receiving surface of a solid state imaging element disposed on the imaging surface of the imaging lens.

In the imaging lens of the third invention, similarly to the imaging lens of the second invention, the aperture diaphragm S2 is disposed between the first lens L1 and second lens L2, and hence the interval $D_3$ on the optical axis between the first lens L1 and second lens L2 is defined similarly to the imaging lens of the second invention. That is, the interval $D_3$ is defined as the sum of the interval from the image-side surface of the first lens L1 to the aperture diaphragm S2 and the interval from the aperture diaphragm S2 to the object-side surface of the second lens L2.

In the imaging lenses according to the first through third inventions, the refractive index of the material constituting the second lens L2 is preferably higher than the refractive index of the material constituting the first lens L1 and the third lens L3, and the Abbe number of the material constituting the second lens L2 is preferably lower than the Abbe number of the material constituting the first lens L1 and the third lens L3.

Also, the first lens L1, second lens L2, and third lens L3 constituting the respective imaging lenses according to the first through third inventions are preferably formed from a material having an Abbe number within a range of thirty to sixty. Further, the first lens L1 and third lens L3 are preferably formed using cycloolefin plastic as a material, and the second lens L2 is preferably formed using polycarbonate as a material.

EFFECTS OF THE INVENTION

By providing the first lens L1 with a positive refractive power and convex surfaces facing the object side and the image side, the second lens L2 with a negative refractive power, a meniscus shape, and a convex surface facing the image side, and the third lens L3 with a positive refractive power and convex surfaces facing the object side and the image side, the optical length L can be shortened.

The effects that can be obtained in relation to the imaging lens of this invention by satisfying the conditional expressions (1-1) through (1-7), the conditional expressions (2-1) through (2-7), and the conditional expressions (3-1) through (3-7) are as follows.

The conditional expressions (1-1), (2-1), and (3-1) are for determining the ratio between the radius of curvature on the optical axial of a first surface (object-side surface) of the first lens L1 and the radius of curvature on the optical axial of a second surface (image-side surface) of the first lens L1. If this ratio is larger than the lower limit provided by the conditional expressions (1-1), (2-1), and (3-1), the back focus $b_f$ of the imaging lens is sufficient for inserting a component such as a cover glass or filter between the imaging lens and the imaging surface, and thus the back focus can be set within a range which does not impair the compactness of a device into which the imaging lens is to be installed. Moreover, distortion can be prevented from becoming excessively large, and hence processing of the first surface of the first lens L1 is facilitated.

If the ratio between the radius of curvature on the optical axial of the first surface (object-side surface) of the first lens L1 and the radius of curvature on the optical axial of the second surface (image-side surface) of the first lens L1 is smaller than the upper limit provided by the conditional expressions (1-1), (2-1), and (3-1), the back focus can be shortened, and hence the imaging lens can be made compact. Moreover, spherical aberration and astigmatism take positive values which are not too large. Furthermore, distortion takes a negative value, the absolute value of which is not too large. Hence, these aberrations can be corrected within the required range by the second lens L2 and third lens L3.

The conditional expressions (1-2), (2-2), and (3-2) are for determining the allowable range of the optical axis interval $d_3$ between the first lens L1 and second lens L2, which is standardized by the combined focal length f of the imaging lens. Note that in the imaging lenses of the second and third inventions, $d_3$ is written as $D_3$. The reason for this is that in the imaging lenses of the second and third inventions, the aperture diaphragm S2 is disposed between the first lens L1 and second lens L2, as described above. More specifically, the interval $D_3$ is the sum of the interval from the image-side surface of the first lens L1 to the aperture diaphragm S2 and the interval from the aperture diaphragm S2 to the object-side surface of the second lens L2, and hence $D_3$ is written instead of $d_3$ to differentiate it from the first imaging lens, in which the aperture diaphragm S2 is not provided. In physical terms, however, all of the imaging lenses are identical, and hence in the following description, when there is no particular need to differentiate between $d_3$ and $D_3$, $d_3$ will be used as a common symbol instead of separating the two.

If $d_3/f$ is larger than the lower limit provided by the conditional expressions (1-2), (2-2), and (3-2), spherical aberration takes a positive value which is not too large, and distortion takes a negative value which is also not too large. If $d_3/f$ is smaller than the upper limit provided by the conditional expressions (1-2), (2-2), and (3-2), there is no need to increase the lens diameter of the second lens L2 and third lens L3 to the extent that it becomes difficult to make the imaging lens compact.

The conditional expressions (1-3), (2-3), and (3-3) are for determining the allowable range of the thickness $d_4$ at the center of the second lens L2, which is standardized by the combined focal length f of the imaging lens. Note that in the imaging lens of the third invention, $d_4$ is written as $D_4$ in accordance with the fact that in the imaging lens of the third invention, the aperture S1 is disposed on the object side of the first lens L1 and the aperture S2 is disposed between the first lens L1 and second lens L2, and hence $d_4$ and $D_4$ will be used separately in the following description for convenience. In physical terms, however, all of the imaging lenses are identical, and hence in the following description, when there is no particular need to differentiate between $d_4$ and $D_4$, $d_4$ will be used as a common symbol instead of separating the two.

If $d_4/f$ is larger than the lower limit provided by the conditional expressions (1-3), (2-3), and (3-3), a sufficient central thickness for processing a resin lens can be secured. If $d_4/f$ is smaller than the upper limit provided by the conditional expressions (1-3), (2-3), and (3-3), imaging surface distortion can be reduced sufficiently, and favorable images can be obtained.

The conditional expressions (1-4), (2-4), and (3-4) are for defining the allowable range of the thickness $d_6$ at the center of the third lens L3, which is standardized by the combined focal length f of the imaging lens.

Note that in the imaging lens of the third invention, $d_6$ is written as $D_6$ in accordance with the fact that in the imaging lens of the third invention, the aperture S1 is disposed on the object side of the first lens L1 and the aperture S2 is disposed between the first lens L1 and second lens L2, similarly to the circumstances relating to $d_4$, and hence $d_6$ and $D_6$ will be used separately in the following description for convenience. In physical terms, however, all of the imaging lenses are identical, and hence in the following description, when there is no particular need to differentiate between $d_6$ and $D_6$, $d_6$ will be used as a common symbol instead of separating the two, as in the case of $d_4$.

If $d_6/f$ is larger than the lower limit provided by the conditional expressions (1-4), (2-4), and (3-4), the outer peripheral portion of the third lens L3 can be maintained at a sufficient thickness to allow the provision of a gate, which is required to pour a plasticized forming resin into a mold when forming a resin lens. In other words, by reducing the central thickness $d_6$ of the third lens L3, the thickness of the outer peripheral portion of the third lens L3 decreases correspondingly. However, if $d_6/f$ is set to be larger than the lower limit provided by the conditional expressions (1-4), (2-4), and (3-4), the outer peripheral portion of the third lens L3 can be maintained at sufficient thickness to allow the provision at a gate, which is required when forming a resin lens.

If $d_6/f$ is smaller than the upper limit provided by the conditional expressions (1-4), (2-4), and (3-4), there is no need to increase the outer periphery of the third lens L3 to an extent which makes it difficult to keep the imaging lens compact. Moreover, distortion can be reduced sufficiently, and favorable images can be obtained.

The conditional expressions (1-5), (2-5), and (3-5) are used to determine the allowable range of the ratio between the optical length L and the image height (effective diagonal length of the image surface) 2Y. If the ratio of L/2Y is larger than the lower limit of the conditional expressions (1-5), (2-5), and (3-5), the thickness of the first lens L1, second lens L2, and third lens L3 can be maintained at or above that required to form the lenses. More specifically, when the first lens L1, second lens L2, and third lens L3 are constituted by a resin material and the lenses are thin during injection molding, it is difficult to inject the resin material into the mold so that the material spreads evenly. Hence, when forming lenses from a resin material, a certain degree of lens thickness must be secured. If the ratio of L/2Y is larger than the lower limit of the conditional expressions (1-5), (2-5), and (3-5), a sufficient lens thickness can be secured.

If the ratio of L/2Y is smaller than the upper limit of the conditional expressions (1-5), (2-5), and (3-5), the peripheral light amount ratio of the imaging lens can be prevented from becoming too small without increasing the outer shape of the first lens L1, second lens L2, and third lens L3 to an extent that reduces the compactness of the imaging lens.

The conditional expressions (1-6), (2-6), and (3-6) are for determining the allowable range of the back focus $b_f$ standardized by the combined focal length f of the imaging lens. If the back focus $b_f$ is within the range provided by the conditional expressions (1-6), (2-6), and (3-6), an optical component such as a filter, which is required in an image input apparatus of a portable telephone or the like, can be inserted between the image-side surface of the third lens and the imaging surface.

The conditional expressions (1-7), (2-7), and (3-7) are for determining the allowable range of the aperture ratio (F number) of the imaging lens. If the aperture ratio exceeds the lower limit of the conditional expressions (1-7), (2-7), and (3-7), a sufficient resolution can be obtained in the imaging lens and a sufficiently large peripheral light amount ratio can also be secured. If the aperture ratio is smaller than the upper limit of the conditional expressions (1-7), (2-7), and (3-7), a sufficient brightness can be obtained in the imaging lens, and hence, even when the imaging lens is used in an imaging apparatus employing a CCD or CMOS, there is no need to increase the light-receiving sensitivity of the CCD or CMOS to an extent that causes noise level problems.

By providing the respective imaging lenses of the first through third inventions with a lens constitution that satisfies each of the seven conditions in the conditional expressions (1-1) through (1-7), (2-1) through (2-7), and (3-1) through (3-7), the problems described above can be solved, and a compact imaging lens which is small yet capable of obtaining favorable images can be provided.

In the imaging lens of the first invention, the aperture diaphragm S1 for fixing the entrance pupil is disposed on the front surface of the first lens L1, or in other words the object side of the first lens L1. In so doing, the entrance pupil can be brought closer to the object side such that the principal rays are caused to enter the image surface at a near-perpendicular angle, and hence shading can be prevented.

In the imaging lens of the second invention, the aperture diaphragm S2 for fixing the entrance pupil is disposed between the first lens L1 and the second lens L2. In so doing, the diaphragm S2 functions to remove flare generated by the first lens L1. The aperture of the third lens L3 is large, and hence it is far more effective to block stray light caused by the flare that is generated by the first lens L1 before it enters the third lens L3 than after it passes through the third lens L3.

To modify the aperture ratio (F number) of the imaging lens, the size of the aperture diaphragm may be modified. In the imaging lens of the second invention, the aperture diaphragm S2 is disposed between the first lens L1 and the second lens L2, and hence the aperture ratio can be modified simply by replacing the aperture diaphragm S2. However, in order to provide an aperture diaphragm on the front surface of the first lens L1, as in the imaging lens of the first invention, the magnitude of the aperture of a barrel used to fix the first through third lenses constituting the imaging lens must be set during manufacture of the barrel such that the tip end of the barrel functions as the aperture diaphragm S1. In other words, the barrel of the imaging lens must be redesigned every time the aperture ratio is modified, and hence a mold for manufacturing the barrel of the imaging lens must be recreated upon every modification.

As described above, the imaging lens of the first invention and the imaging lens of the second invention have different features.

The imaging lens of the third invention simultaneously comprises an aperture diaphragm for fixing the entrance pupil and a diaphragm for preventing flare or smear. When both the diaphragm S1 and the diaphragm S2 are provided, as in the imaging lens of the third invention, favorable images are obtained regardless of whether the various aberrations are calculated using the diaphragm S1 as an aperture diaphragm or the various aberrations are calculated using the diaphragm S2 as an aperture diaphragm. When calculating the various aberrations, measures were taken to ensure that the shape and constitutional material of the first lens L1 through third lens L3 were identical and the intervals between the lenses were identical.

In eleventh and twelfth embodiments to be described below, the various aberrations were calculated when the diaphragm S1 was caused to function as an aperture diaphragm and when the diaphragm S2 was caused to function as an aperture diaphragm. It was confirmed that favorable images were obtained in both cases.

Thus, in the imaging lens of the third invention, sufficient brightness can be secured up to the peripheral portion of the image, and stray light which causes flare or smear, leading to a reduction in the image quality, can be blocked effectively.

Further, by ensuring that the refractive index of the material constituting the second lens L2 is greater than the refractive index of the material constituting the first lens L1 and the third lens L3, and that the Abbe number of the material constituting the second lens L2 is lower than the Abbe number of the material constituting the first lens L1 and the third lens L3, chromatic and spherical aberration can be reduced effectively.

By forming the second lens L2 from polycarbonate and forming the first lens L1 and third lens L3 from cycloolefin plastic, the refractive index of the material constituting the second lens L2 can be made higher than the refractive index of the material constituting the first lens L1 and the third lens L3, and the Abbe number of the material constituting the second lens L2 can be made lower than the Abbe number of the material constituting the first lens L1 and the third lens L3.

The refractive index of cyclolefin plastic plastic is 1.5304, while the refractive index of polycarbonate is 1.5839. The Abbe number of cycloolefin plastic is 56.2, while the Abbe number of polycarbonate is 30.0, and hence these materials can be used in the imaging lens of this invention.

Further, it is well known that cycloolefin plastic or polycarbonate materials are suitable for forming lenses using injection molding methods that are already well-established as manufacturing techniques. Needless to say, this invention is not limited to a plastic material, and any plastic material or molded glass material having an Abbe number within a range of 30 to 60 may be used.

In first through twelfth embodiments to be described below, the first lens L1 and third lens L3 are formed from cycloolefin plastic and the second lens L2 is formed from polycarbonate.

Figure 1:
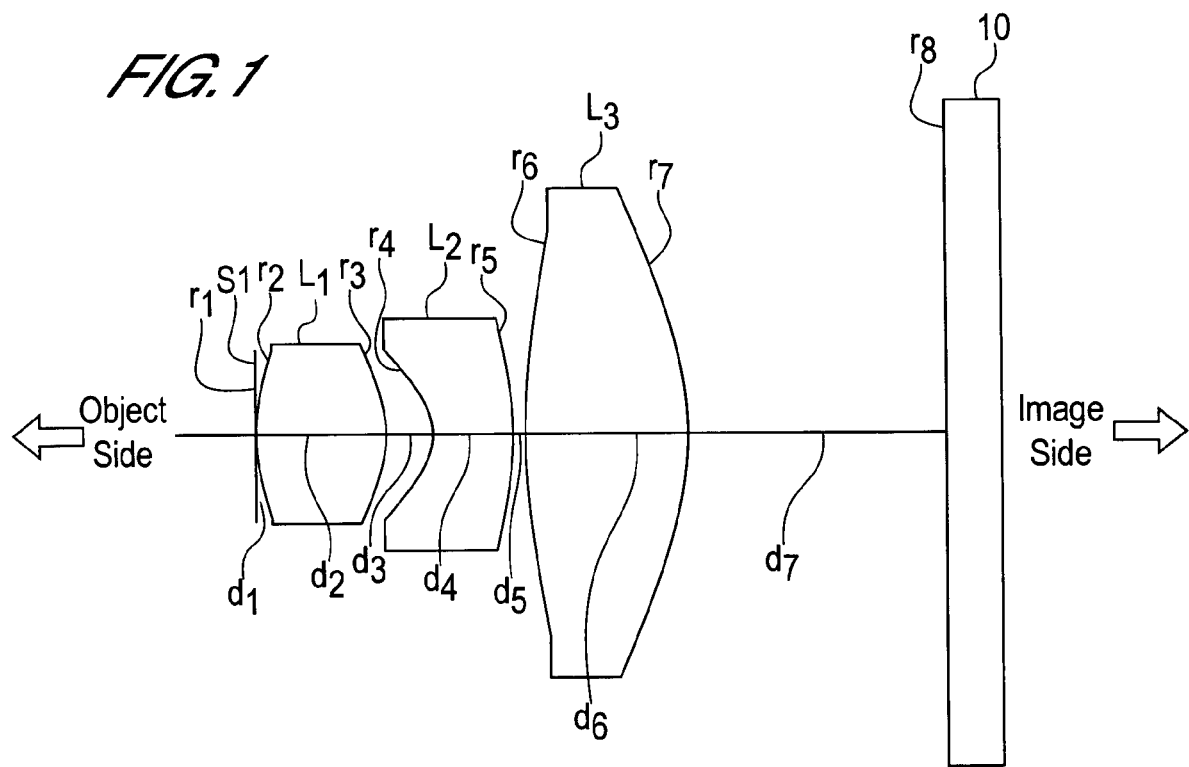
FIG. 1 is a sectional view of an imaging lens according to a first invention.

EXPLANATIONS OF LETTERS OR NUMERALS 10 imaging element
S1, S2 diaphragms
L1 first lens
L2 second lens
L3 third lens
$r_i$ optical axial radius of curvature of $i^{th}$ surface
$d_i$ distance from intersection between $i^{th}$ surface and optical axis to intersection between $i+1^{th}$ surface and optical axis

BEST MODES FOR CARRYING OUT THE INVENTION

Embodiments of this invention will be described below with reference to the drawings. Note that in the drawings, the form, magnitude, and positional relationships of each constitutional element are merely illustrated schematically in order to facilitate understanding of the invention, and the numerical conditions and other conditions to be described below are merely preferred examples thereof. Accordingly, this invention is in no way limited to or by the embodiments of the invention.

Figure 22:
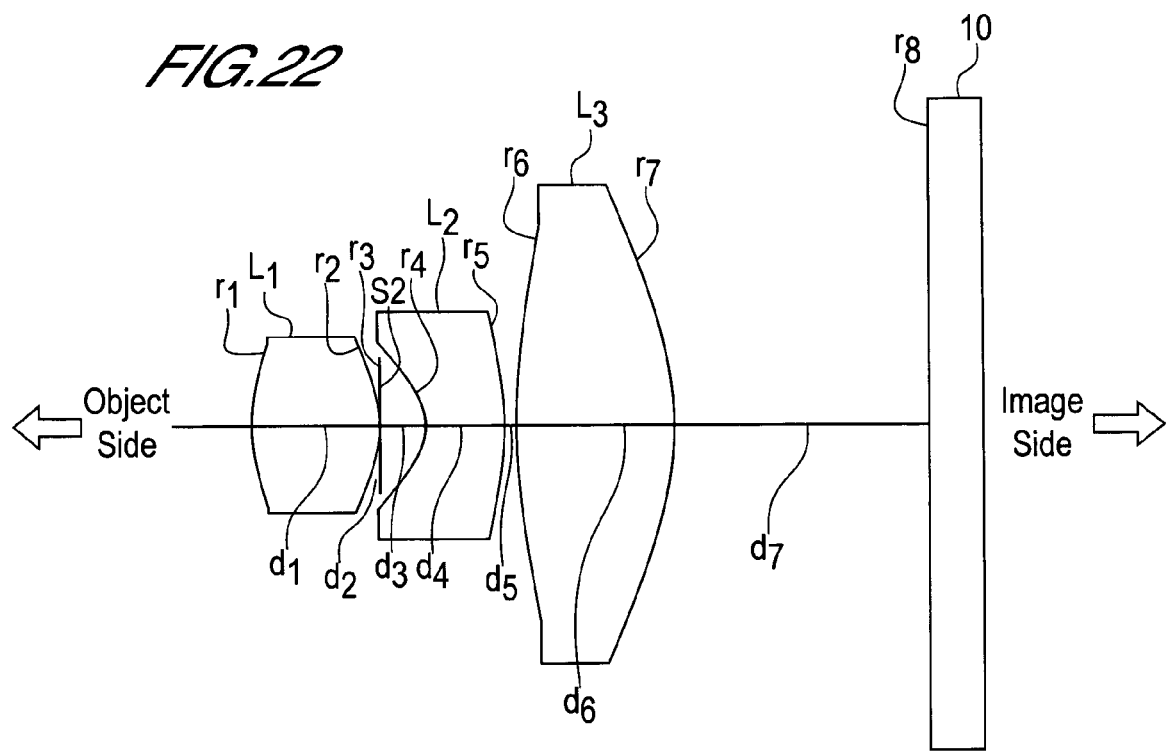
FIG. 22 is a sectional view of an imaging lens according to a second invention.
Figure 43:
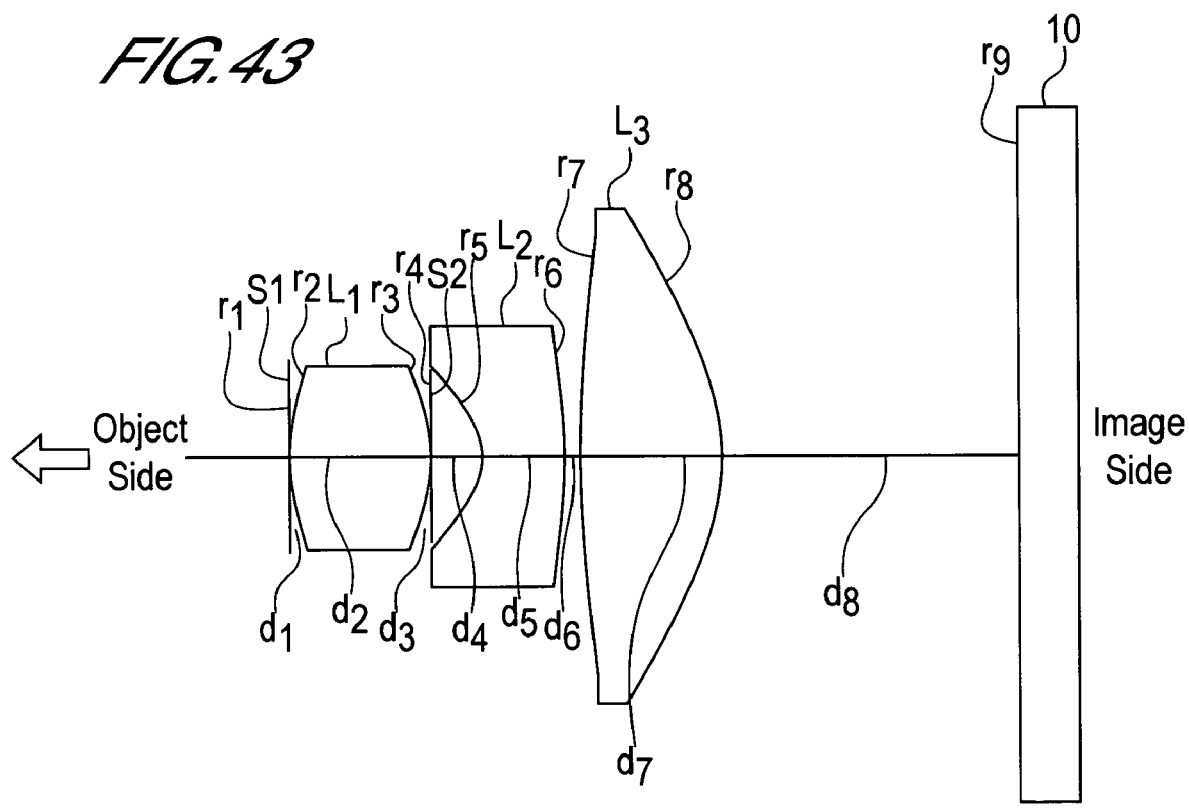
FIG. 43 is a sectional view of an imaging lens according to a third invention.

FIGS. 1, 22, and 43 are constitutional diagrams showing imaging lenses according to first through third inventions respectively. The reference symbols defined in FIGS. 1, 22, and 43, which indicate surface numbers, surface intervals, and so on, are also used in FIGS. 2, 6, 10, 14, 18, 23, 27, 31, 35, 39, 44, 48, 52, and 56.

From the object side, first, second, and third lenses are indicated by the reference symbols L1, L2, and L3 respectively. Diaphragms are denoted by S1 and S2. To the extent that confusion does not occur, $r_i$ (i=1, 2, 3, . . . , 9) is used as both a variable representing the value of an optical axial radius of curvature and as a symbol identifying a surface of a lens, the cover glass, or the imaging surface (for example, $r_1$ is used to represent the object-side surface of the first lens, and so on).

Parameters shown in these drawings such as $r_i$ (where i=1, 2, 3, . . . , 9) and $d_i$ (where i=1, 2, 3, . . . , 8) are provided as specific numerical values in the following Tables 1 through 12. The suffix i corresponds to the surface numbers of each lens, the lens thickness, the lens interval, or similar, in succession from the object side to the image side.

More specifically:

$r_i$ is the axial radius of curvature of the $i^{th}$ surface;
$d_i$ is the distance from the $i^{th}$ surface to the $i+1^{th}$ surface;
$N_i$ is the refractive index of the lens material constituting the $i^{th}$ surface and the $i+1^{th}$ surface; and
$v_i$ is the Abbe number of the lens material constituting the $i^{th}$ surface and the $i+1^{th}$ surface.

In FIGS. 1, 22, and 43, the aperture portion of the diaphragm is illustrated as a line segment. The reason for this is that in order to define the distance from the lens surface to the diaphragm surface, the inter-section between the diaphragm surface and the optical axis must be illustrated clearly. In FIGS. 2, 6, 10, 14, 18, 23, 27, 31, 35, 39, 44, 48, 52, and 56, which are sectional views of the image lenses according to the first through twelfth embodiments, respectively, the aperture portion of the diaphragm is open, in contrast to FIGS. 1, 22, and 43, and the main body of the diaphragm which blocks light is illustrated by two straight lines originating from the ends of the aperture portion. The reason for this is that in order to illustrate light rays such as principal rays, the aperture portion of the diaphragm must be illustrated in an open state to reflect the actual condition of the diaphragm.

In the first and third imaging lenses, the optical length L is defined as the distance from the diaphragm S1 to the imaging surface, and in the imaging lens of the second invention, the optical length L is defined as the distance from the intersection between the object-side surface of the first lens and the optical axis to the imaging surface. The back focus $b_f$ is defined as the distance on the optical axis from the image-side surface of the third lens L3 to the imaging surface.

Aspherical surface data are illustrated together with the surface numbers in the respective columns of Tables 1 through 12. The surfaces of the diaphragms S1 and S2 and the imaging surface are flat, and hence the radius of curvature thereof is displayed as ∞.

The aspherical surfaces used in this invention are obtained according to the following equation.

$$Z = ch^2/[1+[1-(1+k)c^2h^2]^{+1/2}] + A_0h^4 + B_0h^6 + C_0h^8 + D_0h^{10}$$

where

Z is the depth from the tangential plane to the surface apex, c is the paraxial curvature of the surface, h is the height from the optical axis, k is a conic constant, $A_0$ is the quartic aspherical surface coefficient, $B_0$ is the sextic aspherical surface coefficient, $C_0$ is the eighth-order ashperical surface coeffiecient, and $D_0$ is the tenth-order aspherical surface coefficient.

Numerical values indicating the aspherical surface coefficients are displayed as indices in Tables 1 through 12 in this specification. For example, "e−1" signifies "$10^{-1}$". Further, the value illustrated as the focal length f is the combined focal length of the lens system constituted by the first through third lenses.

The first through twelfth embodiments will now be described with reference to FIGS. 2 through 25.

The distortion curves shown in FIGS. 3, 7, 11, 15, 19, 24, 28, 32, 36, 40, 45, 49, 53, and 57 show aberration (the abscissa shows as a percentage the degree to which the tangent condition is unsatisfied) in relation to the distance from the optical axis (the ordinate shows a percentage with the maximum distance from the optical axis on the imaging surface set to 100). Similarly to the distortion curves, the astigmatism curves shown in FIGS. 4, 8, 12, 16, 20, 25, 29, 33, 37, 41, 46, 50, 54, and 58 show the amount of aberration (in units of mm) on the abscissa in relation to the distance from the optical axis, which is shown on the ordinate, and also show the amount of aberration (in units of mm) on the meridional plane and the sagittal plane. The chromatic and spherical aberration curves shown in FIGS. 5, 9, 13, 17, 21, 26, 30, 34, 38, 42, 47, 51, 55, and 59 show the amount of aberration (in units of mm) on the abscissa in relation to the incidence height h (F number), which is shown on the ordinate.

The chromatic and spherical aberration curves also show aberration values for the C line (light with a wavelength of 656.3 nm), the d line (light with a wavelength of 587.6 nm), the e line (light with a wavelength of 546.1 nm), the F line (light with a wavelength of 486.1 nm), and the g line (light with a wavelength of 435.8 nm). The refractive index is the refractive index on the d line (587.6 nm light).

The radius of curvature (mm units), lens surface interval (mm units), refractive index of the lens material, Abbe number of the lens material, focal length, numerical aperture, and aspherical surface coefficient of the lenses constituting the first through twelfth embodiments are listed below in Table 1 through Table 12. In the first through twelfth embodiments, the respective focal distances of the first lens L1, second lens L2, and third lens L3 are denoted by $f_1$, $f_2$, and $f_3$. In all of the first through twelfth embodiments, $f_1$ and $f_3$ take a positive value, while $f_2$ takes a negative value. In other words, the first lens L1 and third lens L3 have a positive refractive power, while the second lens L2 has a negative refractive power.

Further, the value $r_i$ (i=1, 2, 3, . . . , 9) of the optical axis radius of curvature takes a positive value when the object side is convex and a negative value when the image side is convex. It is evident from the symbols used to express the radius of curvature values of the curves constituting the lenses that the first lens L1 is a convex lens having convex surfaces which face both the object side and the image side, the second lens L2 is a meniscus lens having a convex surface facing the image side, and the third lens L3 is a convex lens having convex surfaces which face both the object side and the image side.

The features of each of the embodiments are described below. In the first through twelfth embodiments, ZEONEX E48R ("ZEONEX" is a registered trademark of Zeon Corporation, and E48R is the series number), which is a cycloolefin plastic, is used as the material for the first lens L1 and third lens L3. Polycarbonate is used as the material for the second lens L2.

The refractive index on the d line of ZEONEX E48R is 1.5304, and the refractive index on the d line of polycarbonate is 1.5869. The Abbe number of ZEONEX E48R is 56.0, and the Abbe number of polycarbonate is 30.9.

Both surfaces of all of the first lens L1, second lens L2, and third lens L3 are aspherical surfaces.

[First Invention]

As shown in FIG. 1, an imaging lens of the first invention comprises an aperture diaphragm S1, a first lens L1, a second lens L2, and a third lens L3, wherein the aperture diaphragm S1, the first lens L1, the second lens L2, and the third lens L3 are arranged in succession from an object side toward an image side. The radius of curvature (mm units), lens surface interval (mm units), lens material refractive index, lens material Abbe number, focal distance, numerical aperture, aspherical surface coefficient, and so on of the lenses constituting the first through fifth embodiments of the imaging lens according to the first invention are listed in Tables 1 through 5, respectively.

TABLE 1

| | | | | First Embodiment | | | | |
|---|---|---|---|---|---|---|---|---|
| Radius of | | Refractive | Abbe | Aspherical Surface Coefficient | | | | |
| Curvature($r_i$) | Interval($d_i$) | Index($N_i$) | Number($v_i$) | K | $A_0$ | $B_0$ | $C_0$ | $D_0$ |
| $r_1 = \infty$ | $d_1 = 0.0000$ | | | | | | | |
| $r_2 = 0.421$ | $d_2 = 0.2394$ | $N_2 = 1.5304$ | $v_2 = 56.0$ | −1.400e−1 | 3.868e−1 | −3.459e+2 | 1.545e+4 | −3.294e+5 |
| $r_3 = -0.689$ | $d_3 = 0.0901$ | | | 2.800 | −1.486e+1 | −2.430e+1 | −1.772e+3 | 4.245e+3 |
| $r_4 = -0.149$ | $d_4 = 0.1445$ | $N_4 = 1.5839$ | $v_4 = 30.9$ | −7.939e−1 | 1.776e+1 | 1.357e+2 | 6.271e+2 | −1.214e+5 |
| $r_5 = -0.320$ | $d_5 = 0.0227$ | | | −1.888 | 1.039e+1 | 2.019e+2 | −1.561e+3 | −2.012e+3 |
| $r_6 = 1.084$ | $d_6 = 0.3032$ | $N_6 = 1.5304$ | $v_6 = 56.0$ | −4.340 | −2.197 | 1.847 | 1.010e+2 | −3.599e+2 |
| $r_7 = -10.754$ | $d_7 = 0.4817$ | | | 3.000e−2 | −3.222 | 1.338e+1 | −8.214e+1 | 1.855e+2 |
| $r_8 = \infty$ | | | | | | | | |

Focal Distance f = 1.00 mm    $f_1$ = 0.53 mm
Numerical Aperture $F_{no}$ = 2.90    $f_2$ = −0.69 mm
Image Height 2Y = 1.30 mm    $f_3$ = 1.87 mm

TABLE 2

Second Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.436$ | $d_2 = 0.2519$ | $N_2 = 1.5304$ | $v_2 = 56.0$ | −1.530e−1 | 6.923e−2 | −2.956e+2 | 1.232e+4 | −2.551e+5 |
| $r_3 = -0.659$ | $d_3 = 0.0925$ | | | 2.930 | −1.345e+1 | −4.422e+1 | −1.213e+3 | 2.624e+4 |
| $r_4 = -0.155$ | $d_4 = 0.1479$ | $N_4 = 1.5839$ | $v_4 = 30.9$ | −7.668e−1 | 1.423e+1 | 1.123e+2 | 3.226e+3 | −9.360e+4 |
| $r_5 = -0.328$ | $d_5 = 0.0187$ | | | −1.620 | 9.406 | 1.826e+2 | −1.289e+3 | 2.257e+2 |
| $r_6 = 1.244$ | $d_6 = 0.3173$ | $N_6 = 1.5304$ | $v_6 = 56.0$ | −1.165 | −2.194 | −1.459 | 8.371e+1 | −2.475e+2 |
| $r_7 = -9.759$ | $d_7 = 0.4596$ | | | 0.000 | −2.792 | 9.039 | −5.070e+1 | 5.267e+1 |
| $r_8 = \infty$ | | | | | | | | |

Focal Distance f = 1.00 mm  $f_1 = 0.54$ mm
Numerical Aperture $F_{no} = 2.78$  $f_2 = -0.73$ mm
Image Height 2Y = 1.32 mm  $f_3 = 2.10$ mm

TABLE 3

Third Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.415$ | $d_2 = 0.2376$ | $N_2 = 1.5304$ | $v_2 = 56.0$ | −1.640e−2 | 4.209e−1 | −3.987e+2 | 1.892e+4 | −4.257e+5 |
| $r_3 = -0.671$ | $d_3 = 0.0875$ | | | 2.900 | −1.614e+1 | −2.802e+1 | −2.156e+3 | −5.594e+3 |
| $r_4 = -0.144$ | $d_4 = 0.1400$ | $N_4 = 1.5839$ | $v_4 = 30.9$ | −7.940e−1 | 1.931e+1 | 1.576e+2 | 7.681e+2 | −1.574e+5 |
| $r_5 = -0.312$ | $d_5 = 0.0230$ | | | −1.887 | 1.133e+1 | 2.326e+2 | −1.901e+3 | 2.594e+3 |
| $r_6 = 1.068$ | $d_6 = 0.2980$ | $N_6 = 1.5304$ | $v_6 = 56.0$ | −4.334 | −2.394 | 2.124 | 1.213e+3 | −4.526e+2 |
| $r_7 = -10.702$ | $d_7 = 0.4876$ | | | 0.000 | −3.455 | 1.548e+1 | −1.027e+2 | 2.322e+2 |
| $r_8 = \infty$ | | | | | | | | |

Focal Distance f = 1.00 mm  $f_1 = 0.52$ mm
Numerical Aperture $F_{no} = 2.80$  $f_2 = -0.66$ mm
Image Height 2Y = 1.24 mm  $f_3 = 1.85$ mm

TABLE 4

Fourth Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.416$ | $d_2 = 0.2379$ | $N_2 = 1.5304$ | $v_2 = 56.0$ | 5.120e−2 | 6.774e−1 | −4.278e+2 | 1.951e+4 | −3.919e+5 |
| $r_3 = -0.671$ | $d_3 = 0.0875$ | | | 9.880e−1 | −1.453e+1 | −1.040e+2 | 2.336e+3 | −6.422e+4 |
| $r_4 = -0.145$ | $d_4 = 0.1400$ | $N_4 = 1.5839$ | $v_4 = 30.9$ | −8.314e−1 | 2.250e+1 | 1.079e+2 | 8.030e+2 | −1.544e+5 |
| $r_5 = -0.313$ | $d_5 = 0.0232$ | | | −2.000 | 1.208e+1 | 2.318e+2 | −2.382e+3 | 3.962e+3 |
| $r_6 = 1.069$ | $d_6 = 0.3008$ | $N_6 = 1.5304$ | $v_6 = 56.0$ | −2.400 | −2.665 | 1.177 | 1.325e+3 | −4.679e+2 |
| $r_7 = -10.711$ | $d_7 = 0.4854$ | | | 0.000 | −3.766 | 2.001e+1 | −1.307e+2 | 2.808e+2 |
| $r_8 = \infty$ | | | | | | | | |

Focal Distance f = 1.00 mm  $f_1 = 0.52$ mm
Numerical Aperture $F_{no} = 2.80$  $f_2 = -0.66$ mm
Image Height 2Y = 1.26 mm  $f_3 = 1.85$ mm

TABLE 5

Fifth Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.436$ | $d_2 = 0.2526$ | $N_2 = 1.5304$ | $v_2 = 56.0$ | −1.000e−1 | 8.097e−2 | −2.794e+2 | 1.035e+4 | −1.996e+5 |
| $r_3 = -0.661$ | $d_3 = 0.0927$ | | | 2.700 | −1.353e+1 | 3.733 | −1.785e+3 | 2.917e+4 |
| $r_4 = -0.155$ | $d_4 = 0.1483$ | $N_4 = 1.5839$ | $v_4 = 30.9$ | −7.713e−1 | 1.314e+1 | 2.573e+2 | 2.568e+3 | −1.265e+5 |
| $r_5 = -0.329$ | $d_5 = 0.0183$ | | | −1.513 | 8.567 | 1.815e+2 | −2.887e+2 | −9.913e+3 |
| $r_6 = 1.247$ | $d_6 = 0.3183$ | $N_6 = 1.5304$ | $v_6 = 56.0$ | −1.131e+1 | −2.421 | 2.383 | 1.166e+2 | −4.622e+2 |

TABLE 5-continued

| $r_7 = -9.710$ | $d_7 = 0.4589$ | | 0.000 | -2.491 | 5.391 | -3.754e+1 | 2.666e+1 |
|---|---|---|---|---|---|---|---|
| $r_8 = \infty$ | | | | | | | |

Focal Distance f = 1.00 mm    $f_1 = 0.54$ mm
Numerical Aperture $F_{no} = 3.40$    $f_2 = -0.73$ mm
Image Height 2Y = 1.24 mm    $f_3 = 2.10$ mm

FIRST EMBODIMENT (A) The object-side radius of curvature $r_2$ of the first lens L1 is $r_2$=0.421 mm.
(B) The image-side radius of curvature $r_3$ of the first lens L1 is $r_3$=−0.689 mm.
(C) The interval $d_3$ between the first lens L1 and second lens L2 on the optical axis is $d_3$=0.0901 mm.
(D) The thickness $d_4$ at the center of the second lens L2 is $d_4$=0.1445 mm.
(E) The thickness $d_6$ at the center of the third lens L3 is $d_6$=0.3032 mm.
(F) The optical length L is L=1.282 mm.
(G) The image height (effective diagonal length of the image surface) 2Y is 2Y=1.30 mm.
(H) The back focus $b_f$ is $b_f$=0.482 mm.
(I) The aperture ratio (F number) $F_{NO}$ is $F_{NO}$=2.9.
Hence, $$|r_2/r_3|=|0.421/-0.689|=0.611, \quad (1\text{-}1)$$

$$d_3/f=0.0901/1.00=0.0901, \quad (1\text{-}2)$$

$$d_4/f=0.1445/1.00=0.1445, \quad (1\text{-}3)$$

$$d_6/f=0.3032/1.00=0.3032, \quad (1\text{-}4)$$

$$L/2Y=1.282/1.30=0.9862, \quad (1\text{-}5)$$

$$b_f/f=0.482/1.00=0.482, \text{ and} \quad (1\text{-}6)$$

$$F_{NO}=2.9. \quad (1\text{-}7)$$

Thus the lens system of the first embodiment satisfies all of the following conditional expressions (1-1) through (1-7).

$$0.55<|r_2/r_3|<0.70 \quad (1\text{-}1)$$

$$0.08<d_3/f<0.12 \quad (1\text{-}2)$$

$$0.140\leq d_4/f<0.270 \quad (1\text{-}3)$$

$$0.24<d_6/f<0.40 \quad (1\text{-}4)$$

$$0.90<L/2Y<1.10 \quad (1\text{-}5)$$

$$0.40<b_f/f<0.52 \quad (1\text{-}6)$$

$$2.70<F_{NO}<3.60 \quad (1\text{-}7)$$

Hereafter, the term "conditional expressions" will be used in the first invention to indicate these seven expressions (1-1) through (1-7).

As shown in Table 1, the diaphragm S1 is positioned at the intersection between a first surface (the object-side surface) of the first lens L1 and the optical axis. In other words, the diaphragm surface is a flat surface, and since $r_1$=∞ is shown in Table 1, this indicates that the diaphragm S1 is disposed in the position of the surface $r_1$. The numerical aperture (F number) is 2.90.

Figure 2:
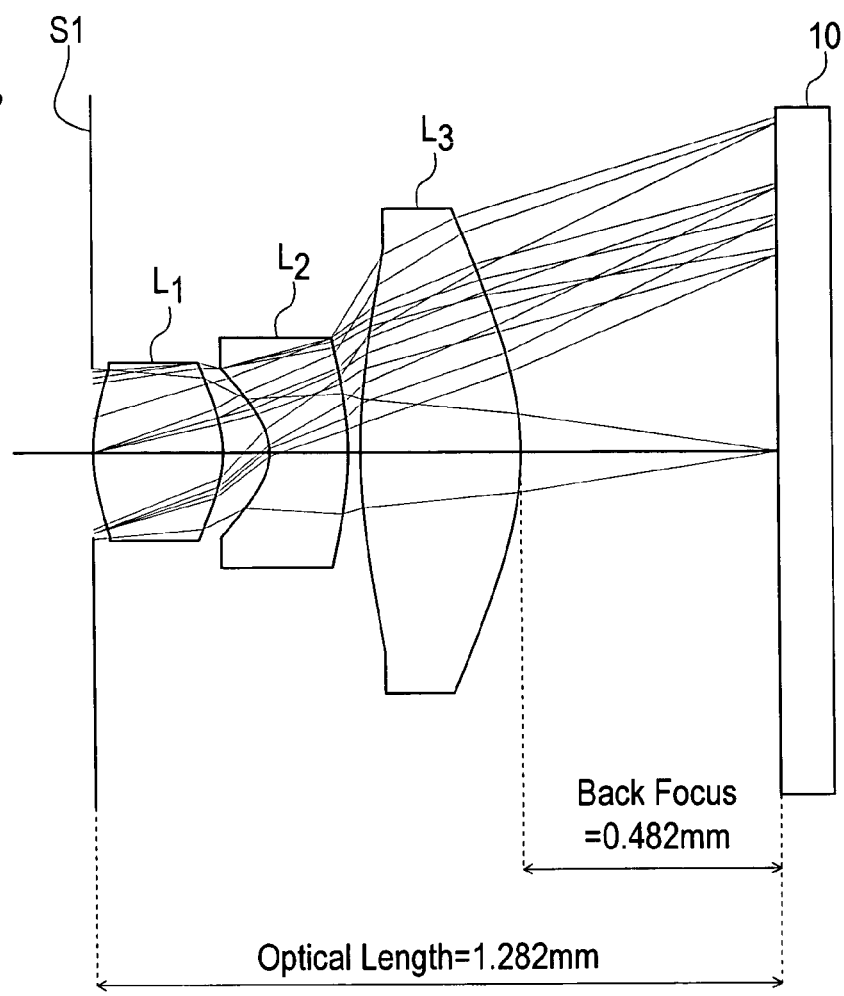
FIG. 2 is a sectional view of an imaging lens of a first embodiment.

A sectional view of the imaging lens of the first embodiment is shown in FIG. 2. The back focus in relation to a focal length of 1.00 mm is 0.482 mm, and hence a sufficient length is secured.

Figure 3:
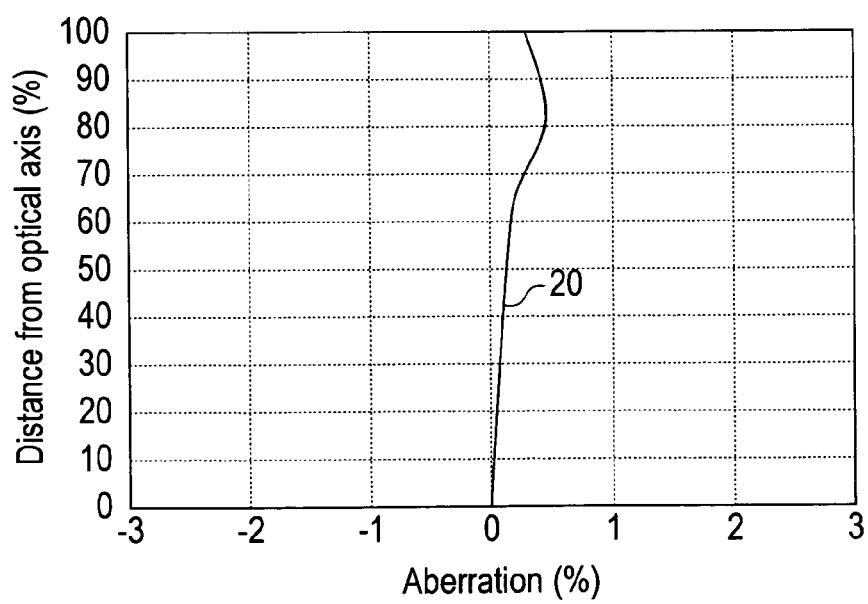
FIG. 3 is a view of distortion in the imaging lens of the first embodiment.
Figure 4:
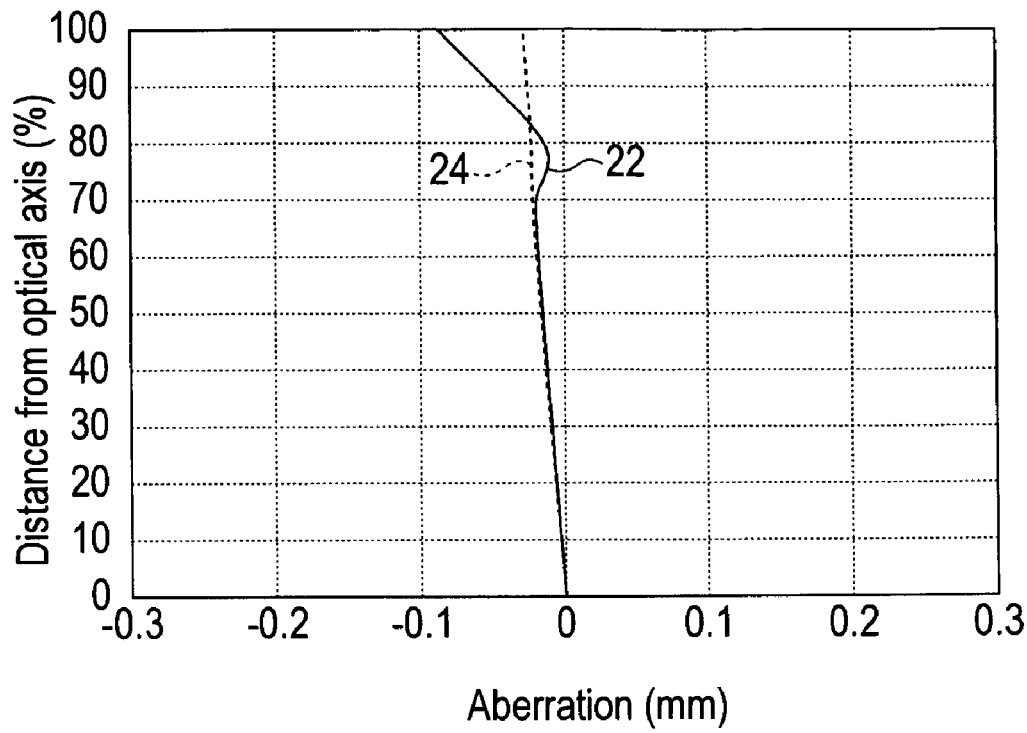
FIG. 4 is a view of astigmatism in the imaging lens of the first embodiment.
Figure 5:
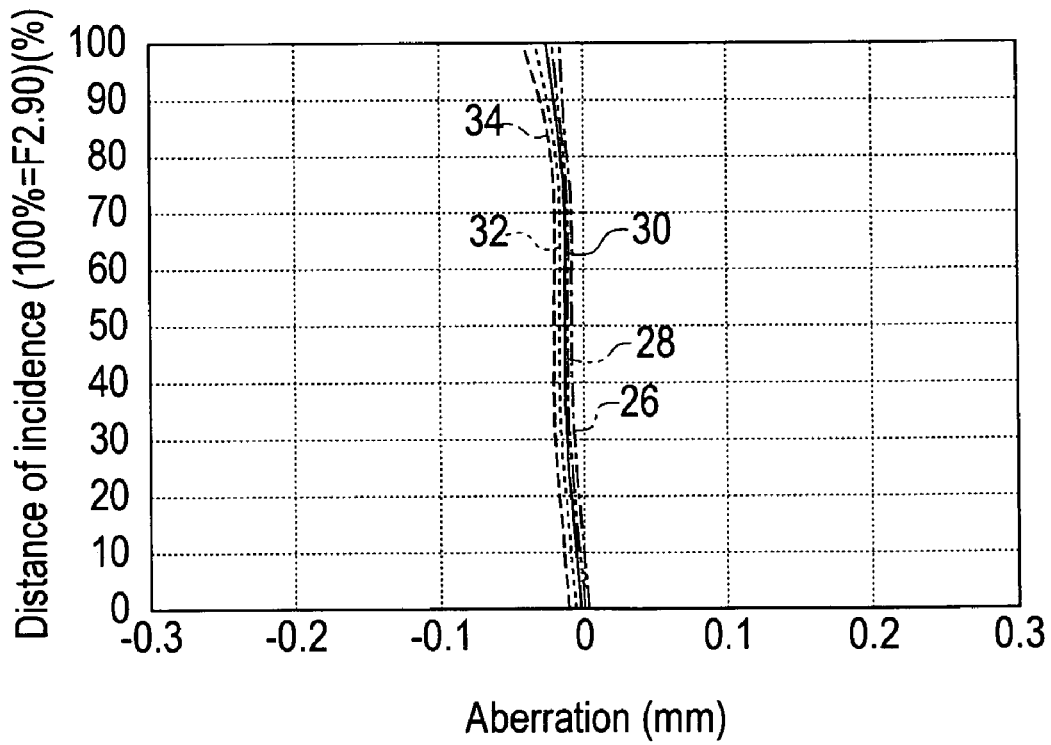
FIG. 5 is a view of chromatic and spherical aberration in the imaging lens of the first embodiment.

The distortion curve 20 shown in FIG. 3, the astigmatism curve (the aberration curve 22 relative to the meridional plane and the aberration curve 24 relative to the sagittal plane) shown in FIG. 4, and the chromatic and spherical aberration curve (the aberration curve 26 relative to the C line, the aberration curve 28 relative to the d line, the aberration curve 30 relative to the e line, the aberration curve 32 relative to the F line, and the aberration curve 34 relative to the g line) shown in FIG. 5 are respectively illustrated by graphs.

The ordinate of the aberration curves in FIGS. 3 and 4 illustrate the image height as a percentage of the distance from the optical axis. In FIGS. 3 and 4, 100% corresponds to 0.651 mm. The ordinate of the aberration curve in FIG. 5 indicates the incidence height h (F number), corresponding at its maximum to 2.9. The abscissa in FIG. 5 shows the magnitude of the aberration.

As regards distortion, the absolute value of the amount of aberration reaches a maximum of 0.4527% in an image height position of 80% (image height 0.5208 mm), and hence within an image height range of 0.651 mm and below, the absolute value of the aberration amount is held within 0.4527%.

As for astigmatism, the absolute value of the aberration amount on the meridional plane reaches a maximum of 0.0875 mm in an image height position of 100% (image height 0.651 mm), and hence within an image height range of 0.651 mm and below, the absolute value of the aberration amount is held within 0.0875 mm.

As for chromatic and spherical aberration, the absolute value of the aberration curve 34 relative to the g line reaches a maximum of 0.0421 mm at an incidence height h of 100%, and hence the absolute value of the aberration amount is held within 0.0421 mm.

SECOND EMBODIMENT (A) The object-side radius of curvature $r_2$ of the first lens L1 is $r_2$=0.436 mm.
(B) The image-side radius of curvature $r_3$ of the first lens L1 is $r_3$=−0.659 mm.
(C) The interval $d_3$ between the first lens L1 and second lens L2 on the optical axis is $d_3$=0.0925 mm.
(D) The thickness $d_4$ at the center of the second lens L2 is $d_4$=0.1479 mm.
(E) The thickness $d_6$ at the center of the third lens L3 is $d_6$=0.3173 mm.
(F) The optical length L is L=1.288 mm.
(G) The image height (effective diagonal length of the image surface) 2Y is 2Y=1.32 mm.
(H) The back focus $b_f$ is $b_f$=0.460 mm.
(I) The aperture ratio (F number) $F_{NO}$ is $F_{NO}$=2.78.

Hence, $$|r_2/r_3|=|0.436/-0.659|=0.6616, \quad (1\text{-}1)$$

$$d_3/f=0.0925/1.00=0.0925, \quad (1\text{-}2)$$

$$d_4/f=0.1479/1.00=0.1479, \quad (1\text{-}3)$$

$$d_6/f=0.3173/1.00=0.3173, \quad (1\text{-}4)$$

$$L/2Y=1.288/1.32=0.9758, \quad (1\text{-}5)$$

$$b_f/f=0.460/1.00=0.460, \text{ and} \quad (1\text{-}6)$$

$$F_{NO}=2.78. \quad (1\text{-}7)$$

Thus the lens system of the second embodiment satisfies all of the following conditional expressions (1-1) through (1-7).

$$0.55<|r_2/r_3|<0.70 \quad (1\text{-}1)$$

$$0.08<d_3/f<0.12 \quad (1\text{-}2)$$

$$0.140 \leq d_4/f<0.270 \quad (1\text{-}3)$$

$$0.24<d_6/f<0.40 \quad (1\text{-}4)$$

$$0.90<L/2Y<1.10 \quad (1\text{-}5)$$

$$0.40<b_f/f<0.52 \quad (1\text{-}6)$$

$$2.70<F_{NO}<3.60 \quad (1\text{-}7)$$

Hereafter, the term "conditional expressions" will be used in the first invention to indicate these seven expressions (1-1) through (1-7). As shown in Table 2, the diaphragm S1 is positioned at the intersection between the first surface (the object-side surface) of the first lens L1 and the optical axis. In other words, the diaphragm surface is a flat surface, and since $r_1=\infty$ is shown in Table 2, this indicates that the diaphragm S1 is disposed in the position of the surface $r_1$. The numerical aperture (F number) is 2.78.

Figure 6:
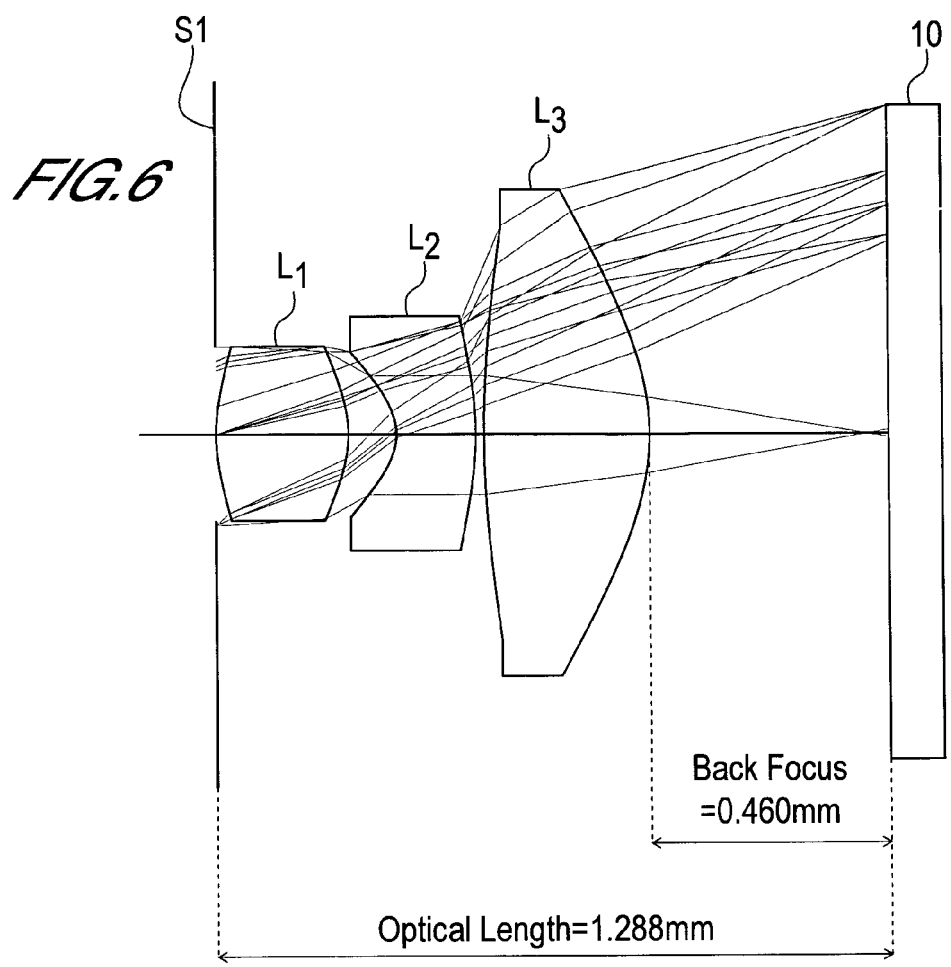
FIG. 6 is a sectional view of an imaging lens of a second embodiment.

A sectional view of the imaging lens of the second embodiment is shown in FIG. 6. The back focus in relation to a focal length of 1.00 mm is 0.460 mm, and hence a sufficient length is secured.

Figure 7:
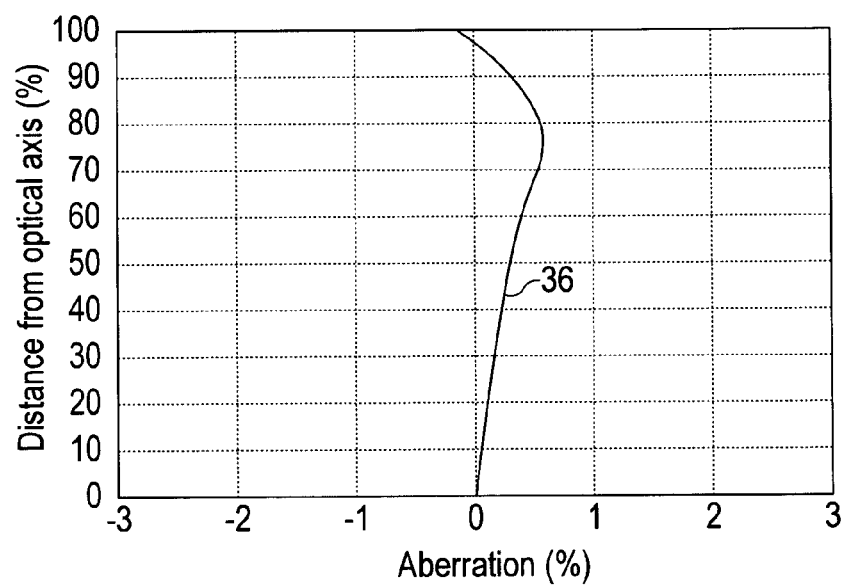
FIG. 7 is a view of distortion in the imaging lens of the second embodiment.
Figure 8:
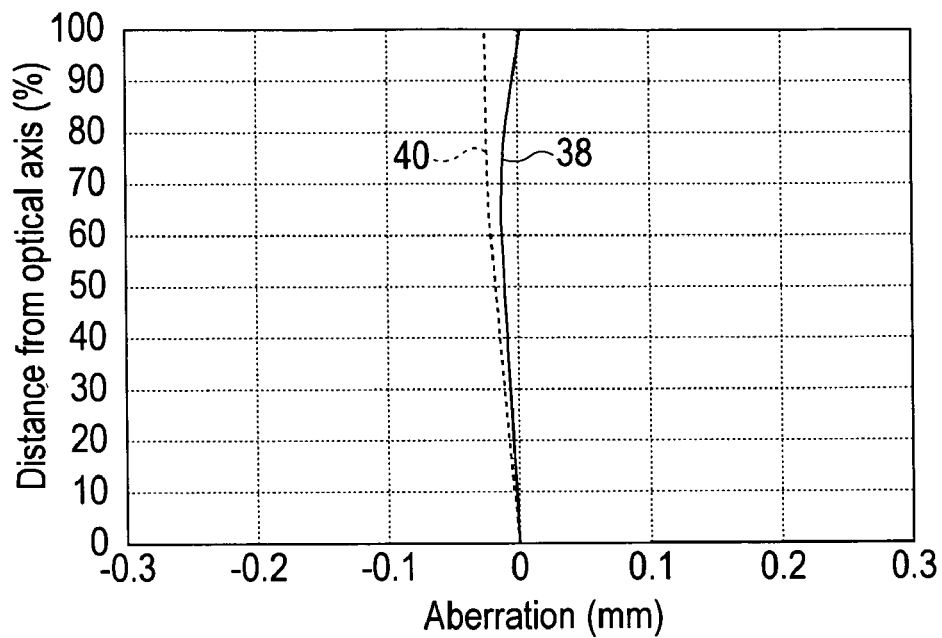
FIG. 8 is a view of astigmatism in the imaging lens of the second embodiment.
Figure 9:
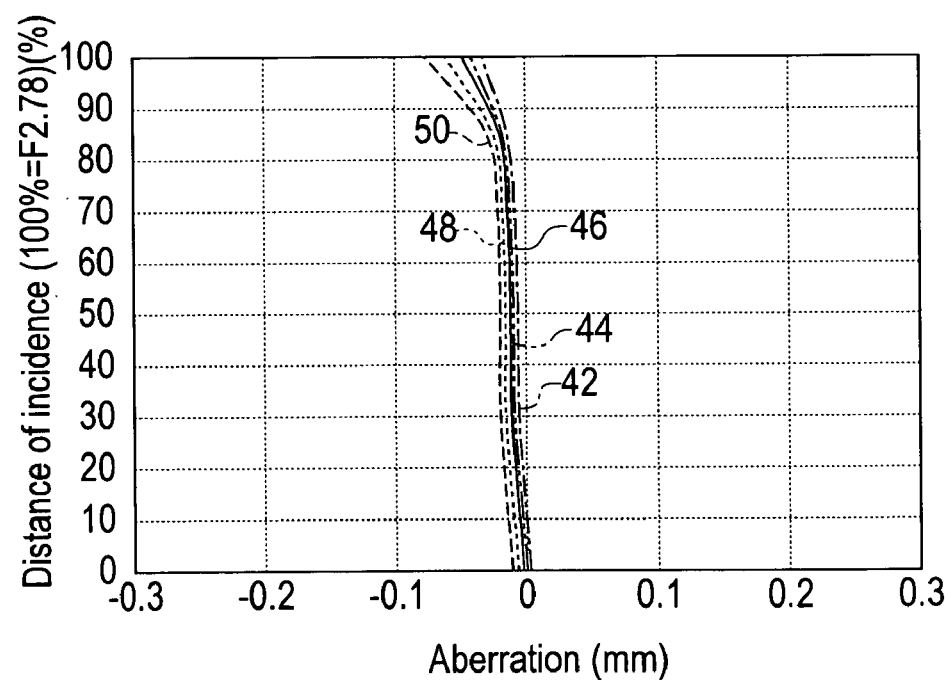
FIG. 9 is a view of chromatic and spherical aberration in the imaging lens of the second embodiment.

The distortion curve 36 shown in FIG. 7, the astigmatism curve (the aberration curve 38 relative to the meridional plane and the aberration curve 40 relative to the sagittal plane) shown in FIG. 8, and the chromatic and spherical aberration curve (the aberration curve 42 relative to the C line, the aberration curve 44 relative to the d line, the aberration curve 46 relative to the e line, the aberration curve 48 relative to the F line, and the aberration curve 50 relative to the g line) shown in FIG. 9 are respectively illustrated by graphs.

The ordinate of the aberration curves in FIGS. 7 and 8 illustrate the image height as a percentage of the distance from the optical axis. In FIGS. 7 and 8, 100% corresponds to 0.660 mm. The ordinate of the aberration curve in FIG. 9 indicates the incidence height h (F number), corresponding at its maximum to 2.78. The abscissa in FIG. 9 shows the magnitude of the aberration.

As regards distortion, the absolute value of the amount of aberration reaches a maximum of 0.5607% in an image height position of 80% (image height 0.5280 mm), and hence within an image height range of 0.660 mm and below, the absolute value of the aberration amount is held within 0.5607%.

As for astigmatism, the absolute value of the aberration amount on the meridional plane reaches a maximum of 0.0249 mm in an image height position of 100% (image height 0.660 mm), and hence within an image height range of 0.660 mm and below, the absolute value of the aberration amount is held within 0.0249 mm.

As for chromatic and spherical aberration, the absolute value of the aberration curve 50 relative to the g line reaches a maximum of 0.0764 mm at an incidence height h of 100%, and hence the absolute value of the aberration amount is held within 0.0764 mm.

THIRD EMBODIMENT (A) The object-side radius of curvature $r_2$ of the first lens L1 is $r_2=0.415$ mm.

(B) The image-side radius of curvature $r_3$ of the first lens L1 is $r_3=-0.671$ mm.

(C) The interval $d_3$ between the first lens L1 and second lens L2 on the optical axis is $d_3=0.0875$ mm.

(D) The thickness $d_4$ at the center of the second lens L2 is $d_4=0.1400$ mm.

(E) The thickness $d_6$ at the center of the third lens L3 is $d_6=0.2980$ mm.

(F) The optical length L is L=1.274 mm.

(G) The image height (effective diagonal length of the image surface) 2Y is 2Y=1.24 mm.

(H) The back focus $b_f$ is $b_f=0.488$ mm.

(I) The aperture ratio (F number) $F_{NO}$ is $F_{NO}=2.80$.

Hence, $$|r_2/r_3|=|0.415/-0.671|=0.6185, \quad (1\text{-}1)$$

$$d_3/f=0.0875/1.00=0.0875, \quad (1\text{-}2)$$

$$d_4/f=0.1400/1.00=0.1400, \quad (1\text{-}3)$$

$$d_6/f=0.2980/1.00=0.2980, \quad (1\text{-}4)$$

$$L/2Y=1.274/1.24=1.0274, \quad (1\text{-}5)$$

$$b_f/f=0.488/1.00=0.488, \text{ and} \quad (1\text{-}6)$$

$$F_{NO}=2.80. \quad (1\text{-}7)$$

Thus the lens system of the third embodiment satisfies all of the following conditional expressions (1-1) through (1-7).

$$0.55<|r_2/r_3|<0.70 \quad (1\text{-}1)$$

$$0.08<d_3/f<0.12 \quad (1\text{-}2)$$

$$0.140 \leq d_4/f<0.270 \quad (1\text{-}3)$$

$$0.24<d_6/f<0.40 \quad (1\text{-}4)$$

$$0.90<L/2Y<1.10 \quad (1\text{-}5)$$

$$0.40<b_f/f<0.52 \quad (1\text{-}6)$$

$$2.70<F_{NO}<3.60 \quad (1\text{-}7)$$

As shown in Table 3, the diaphragm S1 is positioned at the intersection between the first surface (the object-side surface) of the first lens L1 and the optical axis. In other words, the diaphragm surface is a flat surface, and since $r_1=\infty$ is shown in Table 3, this indicates that the diaphragm S1 is disposed in the position of the surface $r_1$. The numerical aperture (F number) is 2.80.

Figure 10:
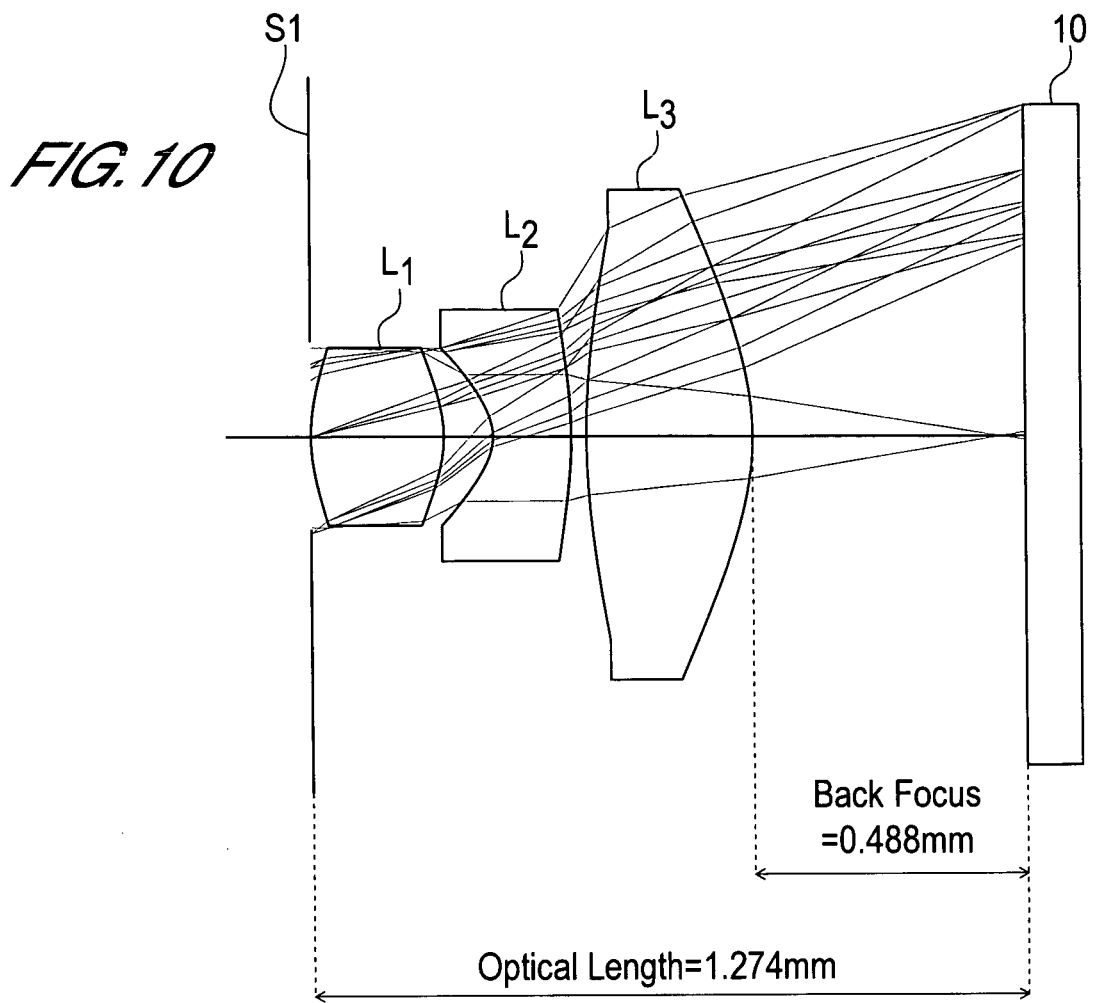
FIG. 10 is a sectional view of an imaging lens of a third embodiment.

A sectional view of the imaging lens of the third embodiment is shown in FIG. 10. The back focus in relation to a focal length of 1.00 mm is 0.488 mm, and hence a sufficient length is secured.

Figure 11:
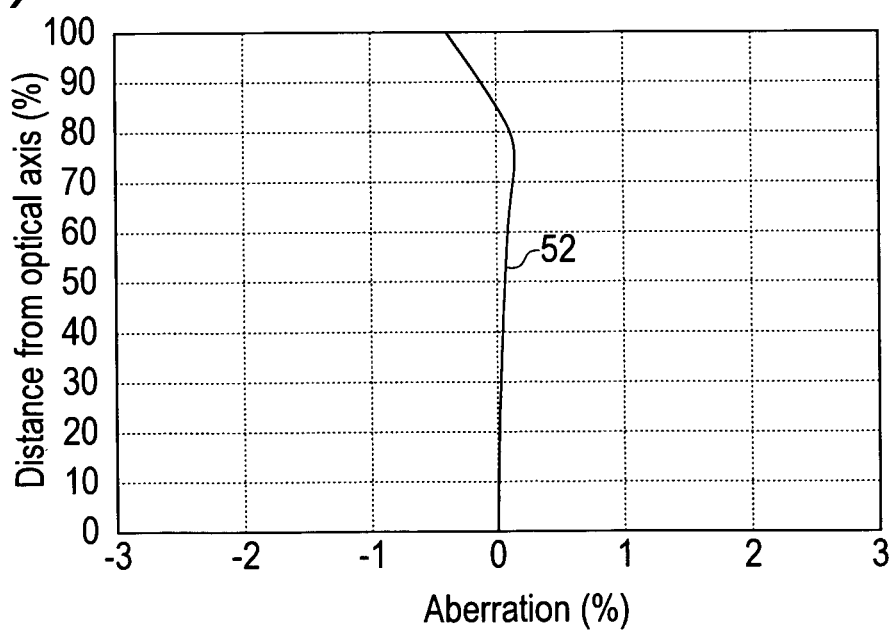
FIG. 11 is a view of distortion in the imaging lens of the third embodiment.
Figure 12:
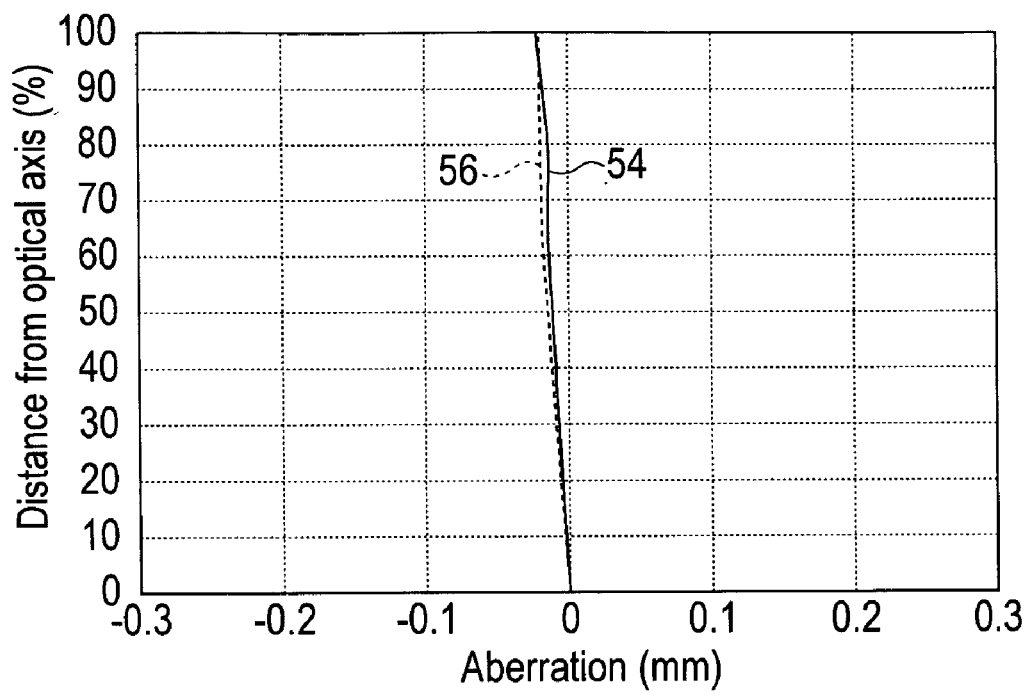
FIG. 12 is a view of astigmatism in the imaging lens of the third embodiment.
Figure 13:
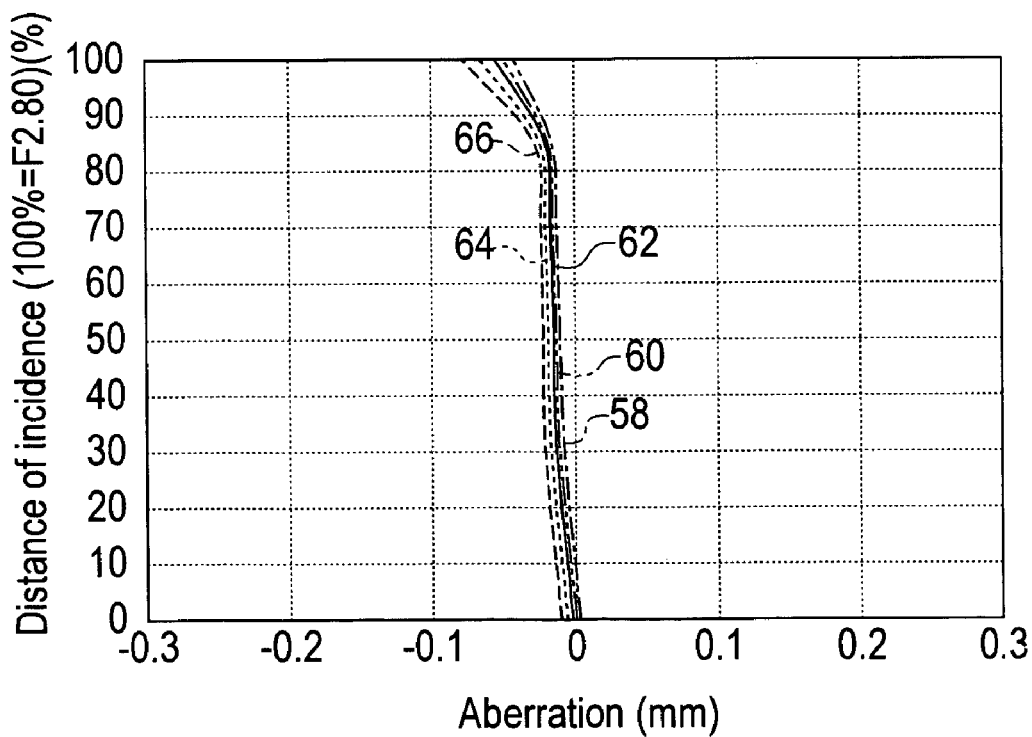
FIG. 13 is a view of chromatic and spherical aberration in the imaging lens of the third embodiment.

The distortion curve 52 shown in FIG. 11, the astigmatism curve (the aberration curve 54 relative to the meridional plane and the aberration curve 56 relative to the sagittal plane) shown in FIG. 12, and the chromatic and spherical aberration curve (the aberration curve 58 relative to the C line, the aberration curve 60 relative to the d line, the aberration curve 62 relative to the e line, the aberration curve 64 relative to the F line, and the aberration curve 66 relative to the g line) shown in FIG. 13 are respectively illustrated by graphs.

The ordinate of the aberration curves in FIGS. 11 and 12 illustrate the image height as a percentage of the distance from the optical axis. In FIGS. 11 and 12, 100% corresponds to 0.620 mm. The ordinate of the aberration curve in FIG. 13 indicates the incidence height h (F number), corresponding at its maximum to 2.80. The abscissa in FIG. 13 shows the magnitude of the aberration.

As regards distortion, the absolute value of the amount of aberration reaches a maximum of 0.3991% in an image height position of 100% (image height 0.620 mm), and hence within an image height range of 0.620 mm and below, the absolute value of the aberration amount is held within 0.3991%.

As for astigmatism, the absolute value of the aberration amount on the meridional plane reaches a maximum of 0.0221 mm in an image height position of 100% (image height 0.620 mm), and hence within an image height range of 0.620 mm and below, the absolute value of the aberration amount is held within 0.0221 mm.

As for chromatic and spherical aberration, the absolute value of the aberration curve 66 relative to the g line reaches a maximum of 0.0781 mm at an incidence height h of 100%, and hence the absolute value of the aberration amount is held within 0.0781 mm.

FOURTH EMBODIMENT (A) The object-side radius of curvature $r_2$ of the first lens L1 is $r_2$=0.416 mm.
(B) The image-side radius of curvature $r_3$ of the first lens L1 is $r_3$=−0.671 mm.
(C) The interval $d_3$ between the first lens L1 and second lens L2 on the optical axis is $d_3$=0.0875 mm.
(D) The thickness $d_4$ at the center of the second lens L2 is $d_4$=0.1400 mm.
(E) The thickness $d_6$ at the center of the third lens L3 is $d_6$=0.3008 mm.
(F) The optical length L is L=1.274 mm.
(G) The image height (effective diagonal length of the image surface) 2Y is 2Y=1.26 mm.
(H) The back focus $b_f$ is $b_f$=0.485 mm.
(I) The aperture ratio (F number) $F_{NO}$ is $F_{NO}$=2.80.

Hence, $|r_2/r_3|=|0.416/-0.671|=0.6200$, (1-1)

$d_3/f=0.0875/1.00=0.0875$, (1-2)

$d_4/f=0.1400/1.00=0.1400$, (1-3)

$d_6/f=0.3008/1.00=0.3008$, (1-4)

$L/2Y=1.274/1.26=1.0111$, (1-5)

$b_f/f=0.485/1.00=0.485$, and (1-6)

$F_{NO}$=2.80. (1-7)

Thus the lens system of the fourth embodiment satisfies all of the following conditional expressions (1-1) through (1-7).

$0.55<|r_2/r_3|<0.70$ (1-1)

$0.08<d_3/f<0.12$ (1-2)

$0.140 \leq d_4/f<0.270$ (1-3)

$0.24<d_6/f<0.40$ (1-4)

$0.90<L/2Y<1.10$ (1-5)

$0.40<b_f/f<0.52$ (1-6)

$2.70<F_{NO}<3.60$ (1-7)

As shown in Table 4, the diaphragm S1 is positioned at the intersection between the first surface (the object-side surface) of the first lens L1 and the optical axis. In other words, the diaphragm surface is a flat surface, and since $r_1=\infty$ is shown in Table 4, this indicates that the diaphragm S1 is disposed in the position of the surface $r_1$. The numerical aperture (F number) is 2.80.

Figure 14:
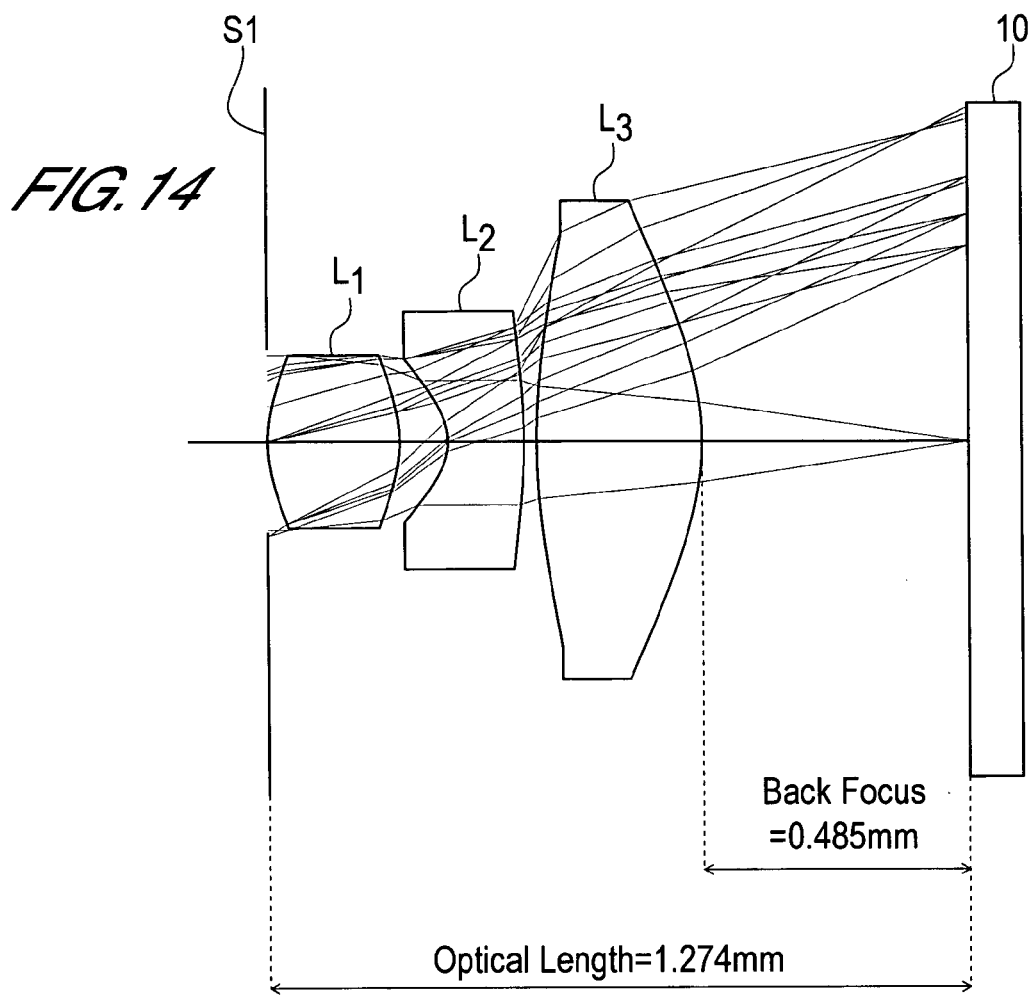
FIG. 14 is a sectional view of an imaging lens of a fourth embodiment.

A sectional view of the imaging lens of the fourth embodiment is shown in FIG. 14. The back focus in relation to a focal length of 1.00 mm is 0.485 mm, and hence a sufficient length is secured.

Figure 15:
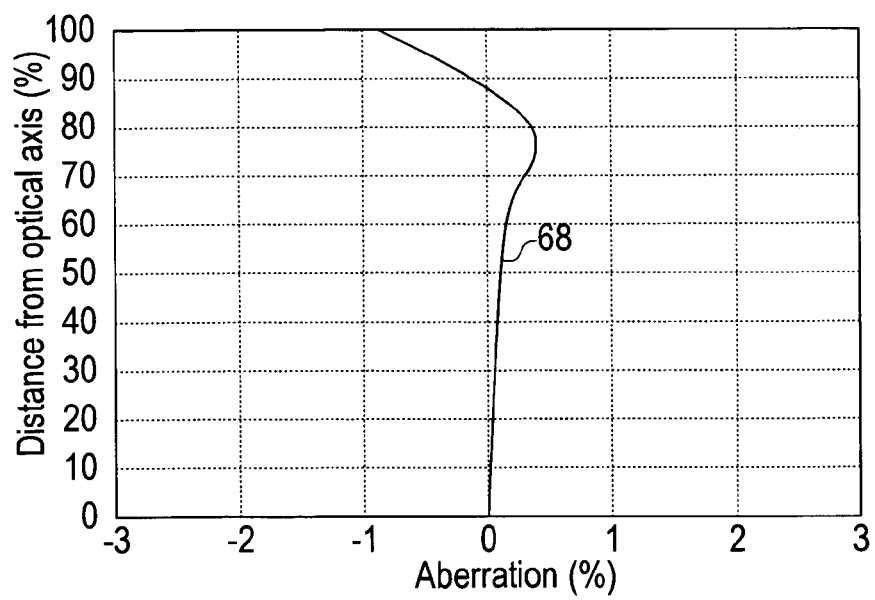
FIG. 15 is a view of distortion in the imaging lens of the fourth embodiment.
Figure 16:
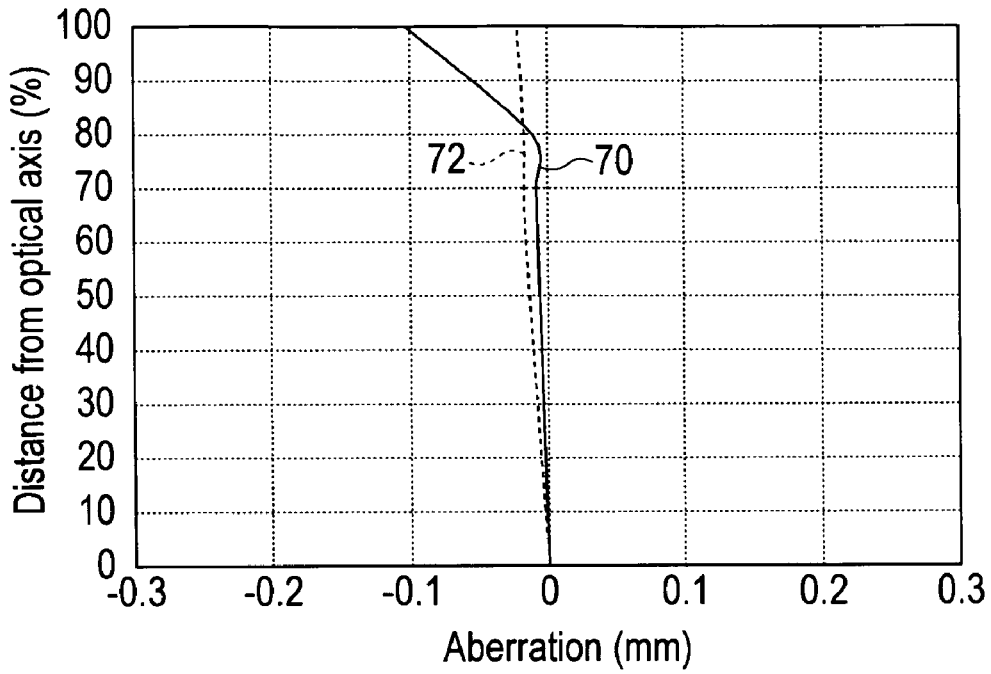
FIG. 16 is a view of astigmatism in the imaging lens of the fourth embodiment.
Figure 17:
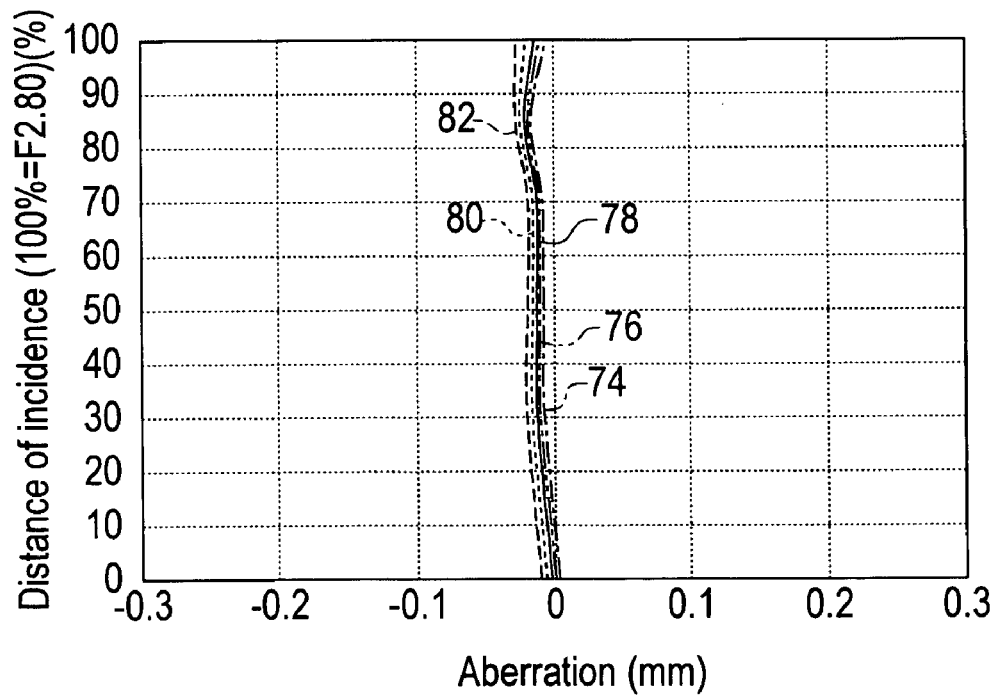
FIG. 17 is a view of chromatic and spherical aberration in the imaging lens of the fourth embodiment.

The distortion curve 68 shown in FIG. 15, the astigmatism curve (the aberration curve 70 relative to the meridional plane and the aberration curve 72 relative to the sagittal plane) shown in FIG. 16, and the chromatic and spherical aberration curve (the aberration curve 74 relative to the C line, the aberration curve 76 relative to the d line, the aberration curve 78 relative to the e line, the aberration curve 80 relative to the F line, and the aberration curve 82 relative to the g line) shown in FIG. 17 are respectively illustrated by graphs.

The ordinate of the aberration curves in FIGS. 15 and 16 illustrate the image height as a percentage of the distance from the optical axis. In FIGS. 15 and 16, 100% corresponds to 0.630 mm. The ordinate of the aberration curve in FIG. 17 indicates the incidence height h (F number), corresponding at its maximum to 2.80. The abscissa in FIG. 17 shows the magnitude of the aberration.

As regards distortion, the absolute value of the amount of aberration reaches a maximum of 0.8777% in an image height position of 100% (image height 0.630 mm), and hence within an image height range of 0.630 mm and below, the absolute value of the aberration amount is held within 0.8777%.

As for astigmatism, the absolute value of the aberration amount on the meridional plane reaches a maximum of 0.1033 mm in an image height position of 100% (image height 0.630 mm), and hence within an image height range of 0.630 mm and below, the absolute value of the aberration amount is held within 0.1033 mm.

As for chromatic and spherical aberration, the absolute value of the aberration curve 82 relative to the g line reaches a maximum of 0.0278 mm at an incidence height h of 100%, and hence the absolute value of the aberration amount is held within 0.0278 mm.

FIFTH EMBODIMENT (A) The object-side radius of curvature $r_2$ of the first lens L1 is $r_2$=0.436 mm.
(B) The image-side radius of curvature $r_3$ of the first lens L1 is $r_3$=−0.661 mm.
(C) The interval $d_3$ between the first lens L1 and second lens L2 on the optical axis is $d_3$=0.0927 mm.
(D) The thickness $d_4$ at the center of the second lens L2 is $d_4$=0.1483 mm.
(E) The thickness $d_6$ at the center of the third lens L3 is $d_6$=0.3183 mm.
(F) The optical length L is L=1.289 mm.
(G) The image height (effective diagonal length of the image surface) 2Y is 2Y=1.24 mm.
(H) The back focus $b_f$ is $b_f$=0.459 mm.
(I) The aperture ratio (F number) $F_{NO}$ is $F_{NO}$=3.40.

Hence, $|r_2/r_3|$=|0.436/−0.661|=0.6596,  (1-1)

$d_3/f$=0.0927/1.00=0.0927,  (1-2)

$d_4/f$=0.1483/1.00=0.1483,  (1-3)

$d_6/f$=0.3183/1.00=0.3183,  (1-4)

$L/2Y$=1.289/1.24=1.0395,  (1-5)

$b_f/f$=0.459/1.00=0.459, and  (1-6)

$F_{NO}$=3.40.  (1-7)

Thus the lens system of the fifth embodiment satisfies all of the following conditional expressions (1-1) through (1-7).

$0.55 < |r_2/r_3| < 0.70$  (1-1)

$0.08 < d_3/f < 0.12$  (1-2)

$0.140 \leq d_4/f < 0.270$  (1-3)

$0.24 < d_6/f < 0.40$  (1-4)

$0.90 < L/2Y < 1.10$  (1-5)

$0.40 < b_f/f < 0.52$  (1-6)

$2.70 < F_{NO} < 3.60$  (1-7)

As shown in Table 5, the diaphragm S1 is positioned at the intersection between the first surface (the object-side surface) of the first lens L1 and the optical axis. In other words, the diaphragm surface is a flat surface, and since $r_1=\infty$ is shown in Table 5, this indicates that the diaphragm S1 is disposed in the position of the surface $r_1$. The numerical aperture (F number) is 3.40.

Figure 18:
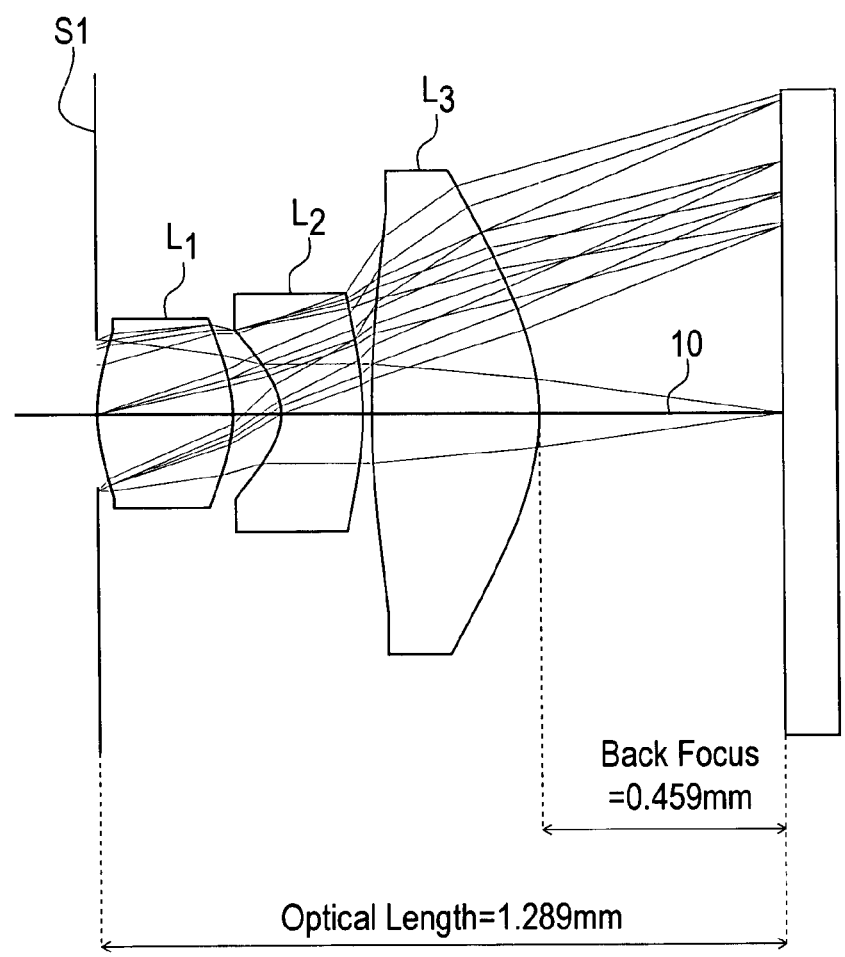
FIG. 18 is a sectional view of an imaging lens of a fifth embodiment.

A sectional view of the imaging lens of the fifth embodiment is shown in FIG. 18. The back focus in relation to a focal length of 1.00 mm is 0.459 mm, and hence a sufficient length is secured.

Figure 19:
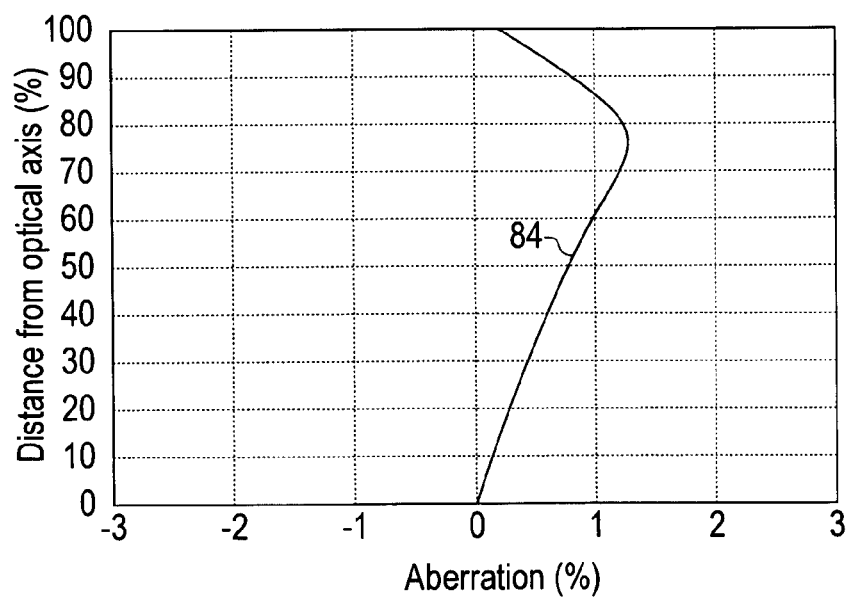
FIG. 19 is a view of distortion in the imaging lens of the fifth embodiment.
Figure 20:
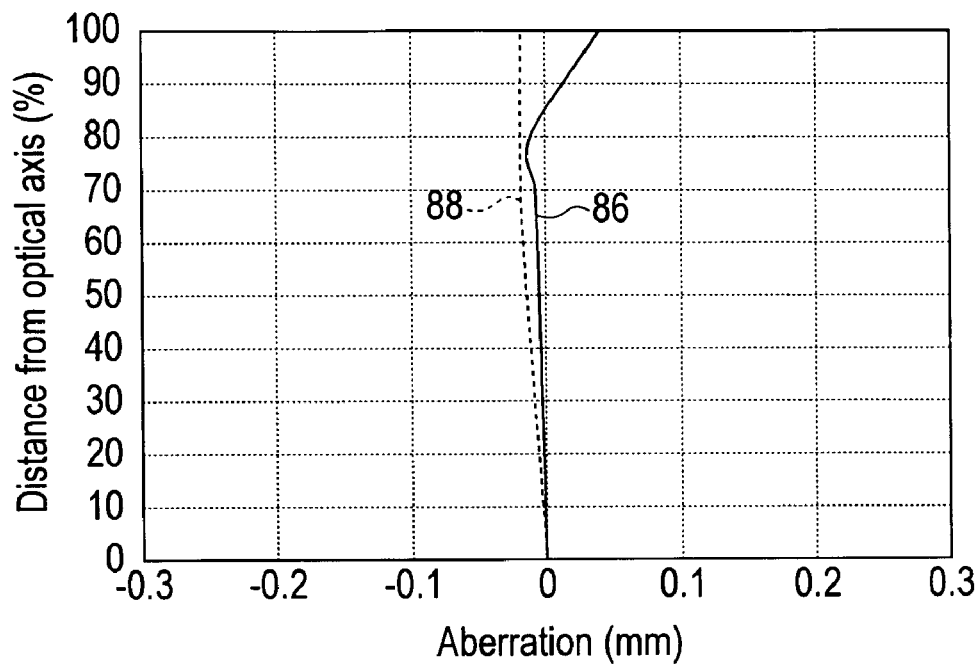
FIG. 20 is a view of astigmatism in the imaging lens of the fifth embodiment.
Figure 21:
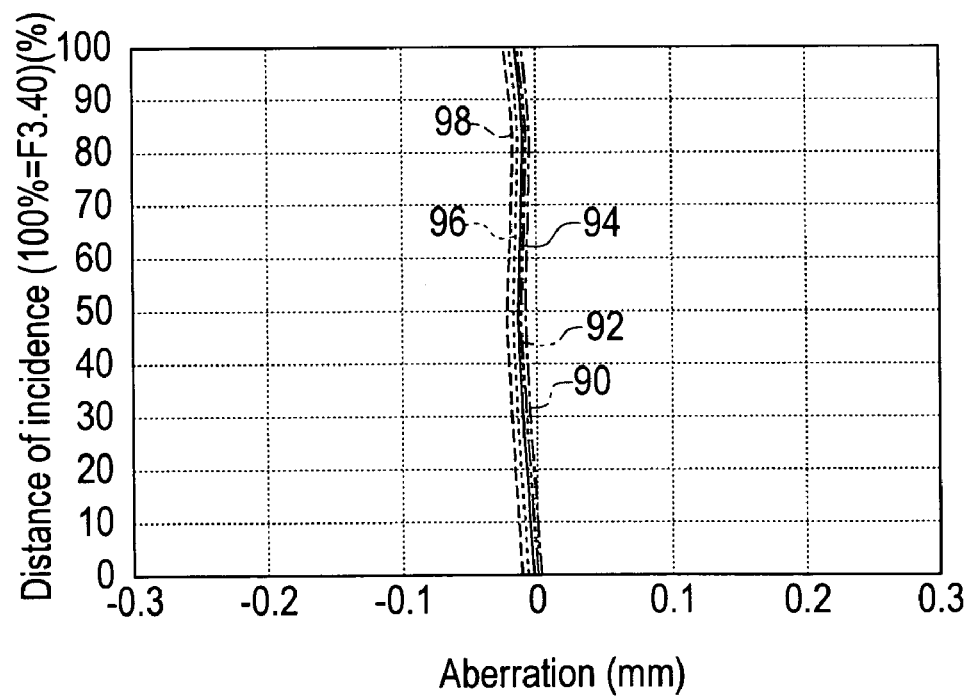
FIG. 21 is a view of chromatic and spherical aberration in the imaging lens of the fifth embodiment.

The distortion curve 84 shown in FIG. 19, the astigmatism curve (the aberration curve 86 relative to the meridional plane and the aberration curve 88 relative to the sagittal plane) shown in FIG. 20, and the chromatic and spherical aberration curve (the aberration curve 90 relative to the C line, the aberration curve 92 relative to the d line, the aberration curve 94 relative to the e line, the aberration curve 96 relative to the F line, and the aberration curve 98 relative to the g line) shown in FIG. 21 are respectively illustrated by graphs.

The ordinate of the aberration curves in FIGS. 19 and 20 illustrate the image height as a percentage of the distance from the optical axis. In FIGS. 19 and 20, 100% corresponds to 0.620 mm. The ordinate of the aberration curve in FIG. 21 indicates the incidence height h (F number), corresponding at its maximum to 3.40. The abscissa in FIG. 21 shows the magnitude of the aberration.

As regards distortion, the absolute value of the amount of aberration reaches a maximum of 1.2363% in an image height position of 80% (image height 0.496 mm), and hence within an image height range of 0.620 mm and below, the absolute value of the aberration amount is held within 1.2363%.

As for astigmatism, the absolute value of the aberration amount on the meridional plane reaches a maximum of 0.0404 mm in an image height position of 100% (image height 0.620 mm), and hence within an image height range of 0.620 mm and below, the absolute value of the aberration amount is held within 0.0404 mm.

As for chromatic and spherical aberration, the absolute value of the aberration curve 90 relative to the g line reaches a maximum of 0.0232 mm at an incidence height h of 100%, and hence the absolute value of the aberration amount is held within 0.0232 mm.

[Second Invention]

As shown in FIG. 22, an imaging lens of the second invention comprises a first lens L1, an aperture diaphragm S2, a second lens L2, and a third lens L3, wherein the first lens L1, the aperture diaphragm S2, the second lens L2, and the third lens L3 are arranged in succession from an object side toward an image side. The radius of curvature (mm units), lens surface interval (mm units), lens material refractive index, lens material Abbe number, focal distance, numerical aperture, aspherical surface coefficient, and so on of the lenses constituting the sixth through tenth embodiments of the imaging lens according to the second invention are listed in Tables 6 through 10, respectively.

TABLE 6

| | | | | Sixth Embodiment | | | | |
|---|---|---|---|---|---|---|---|---|
| Radius of | | Refractive | Abbe | Aspherical Surface Coefficient | | | | |
| Curvature($r_i$) | Interval($d_i$) | Index($N_i$) | Number($v_i$) | K | $A_0$ | $B_0$ | $C_0$ | $D_0$ |
| $r_1$ = 0.421 | $d_1$ = 0.2394 | $N_1$ = 1.5304 | $v_1$ = 56.0 | −1.400e−1 | 3.868e−1 | −3.459e+2 | 1.545e+4 | −3.294e+5 |
| $r_2$ = −0.689 | $d_2$ = 0.0000 | | | 2.800 | −1.486e+1 | −2.430e+1 | −1.772e+3 | 4.245e+3 |
| $r_3$ = ∞ | $d_3$ = 0.0901 | | | | | | | |
| $r_4$ = −0.149 | $d_4$ = 0.1445 | $N_4$ = 1.5839 | $v_4$ = 30.9 | −7.939e−1 | 1.776e+1 | 1.357e+2 | 6.271e+2 | −1.214e+5 |
| $r_5$ = −0.320 | $d_5$ = 0.0227 | | | −1.888 | 1.039e+1 | 2.019e+2 | −1.561e+3 | −2.012e+3 |
| $r_6$ = 1.084 | $d_6$ = 0.3032 | $N_6$ = 1.5304 | $v_6$ = 56.0 | −4.340 | −2.197 | 1.847 | 1.010e+2 | −3.599e+2 |

TABLE 6-continued

| | | | | | | | |
|---|---|---|---|---|---|---|---|
| $r_7 = -10.754$ | $d_7 = 0.4817$ | | | 3.000e−2 | −3.222 | 1.338e+1 | −8.214e+1 | 1.855e+2 |
| $r_8 = \infty$ | | | | | | | |

Focal Distance f = 1.00 mm  $f_1$ = 0.53 mm
Numerical Aperture $F_{no}$ = 2.90  $f_2$ = −0.69 mm
Image Height 2Y = 1.30 mm  $f_3$ = 1.87 mm

TABLE 7

Seventh Embodiment

| Radius of Curvature($r_i$) | Interval($d_i$) | Refractive Index($N_i$) | Abbe Number($v_i$) | Aspherical Surface Coefficient | | | |
|---|---|---|---|---|---|---|---|
| | | | | K | $A_0$ | $B_0$ | $C_0$ | $D_0$ |
| $r_1 = 0.436$ | $d_1 = 0.2519$ | $N_1 = 1.5304$ | $v_1 = 56.0$ | −1.530e−1 | 6.923e−2 | −2.956e+2 | 1.232e+4 | −2.551e+5 |
| $r_2 = -0.659$ | $d_2 = 0.0000$ | | | 2.930 | −1.345e+1 | −4.422e+1 | −1.213e+3 | 2.624e+4 |
| $r_3 = \infty$ | $d_3 = 0.0925$ | | | | | | | |
| $r_4 = -0.155$ | $d_4 = 0.1479$ | $N_4 = 1.5839$ | $v_4 = 30.9$ | −7.668e−1 | 1.423e+1 | 1.123e+2 | 3.226e+3 | −9.360e+4 |
| $r_5 = -0.328$ | $d_5 = 0.0187$ | | | −1.620 | 9.406 | 1.826e+2 | −1.289e+3 | 2.257e+2 |
| $r_6 = 1.244$ | $d_6 = 0.3173$ | $N_6 = 1.5304$ | $v_6 = 56.0$ | −1.165 | −2.194 | −1.459 | 8.371e+1 | −2.475e+2 |
| $r_7 = -9.759$ | $d_7 = 0.4596$ | | | 0.000 | −2.792 | 9.039 | −5.070e+1 | 5.267e+1 |
| $r_8 = \infty$ | | | | | | | | |

Focal Distance f = 1.00 mm  $f_1$ = 0.54 mm
Numerical Aperture $F_{no}$ = 2.78  $f_2$ = −0.73 mm
Image Height 2y = 1.32 mm  $f_3$ = 2.10 mm

TABLE 8

Eighth Embodiment

| Radius of Curvature($r_i$) | Interval($d_i$) | Refractive Index($N_i$) | Abbe Number($v_i$) | Aspherical Surface Coefficient | | | |
|---|---|---|---|---|---|---|---|
| | | | | K | $A_0$ | $B_0$ | $C_0$ | $D_0$ |
| $r_1 = 0.415$ | $d_1 = 0.2376$ | $N_1 = 1.5304$ | $v_1 = 56.0$ | −1.640e−2 | 4.209e−1 | −3.987e+2 | 1.892e+4 | −4.257e+5 |
| $r_2 = -0.671$ | $d_2 = 0.0000$ | | | 2.900 | −1.614e+1 | −2.802e+1 | −2.156e+3 | 5.594e+3 |
| $r_3 = \infty$ | $d_3 = 0.0875$ | | | | | | | |
| $r_4 = -0.144$ | $d_4 = 0.1400$ | $N_4 = 1.5839$ | $v_4 = 30.9$ | −7.940e−1 | 1.931e+1 | 1.576e+2 | 7.681e+2 | −1.574e+5 |
| $r_5 = -0.312$ | $d_5 = 0.0230$ | | | −1.887 | 1.133e+1 | 2.326e+2 | −1.901e+3 | −2.594e+3 |
| $r_6 = 1.068$ | $d_6 = 0.2980$ | $N_6 = 1.5304$ | $v_6 = 56.0$ | −4.334 | −2.394 | 2.124 | 1.213e+3 | −4.526e+2 |
| $r_7 = -10.702$ | $d_7 = 0.4876$ | | | 0.000 | −3.455 | 1.548e+1 | −1.027e+2 | 2.322e+2 |
| $r_8 = \infty$ | | | | | | | | |

Focal Distance f = 1.00 mm  $f_1$ = 0.52 mm
Numerical Aperture $F_{no}$ = 2.80  $f_2$ = −0.66 mm
Image Height 2Y = 1.24 mm  $f_3$ = 1.85 mm

TABLE 9

Ninth Embodiment

| Radius of Curvature($r_i$) | Interval($d_i$) | Refractive Index($N_i$) | Abbe Number($v_i$) | Aspherical Surface Coefficient | | | |
|---|---|---|---|---|---|---|---|
| | | | | K | $A_0$ | $B_0$ | $C_0$ | $D_0$ |
| $r_1 = 0.416$ | $d_1 = 0.2379$ | $N_1 = 1.5304$ | $v_1 = 56.0$ | 5.120e−2 | 6.774e−1 | −4.278e+2 | 1.951e+4 | −3.919e+5 |
| $r_2 = -0.671$ | $d_2 = 0.0000$ | | | 9.880e−1 | −1.453e+1 | −1.040e+2 | 2.336e+3 | −6.422e+4 |
| $r_3 = \infty$ | $d_3 = 0.0875$ | | | | | | | |
| $r_4 = -0.145$ | $d_4 = 0.1400$ | $N_4 = 1.5839$ | $v_4 = 30.9$ | −8.314e−1 | 2.250e+1 | 1.079e+2 | 8.030e+2 | −1.544e+5 |
| $r_5 = -0.313$ | $d_5 = 0.0232$ | | | −2.000 | 1.208e+1 | 2.318e+2 | −2.382e+3 | 3.962e+3 |
| $r_6 = 1.069$ | $d_6 = 0.3008$ | $N_6 = 1.5304$ | $v_6 = 56.0$ | −2.400 | −2.665 | 1.177 | 1.325e+2 | −4.679e+2 |
| $r_7 = -10.711$ | $d_7 = 0.4854$ | | | 0.000 | −3.766 | 2.001e+1 | −1.307e+2 | 2.808e+2 |
| $r_8 = \infty$ | | | | | | | | |

Focal Distance f = 1.00 mm  $f_1$ = 0.52 mm
Numerical Aperture $F_{no}$ = 2.80  $f_2$ = −0.66 mm
Image Height 2Y = 1.26 mm  $f_3$ = 1.85 mm

TABLE 10

Tenth Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1$ = 0.436 | $d_1$ = 0.2526 | $N_1$ = 1.5304 | $v_1$ = 56.0 | −1.000e−1 | 8.097e−2 | −2.794e+2 | 1.035e+4 | −1.996e+5 |
| $r_2$ = −0.661 | $d_2$ = 0.0000 | | | 2.700 | −1.353e+1 | 3.733 | −1.785e+3 | 2.917e+4 |
| $r_3$ = ∞ | $d_3$ = 0.0927 | | | | | | | |
| $r_4$ = −0.155 | $d_4$ = 0.1483 | $N_4$ = 1.5839 | $v_4$ = 30.9 | −7.713e−1 | 1.314e+1 | 2.573e+2 | 2.568e+3 | −1.265e+5 |
| $r_5$ = −0.329 | $d_5$ = 0.0183 | | | −1.513 | 8.567 | 1.815e+2 | −2.887e+2 | −9.913e+3 |
| $r_6$ = 1.247 | $d_6$ = 0.3183 | $N_6$ = 1.5304 | $v_6$ = 56.0 | −1.131e+1 | −2.421 | 2.383 | 1.166e+2 | −4.622e+2 |
| $r_7$ = −9.710 | $d_7$ = 0.4589 | | | 0.000 | −2.491 | 5.391 | −3.754e+1 | 2.666e+1 |
| $r_8$ = ∞ | | | | | | | | |

Focal Distance f = 1.00 mm    $f_1$ = 0.54 mm
Numerical Aperture $F_{no}$ = 3.40    $f_2$ = −0.73 mm
Image Height 2Y = 1.24 mm    $f_3$ = 2.10 mm

SIXTH EMBODIMENT (A) The object-side radius of curvature $r_1$ of the first lens L1 is $r_1$=0.421 mm.

(B) The image-side radius of curvature $r_2$ of the first lens L1 is $r_2$=−0.689 mm.

(C) The interval $D_3$ between the first lens L1 and second lens L2 on the optical axis is $D_3$=0.0901 mm, where $D_3$ is equal to $d_2+d_3$ in FIG. 22; here, $d_2$=0 mm.

(D) The thickness $d_4$ at the center of the second lens L2 is $d_4$=0.1445 mm.

(E) The thickness $d_6$ at the center of the third lens L3 is $d_6$=0.3032 mm.

(F) The optical length L is L=1.282 mm.

(G) The image height (effective diagonal length of the image surface) 2Y is 2Y=1.30 mm.

(H) The back focus $b_f$ is $b_f$=0.482 mm.

(I) The aperture ratio (F number) $F_{NO}$ is $F_{NO}$=2.9.

Hence, $|r_1/r_2|=|0.421/−0.689|=0.611$,     (2-1)

$D_3/f=0.0901/1.00=0.0901$,     (2-2)

$d_4/f=0.1445/1.00=0.1445$,     (2-3)

$d_6/f=0.3032/1.00=0.3032$,     (2-4)

$L/2Y=1.282/1.30=0.9862$,     (2-5)

$b_f/f=0.482/1.00=0.482$, and     (2-6)

$F_{NO}=2.90$.     (2-7)

Thus the lens system of the sixth embodiment satisfies all of the following conditional expressions (2-1) through (2-7).

$0.55<|r_1/r_2|<0.70$     (2-1)

$0.08<D_3/f<0.12$     (2-2)

$0.140 \leq d_4/f<0.270$     (2-3)

$0.24<d_6/f<0.40$     (2-4)

$0.90<L/2Y<1.10$     (2-5)

$0.40<b_f/f<0.52$     (2-6)

$2.70<F_{NO}<3.60$     (2-7)

Hereafter, the term "conditional expressions" will be used in the second invention to indicate these seven expressions (2-1) through (2-7).

As shown in Table 6, the diaphragm S2 is positioned between the first lens L1 and the second lens L2. In other words, the diaphragm surface is a flat surface, and since $r_3=\infty$ is shown in Table 6, this indicates that the diaphragm S2 is disposed in the position of the surface $r_3$. The numerical aperture (F number) is 2.9.

Figure 23:
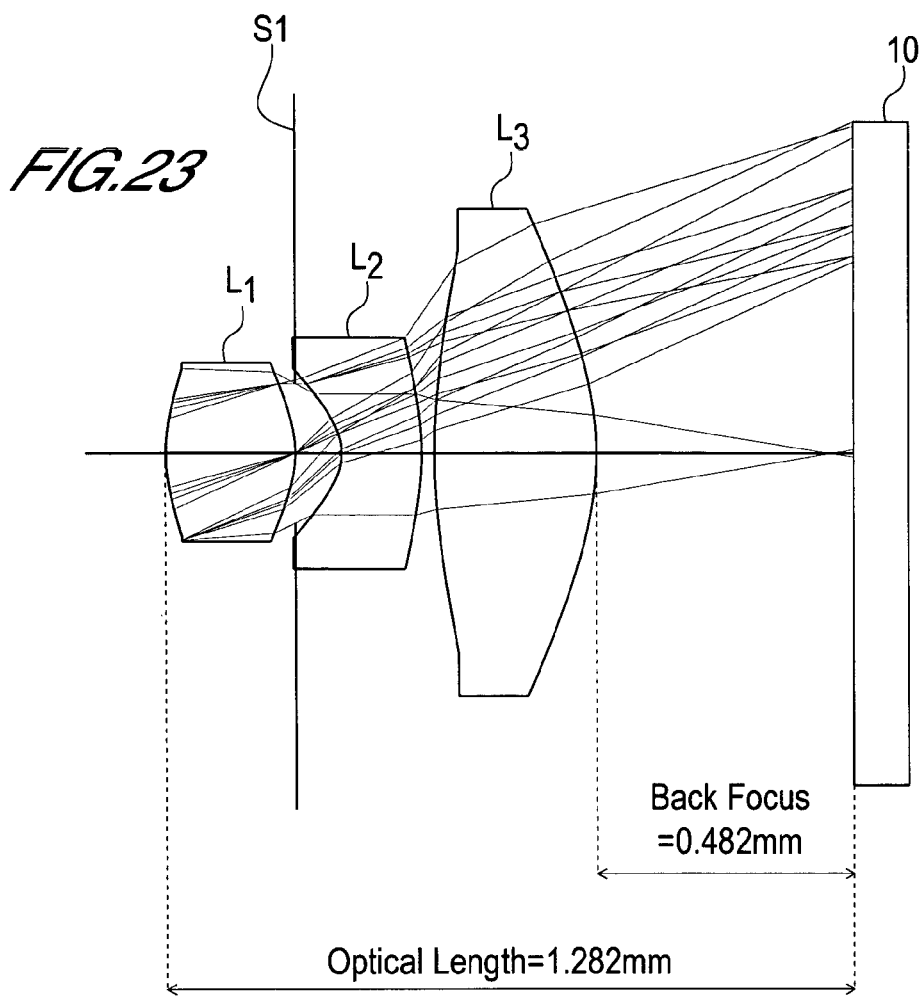
FIG. 23 is a sectional view of an imaging lens of a sixth embodiment.

A sectional view of the imaging lens of the sixth embodiment is shown in FIG. 23. The back focus in relation to a focal length of 1.00 mm is 0.482 mm, and hence a sufficient length is secured.

Figure 24:
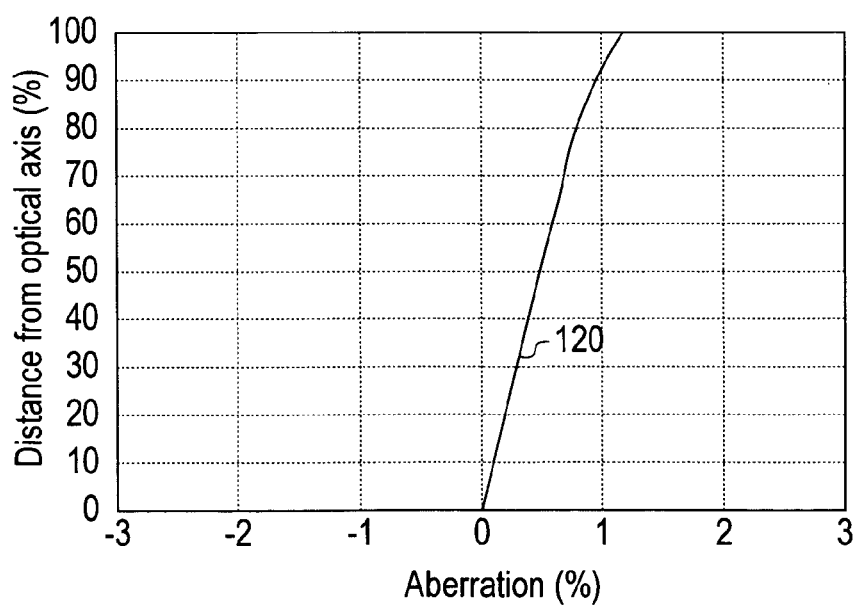
FIG. 24 is a view of distortion in the imaging lens of the sixth embodiment.
Figure 25:
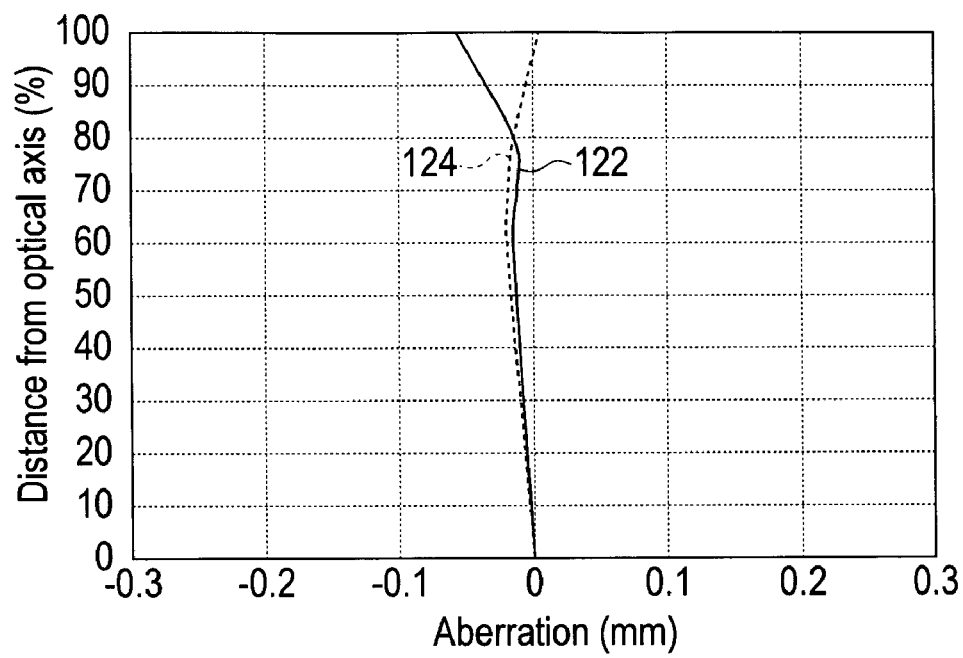
FIG. 25 is a view of astigmatism in the imaging lens of the sixth embodiment.
Figure 26:
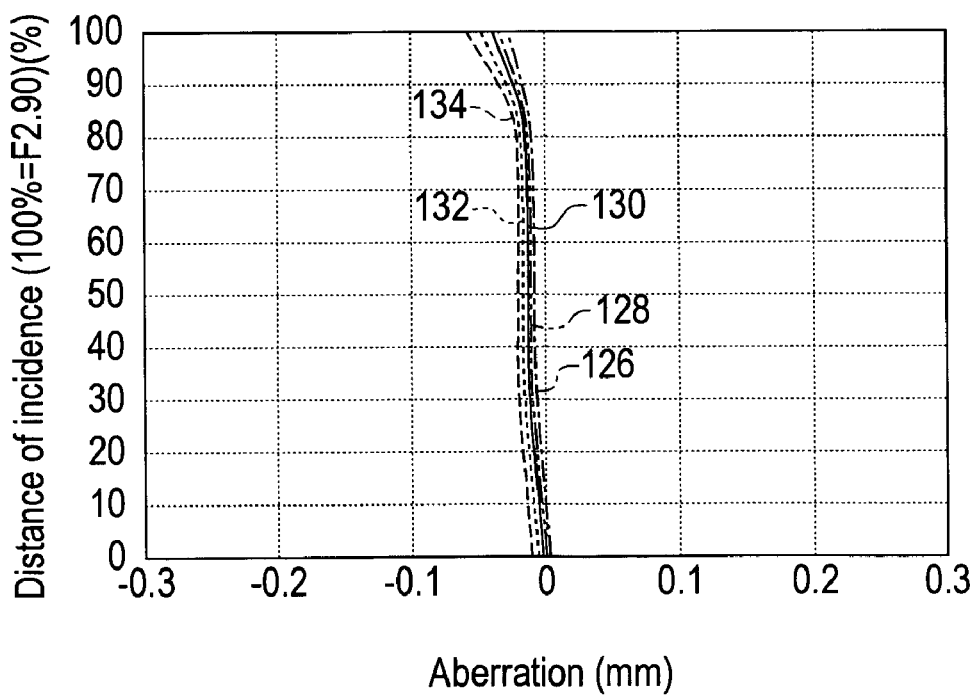
FIG. 26 is a view of chromatic and spherical aberration in the imaging lens of the sixth embodiment.

The distortion curve 120 shown in FIG. 24, the astigmatism curve (the aberration curve 122 relative to the meridional plane and the aberration curve 124 relative to the sagittal plane) shown in FIG. 25, and the chromatic and spherical aberration curve (the aberration curve 126 relative to the C line, the aberration curve 128 relative to the d line, the aberration curve 130 relative to the e line, the aberration curve 132 relative to the F line, and the aberration curve 134 relative to the g line) shown in FIG. 26 are respectively illustrated by graphs.

The ordinate of the aberration curves in FIGS. 24 and 25 illustrate the image height as a percentage of the distance from the optical axis. In FIGS. 24 and 25, 100% corresponds to 0.649 mm. The ordinate of the aberration curve in FIG. 26 indicates the incidence height h (F number), corresponding at its maximum to 2.9. The abscissa in FIG. 26 shows the magnitude of the aberration.

As regards distortion, the absolute value of the amount of aberration reaches a maximum of 1.1701% in an image height position of 100% (image height 0.649 mm), and hence within an image height range of 0.649 mm and below, the absolute value of the aberration amount is held within 1.1701%.

As for astigmatism, the absolute value of the aberration amount on the meridional plane reaches a maximum of 0.0571 mm in an image height position of 100% (image height 0.649 mm), and hence within an image height range of 0.649 mm and below, the absolute value of the aberration amount is held within 0.0571 mm.

As for chromatic and spherical aberration, the absolute value of the aberration curve 134 relative to the g line reaches a maximum of 0.0581 mm at an incidence height h of 100%, and hence the absolute value of the aberration amount is held within 0.0581 mm.

SEVENTH EMBODIMENT (A) The object-side radius of curvature $r_1$ of the first lens L1 is $r_1$=0.436 mm.
(B) The image-side radius of curvature $r_2$ of the first lens L1 is $r_2$=−0.659 mm.
(C) The interval $D_3$ between the first lens L1 and second lens L2 on the optical axis is $D_3$=0.0925 mm, where $D_3$ is equal to $d_2+d_3$ in FIG. 22; here, $d_2$=0 mm.
(D) The thickness $d_4$ at the center of the second lens L2 is $d_4$=0.1479 mm.
(E) The thickness $d_6$ at the center of the third lens L3 is $d_6$=0.3173 mm.
(F) The optical length L is L=1.288 mm.
(G) The image height (effective diagonal length of the image surface) 2Y is 2Y=1.32 mm.
(H) The back focus $b_f$ is $b_f$=0.460 mm.
(I) The aperture ratio (F number) $F_{NO}$ is $F_{NO}$=2.78.
Hence, $$|r_1/r_2|=|0.436/-0.659|=0.6616, \qquad (2\text{-}1)$$

$$D_3/f=0.0925/1.00=0.0925, \qquad (2\text{-}2)$$

$$d_4/f=0.1479/1.00=0.1479, \qquad (2\text{-}3)$$

$$d_6/f=0.3173/1.00=0.3173, \qquad (2\text{-}4)$$

$$L/2Y=1.288/1.32=0.9758, \qquad (2\text{-}5)$$

$$b_f/f=0.460/1.00=0.460, \text{ and} \qquad (2\text{-}6)$$

$$F_{NO}=2.78. \qquad (2\text{-}7)$$

Thus the lens system of the seventh embodiment satisfies all of the following conditional expressions (2-1) through (2-7).

$$0.55<|r_1/r_2|<0.70 \qquad (2\text{-}1)$$

$$0.08<D_3/f<0.12 \qquad (2\text{-}2)$$

$$0.140 \leq d_4/f<0.270 \qquad (2\text{-}3)$$

$$0.24<d_6/f<0.40 \qquad (2\text{-}4)$$

$$0.90<L/2Y<1.10 \qquad (2\text{-}5)$$

$$0.40<b_f/f<0.52 \qquad (2\text{-}6)$$

$$2.70<F_{NO}<3.60 \qquad (2\text{-}7)$$

As shown in Table 7, the diaphragm S2 is positioned between the first lens L1 and the second lens L2. In other words, the diaphragm surface is a flat surface, and since $r_3=\infty$ is shown in Table 7, this indicates that the diaphragm S2 is disposed in the position of the surface $r_3$. The numerical aperture (F number) is 2.78.

Figure 27:
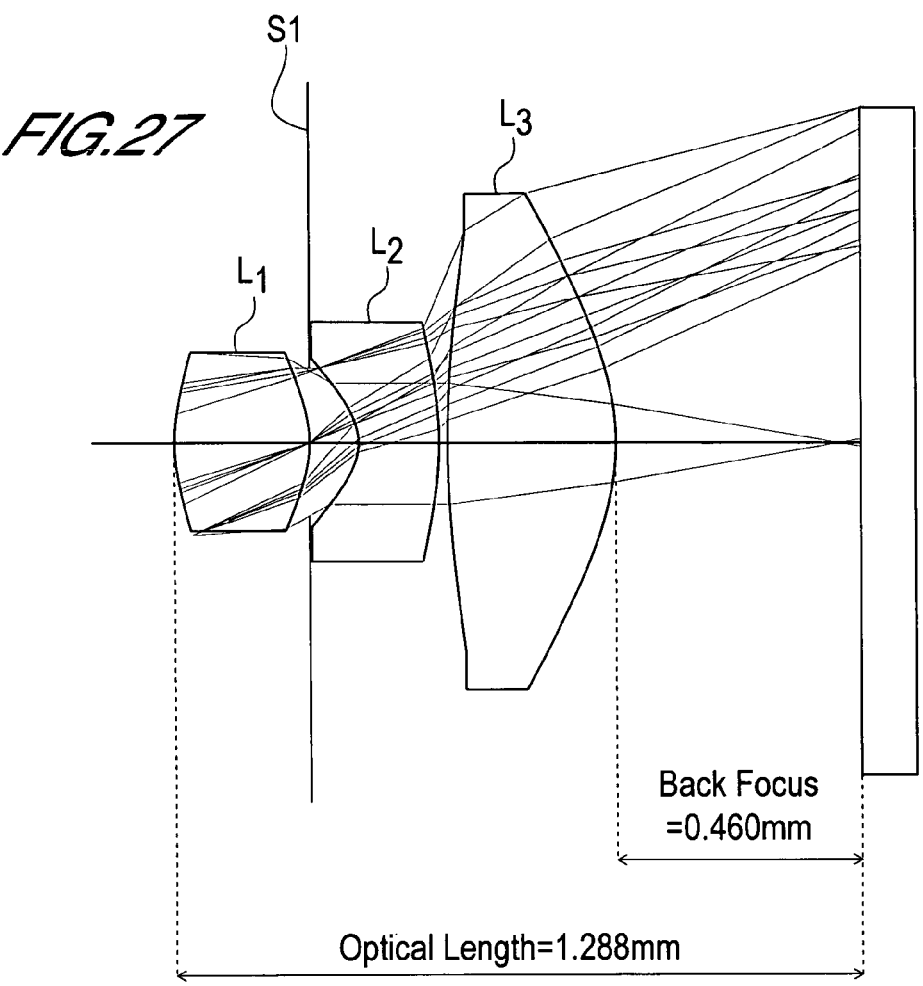
FIG. 27 is a sectional view of an imaging lens of a seventh embodiment.

A sectional view of the imaging lens of the seventh embodiment is shown in FIG. 27. The back focus in relation to a focal length of 1.00 mm is 0.460 mm, and hence a sufficient length is secured.

Figure 28:
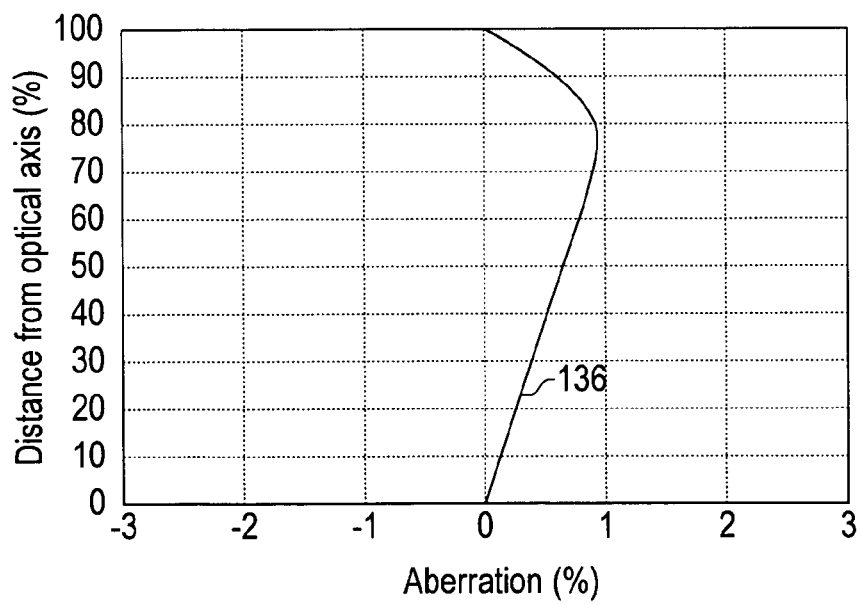
FIG. 28 is a view of distortion in the imaging lens of the seventh embodiment.
Figure 29:
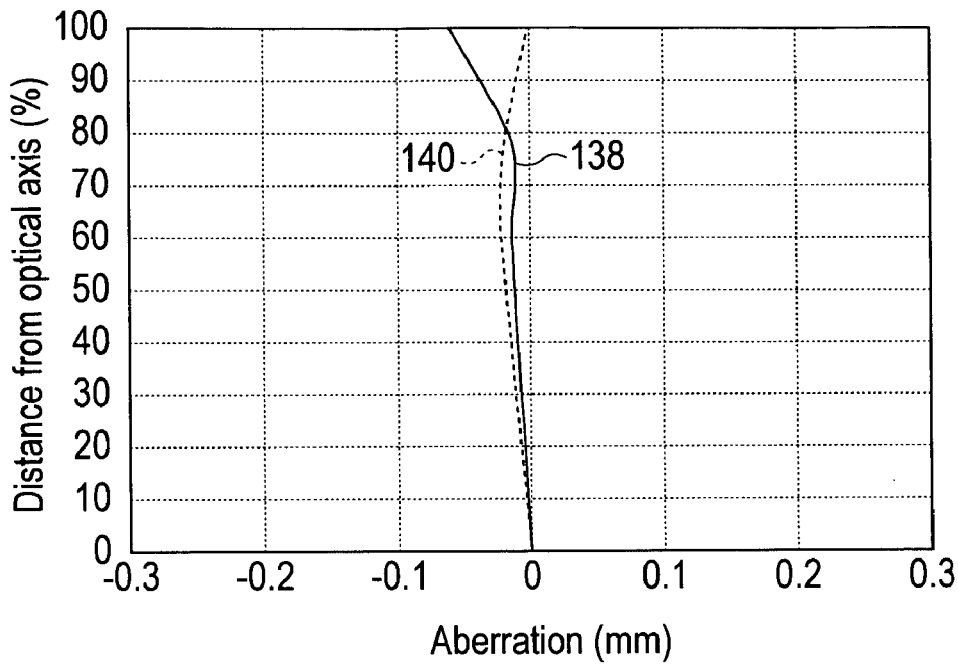
FIG. 29 is a view of astigmatism in the imaging lens of the seventh embodiment.
Figure 30:
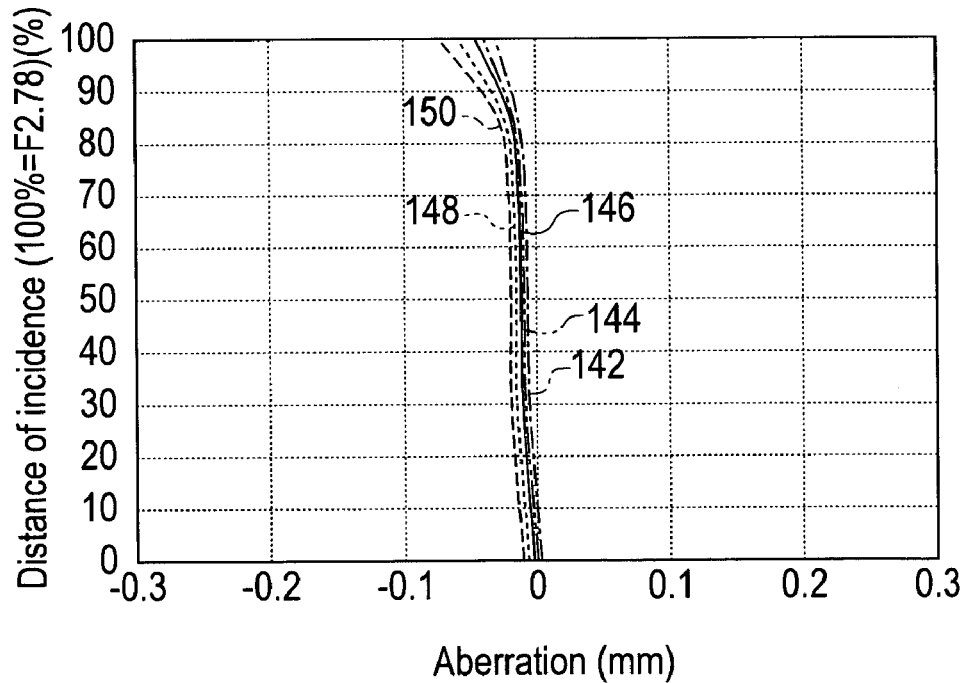
FIG. 30 is a view of chromatic and spherical aberration in the imaging lens of the seventh embodiment.

The distortion curve 136 shown in FIG. 28, the astigmatism curve (the aberration curve 138 relative to the meridional plane and the aberration curve 140 relative to the sagittal plane) shown in FIG. 29, and the chromatic and spherical aberration curve (the aberration curve 142 relative to the C line, the aberration curve 144 relative to the d line, the aberration curve 146 relative to the e line, the aberration curve 148 relative to the F line, and the aberration curve 150 relative to the g line) shown in FIG. 30 are respectively illustrated by graphs.

The ordinate of the aberration curves in FIGS. 28 and 29 illustrate the image height as a percentage of the distance from the optical axis. In FIGS. 28 and 29, 100% corresponds to 0.660 mm. The ordinate of the aberration curve in FIG. 30 indicates the incidence height h (F number), corresponding at its maximum to 2.78. The abscissa in FIG. 30 shows the magnitude of the aberration.

As regards distortion, the absolute value of the amount of aberration reaches a maximum of 0.9205% in an image height position of 80% (image height 0.528 mm), and hence within an image height range of 0.660 mm and below, the absolute value of the aberration amount is held within 0.9205%.

As for astigmatism, the absolute value of the aberration amount on the meridional plane reaches a maximum of 0.0608 mm in an image height position of 100% (image height 0.660 mm), and hence within an image height range of 0.660 mm and below, the absolute value of the aberration amount is held within 0.0608 mm.

As for chromatic and spherical aberration, the absolute value of the aberration curve 150 relative to the g line reaches a maximum of 0.0733 mm at an incidence height h of 100%, and hence the absolute value of the aberration amount is held within 0.0733 mm.

EIGHTH EMBODIMENT (A) The object-side radius of curvature $r_1$ of the first lens L1 is $r_1$=0.415 mm.
(B) The image-side radius of curvature $r_2$ of the first lens L1 is $r_2$=−0.671 mm.
(C) The interval $D_3$ between the first lens L1 and second lens L2 on the optical axis is $D_3$=0.0875 mm, where $D_3$ is equal to $d_2+d_3$ in FIG. 22; here, $d_2$=0 mm.
(D) The thickness $d_4$ at the center of the second lens L2 is $d_4$=0.1400 mm.
(E) The thickness $d_6$ at the center of the third lens L3 is $d_6$=0.2980 mm.
(F) The optical length L is L=1.274 mm.
(G) The image height (effective diagonal length of the image surface) 2Y is 2Y=1.24 mm.
(H) The back focus $b_f$ is $b_f$=0.488 mm.
(I) The aperture ratio (F number) $F_{NO}$ is $F_{NO}$=2.80.
Hence, $$|r_1/r_2|=|0.415/-0.671|=0.6185, \qquad (2\text{-}1)$$

$$D_3/f=0.0875/1.00=0.0875, \qquad (2\text{-}2)$$

$$d_4/f=0.1400/1.00=0.1400, \qquad (2\text{-}3)$$

$$d_6/f=0.2980/1.00=0.2980, \qquad (2\text{-}4)$$

$$L/2Y=1.274/1.24=1.0274, \qquad (2\text{-}5)$$

$$b_f/f=0.488/1.00=0.488, \text{ and} \qquad (2\text{-}6)$$

$$F_{NO}=2.80. \qquad (2\text{-}7)$$

Thus the lens system of the eighth embodiment satisfies all of the following conditional expressions (2-1) through (2-7).

$$0.55<|r_1/r_2|<0.70 \qquad (2\text{-}1)$$

$$0.08<D_3/f<0.12 \qquad (2\text{-}2)$$

$0.140 \leq d_4/f<0.270$ (2-3)

$0.24<d_6/f<0.40$ (2-4)

$0.90<L/2Y<1.10$ (2-5)

$0.40<b_f/f<0.52$ (2-6)

$2.70<F_{NO}<3.60$ (2-7)

As shown in Table 8, the diaphragm S2 is positioned between the first lens L1 and the second lens L2. In other words, the diaphragm surface is a flat surface, and since $r_3=\infty$ is shown in Table 8, this indicates that the diaphragm S2 is disposed in the position of the surface $r_3$. The numerical aperture (F number) is 2.80.

Figure 31:
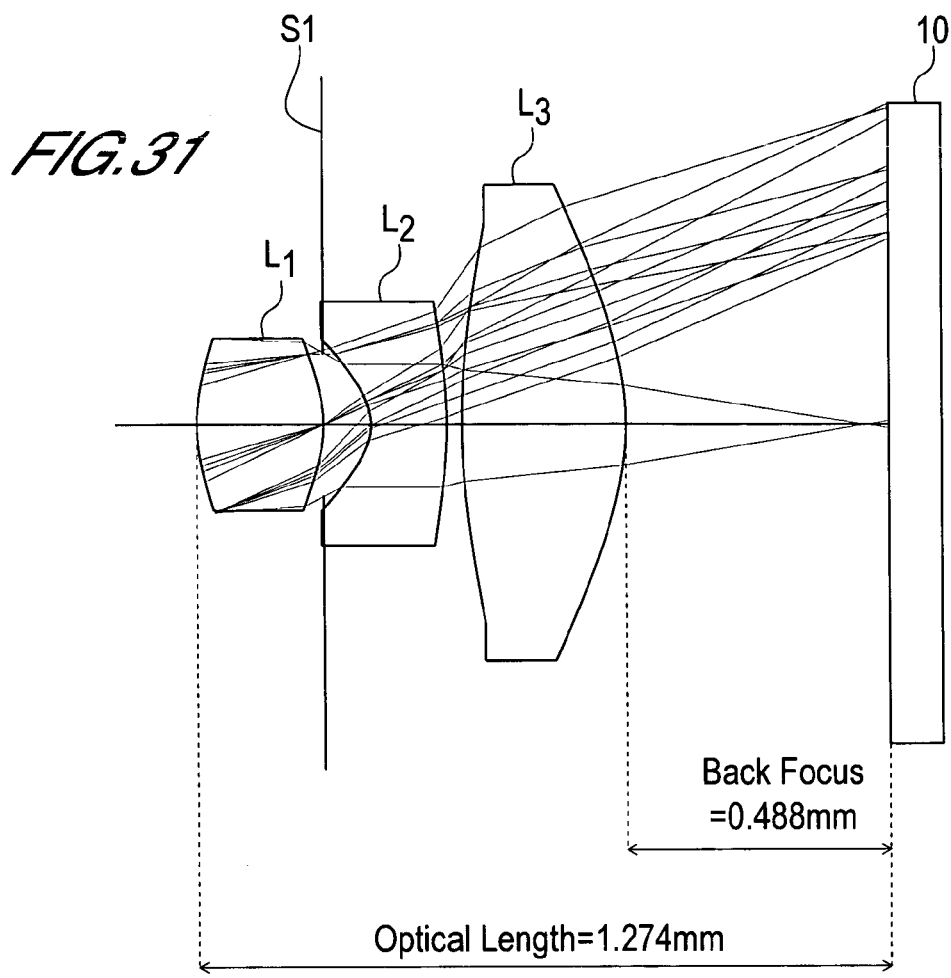
FIG. 31 is a sectional view of an imaging lens of an eighth embodiment.

A sectional view of the imaging lens of the eighth embodiment is shown in FIG. 31. The back focus in relation to a focal length of 1.00 mm is 0.488 mm, and hence a sufficient length is secured.

Figure 32:
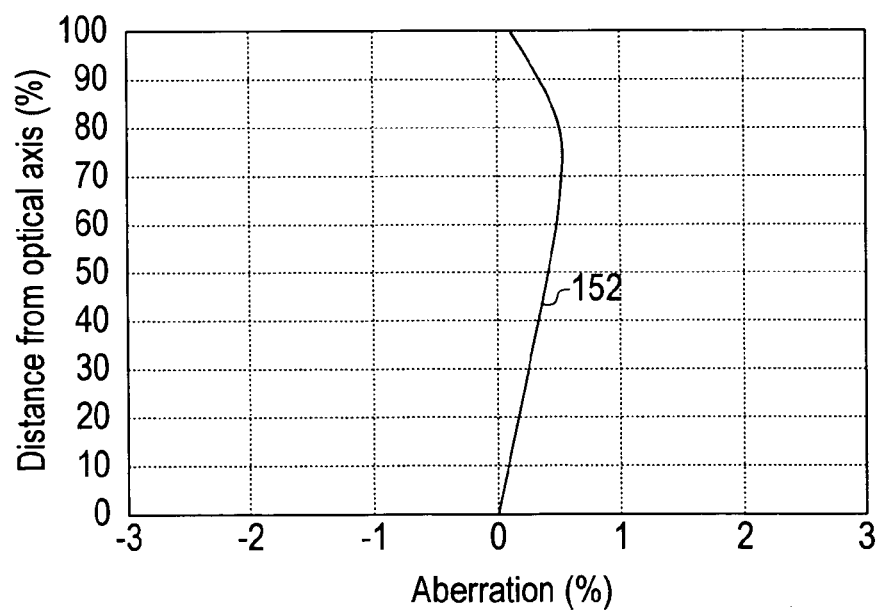
FIG. 32 is a view of distortion in the imaging lens of the eighth embodiment.
Figure 33:
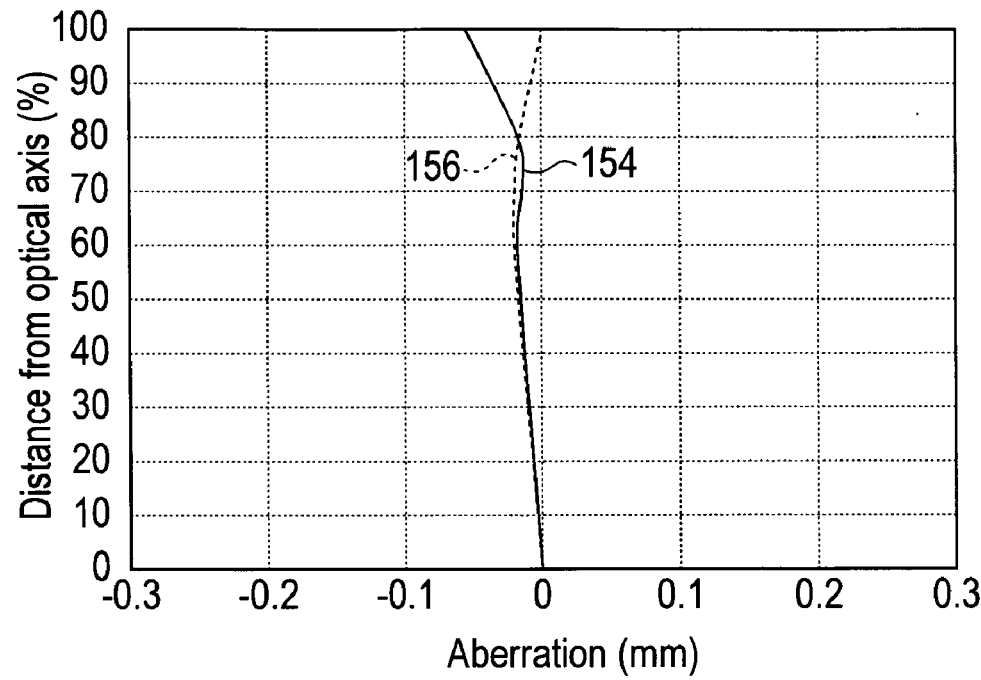
FIG. 33 is a view of astigmatism in the imaging lens of the eighth embodiment.
Figure 34:
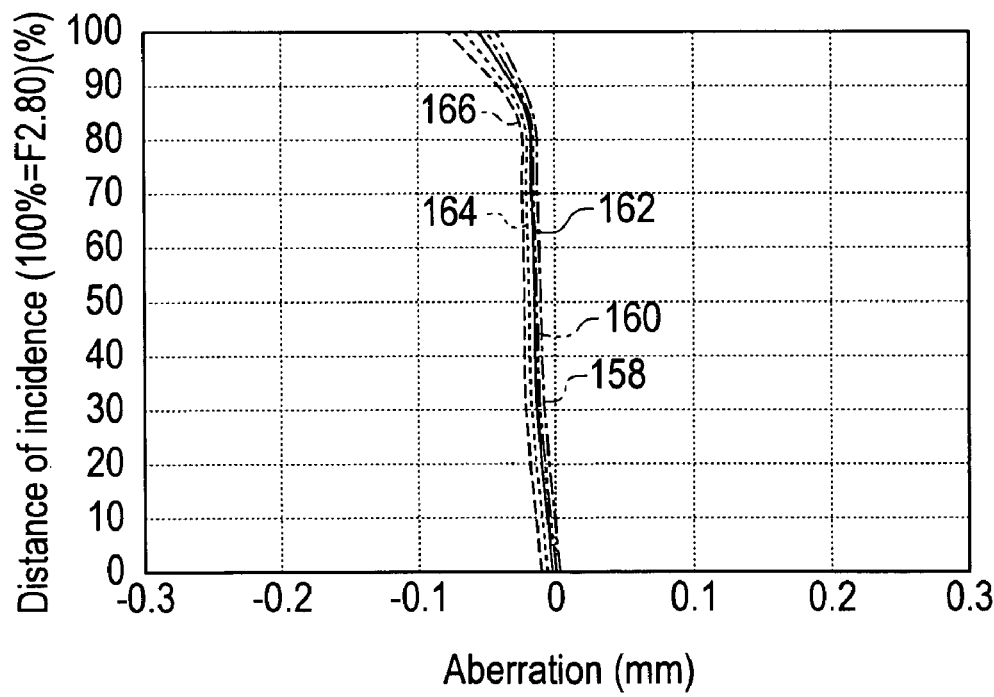
FIG. 34 is a view of chromatic and spherical aberration in the imaging lens of the eighth embodiment.

The distortion curve 152 shown in FIG. 32, the astigmatism curve (the aberration curve 154 relative to the meridional plane and the aberration curve 156 relative to the sagittal plane) shown in FIG. 33, and the chromatic and spherical aberration curve (the aberration curve 158 relative to the C line, the aberration curve 160 relative to the d line, the aberration curve 162 relative to the e line, the aberration curve 164 relative to the F line, and the aberration curve 166 relative to the g line) shown in FIG. 34 are respectively illustrated by graphs.

The ordinate of the aberration curves in FIGS. 32 and 33 illustrate the image height as a percentage of the distance from the optical axis. In FIGS. 32 and 33, 100% corresponds to 0.620 mm. The ordinate of the aberration curve in FIG. 34 indicates the incidence height h (F number), corresponding at its maximum to 2.80. The abscissa in FIG. 34 shows the magnitude of the aberration.

As regards distortion, the absolute value of the amount of aberration reaches a maximum of 0.5260% in an image height position of 70% (image height 0.434 mm), and hence within an image height range of 0.620 mm and below, the absolute value of the aberration amount is held within 0.5260%.

As for astigmatism, the absolute value of the aberration amount on the meridional plane reaches a maximum of 0.0558 mm in an image height position of 100% (image height 0.620 mm), and hence within an image height range of 0.620 mm and below, the absolute value of the aberration amount is held within 0.0558 mm.

As for chromatic and spherical aberration, the absolute value of the aberration curve 166 relative to the g line reaches a maximum of 0.0781 mm at an incidence height h of 100%, and hence the absolute value of the aberration amount is held within 0.0781 mm.

NINTH EMBODIMENT (A) The object-side radius of curvature $r_1$ of the first lens L1 is $r_1=0.416$ mm.
(B) The image-side radius of curvature $r_2$ of the first lens L1 is $r_2=-0.671$ mm.
(C) The interval $D_3$ between the first lens L1 and second lens L2 on the optical axis is $D_3=0.0875$ mm, where $D_3$ is equal to $d_2+d_3$ in FIG. 22; here, $d_2=0$ mm.
(D) The thickness $d_4$ at the center of the second lens L2 is $d_4=0.1400$ mm.
(E) The thickness $d_6$ at the center of the third lens L3 is $d_6=0.3008$ mm.
(F) The optical length L is L=1.274 mm.
(G) The image height (effective diagonal length of the image surface) 2Y is 2Y=1.26 mm.
(H) The back focus $b_f$ is $b_f=0.485$ mm.
(I) The aperture ratio (F number) $F_{NO}$ is $F_{NO}=2.80$.

Hence, $|r_1/r_2|=|0.416/-0.671|=0.6200$, (2-1)

$D_3/f=0.0875/1.00=0.0875$, (2-2)

$d_4/f=0.1400/1.00=0.1400$, (2-3)

$d_6/f=0.3008/1.00=0.3008$, (2-4)

$L/2Y=1.274/1.26=1.0111$, (2-5)

$b_f/f=0.485/1.00=0.485$, and (2-6)

$F_{NO}=2.80$. (2-7)

Thus the lens system of the ninth embodiment satisfies all of the following conditional expressions (2-1) through (2-7).

$0.55<|r_1/r_2|<0.70$ (2-1)

$0.08<D_3/f<0.12$ (2-2)

$0.140 \leq d_4/f<0.270$ (2-3)

$0.24<d_6/f<0.40$ (2-4)

$0.90<L/2Y<1.10$ (2-5)

$0.40<b_f/f<0.52$ (2-6)

$2.70<F_{NO}<3.60$ (2-7)

As shown in Table 9, the diaphragm S2 is positioned between the first lens L1 and the second lens L2. In other words, the diaphragm surface is a flat surface, and since $r_3=\infty$ is shown in Table 9, this indicates that the diaphragm S2 is disposed in the position of the surface $r_3$. The numerical aperture (F number) is 2.80.

Figure 35:
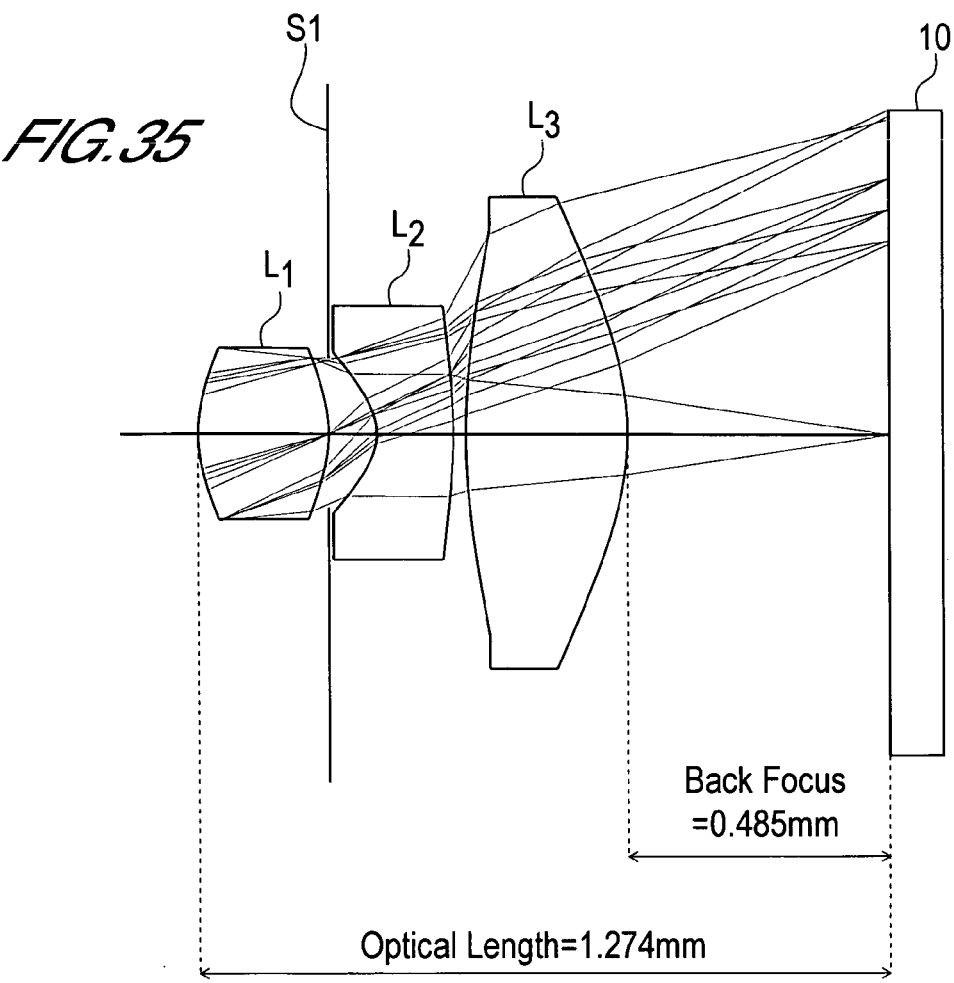
FIG. 35 is a sectional view of an imaging lens of a ninth embodiment.

A sectional view of the imaging lens of the ninth embodiment is shown in FIG. 35. The back focus in relation to a focal length of 1.00 mm is 0.485 mm, and hence a sufficient length is secured.

Figure 36:
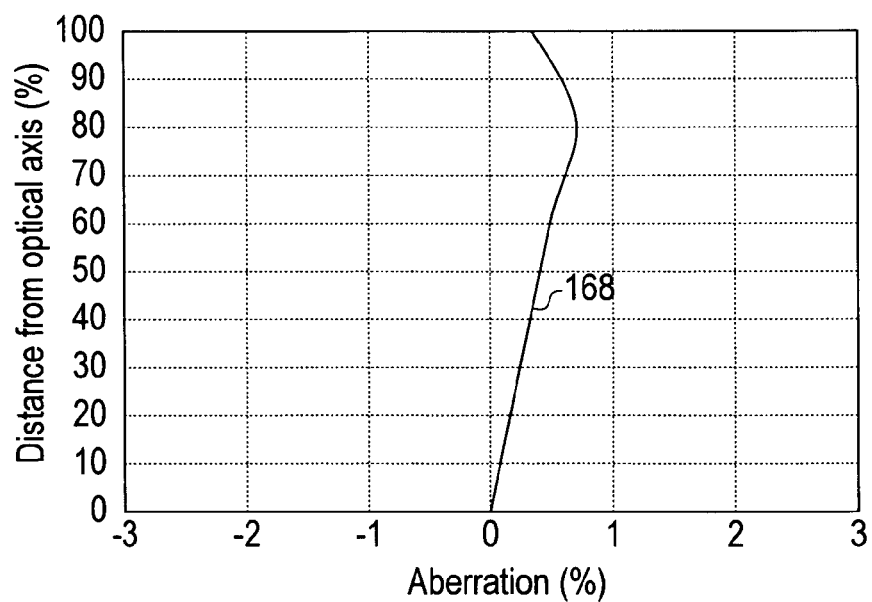
FIG. 36 is a view of distortion in the imaging lens of the ninth embodiment.
Figure 37:
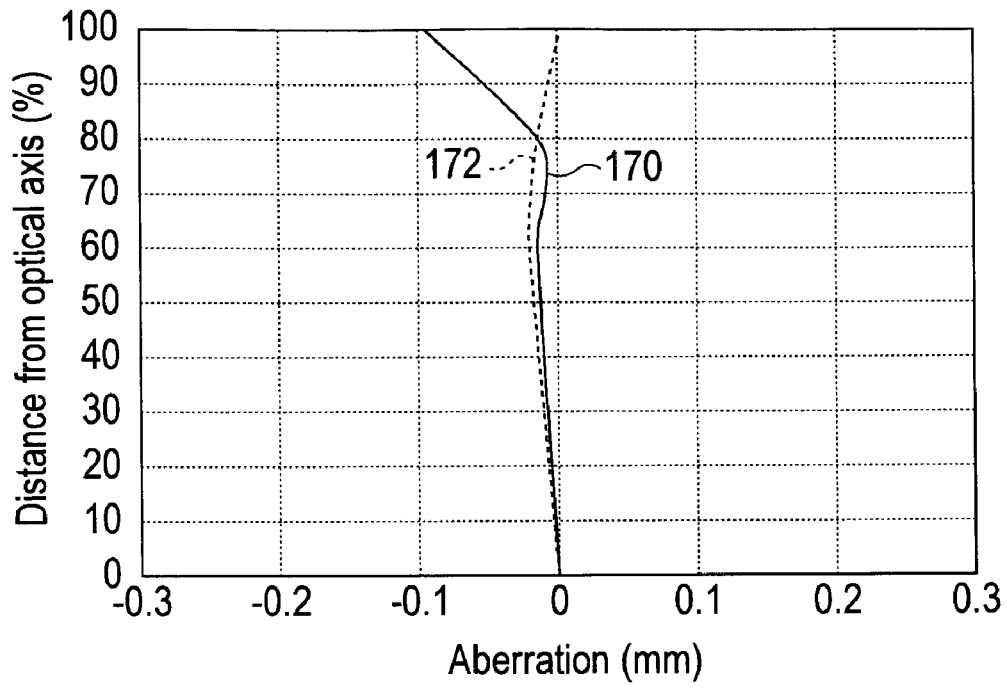
FIG. 37 is a view of astigmatism in the imaging lens of the ninth embodiment.
Figure 38:
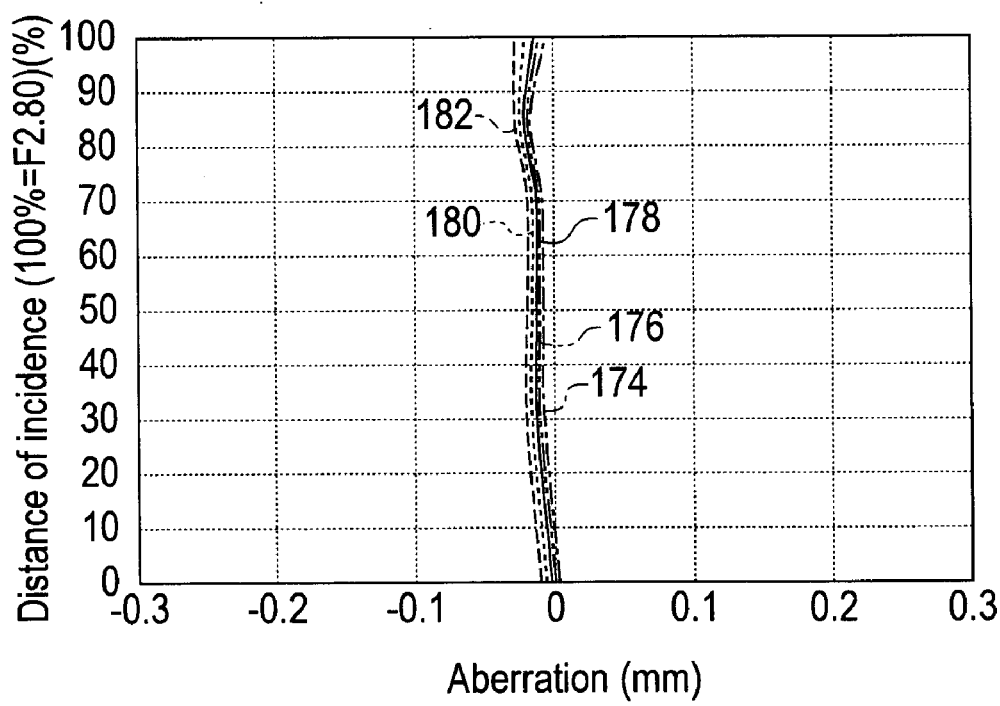
FIG. 38 is a view of chromatic and spherical aberration in the imaging lens of the ninth embodiment.

The distortion curve 168 shown in FIG. 36, the astigmatism curve (the aberration curve 170 relative to the meridional plane and the aberration curve 172 relative to the sagittal plane) shown in FIG. 37, and the chromatic and spherical aberration curve (the aberration curve 174 relative to the C line, the aberration curve 176 relative to the d line, the aberration curve 178 relative to the e line, the aberration curve 180 relative to the F line, and the aberration curve 182 relative to the g line) shown in FIG. 38 are respectively illustrated by graphs.

The ordinate of the aberration curves in FIGS. 36 and 37 illustrate the image height as a percentage of the distance from the optical axis. In FIGS. 36 and 37, 100% corresponds to 0.630 mm. The ordinate of the aberration curve in FIG. 38 indicates the incidence height h (F number), corresponding at its maximum to 2.80. The abscissa in FIG. 38 shows the magnitude of the aberration.

As regards distortion, the absolute value of the amount of aberration reaches a maximum of 0.7085% in an image height position of 80% (image height 0.504 mm), and hence within an image height range of 0.630 mm and below, the absolute value of the aberration amount is held within 0.7085%.

As for astigmatism, the absolute value of the aberration amount on the meridional plane reaches a maximum of 0.0948 mm in an image height position of 100% (image height 0.630 mm), and hence within an image height range of 0.630 mm and below, the absolute value of the aberration amount is held within 0.0948 mm.

As for chromatic and spherical aberration, the absolute value of the aberration curve 182 relative to the g line reaches a maximum of 0.0278 mm at an incidence height h of 100%, and hence the absolute value of the aberration amount is held within 0.0278 mm.

TENTH EMBODIMENT (A) The object-side radius of curvature $r_1$ of the first lens L1 is $r_1$=0.436 mm.
(B) The image-side radius of curvature $r_2$ of the first lens L1 is $r_2$=−0.661 mm.
(C) The interval $D_3$ between the first lens L1 and second lens L2 on the optical axis is $D_3$=0.0927 mm, where $D_3$ is equal to $d_2+d_3$ in FIG. 22; here, $d_2$=0 mm.
(D) The thickness $d_4$ at the center of the second lens L2 is $d_4$=0.1483 mm.
(E) The thickness $d_6$ at the center of the third lens L3 is $d_6$=0.3183 mm.
(F) The optical length L is L=1.289 mm.
(G) The image height (effective diagonal length of the image surface) 2Y is 2Y=1.24 mm.
(H) The back focus $b_f$ is $b_f$=0.459 mm.
(I) The aperture ratio (F number) $F_{NO}$ is $F_{NO}$=3.40.
Hence, $|r_1/r_2|=|0.436/-0.661|=0.6596,$ (2-1)

$D_3/f=0.0927/1.00=0.0927,$ (2-2)

$d_4/f=0.1483/1.00=0.1483,$ (2-3)

$d_6/f=0.3183/1.00=0.3183,$ (2-4)

$L/2Y=1.289/1.24=1.0395,$ (2-5)

$b_f/f=0.459/1.00=0.459,$ and (2-6)

$F_{NO}=3.40.$ (2-7)

Thus the lens system of tenth embodiment satisfies all of the following conditional expressions (2-1) through (2-7).

$0.55<|r_1/r_2|<0.70$ (2-1)

$0.08<D_3/f<0.12$ (2-2)

$0.140 \leq d_4/f<0.270$ (2-3)

$0.24<d_6/f<0.40$ (2-4)

$0.90<L/2Y<1.10$ (2-5)

$0.40<b_f/f<0.52$ (2-6)

$2.70<F_{NO}<3.60$ (2-7)

As shown in Table 10, the diaphragm S2 is positioned between the first lens L1 and the second lens L2. In other words, the diaphragm surface is a flat surface, and since $r_3=\infty$ is shown in Table 10, this indicates that the diaphragm S2 is disposed in the position of the surface $r_3$. The numerical aperture (F number) is 3.40.

Figure 39:
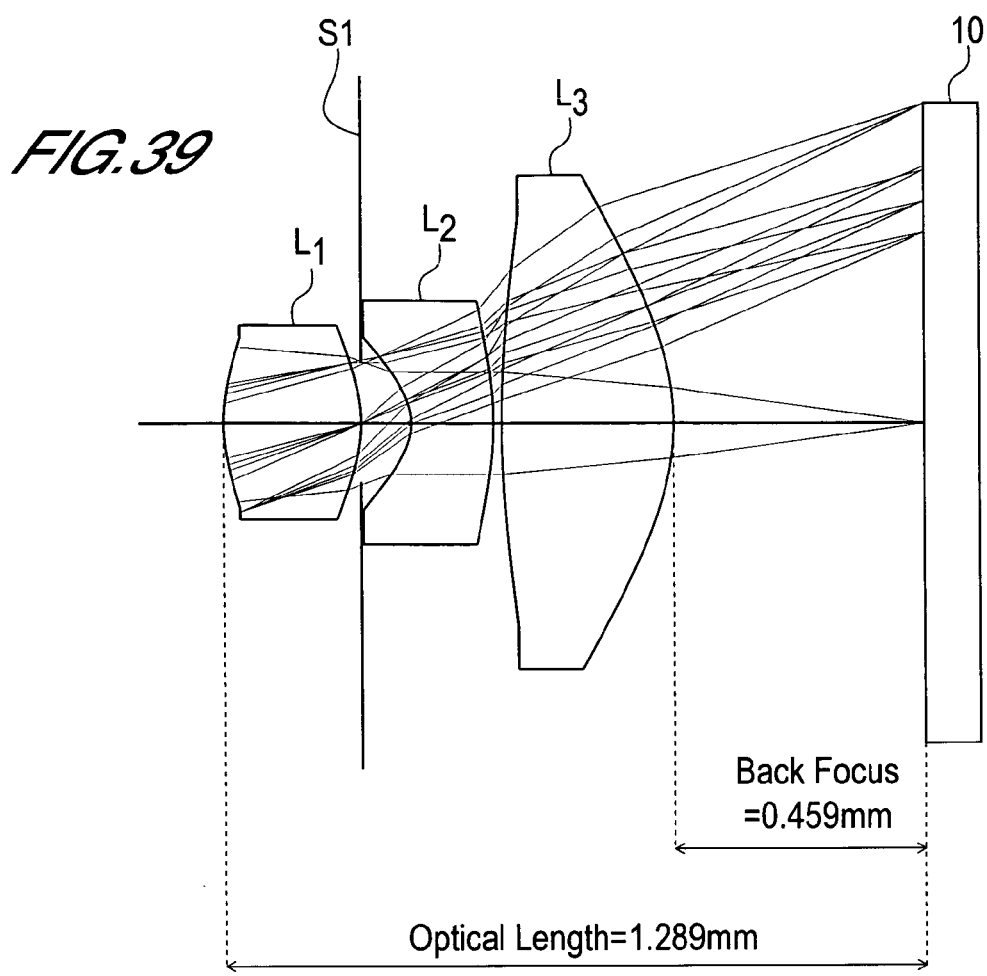
FIG. 39 is a sectional view of an imaging lens of a tenth embodiment.

A sectional view of the imaging lens of the tenth embodiment is shown in FIG. 39. The back focus in relation to a focal length of 1.00 mm is 0.459 mm, and hence a sufficient length is secured.

Figure 40:
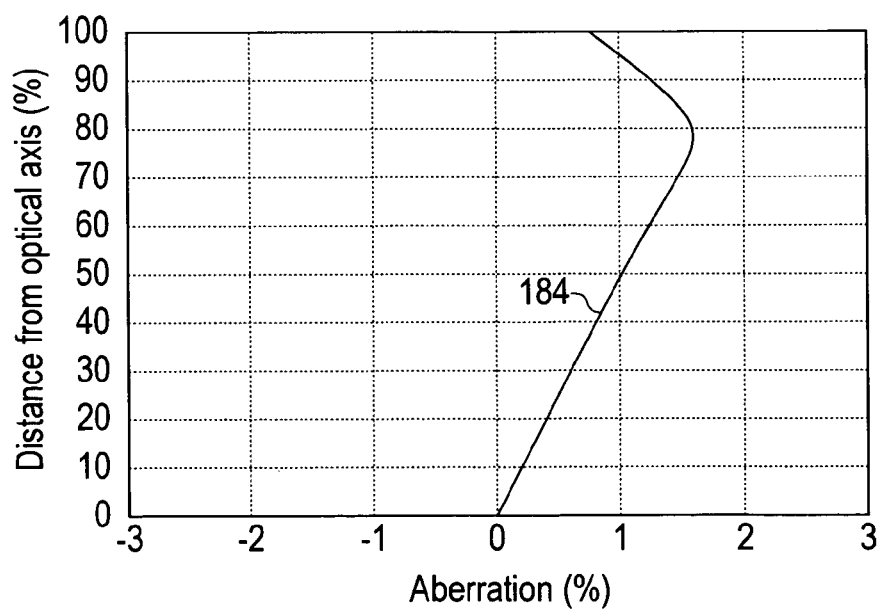
FIG. 40 is a view of distortion in the imaging lens of the tenth embodiment.
Figure 41:
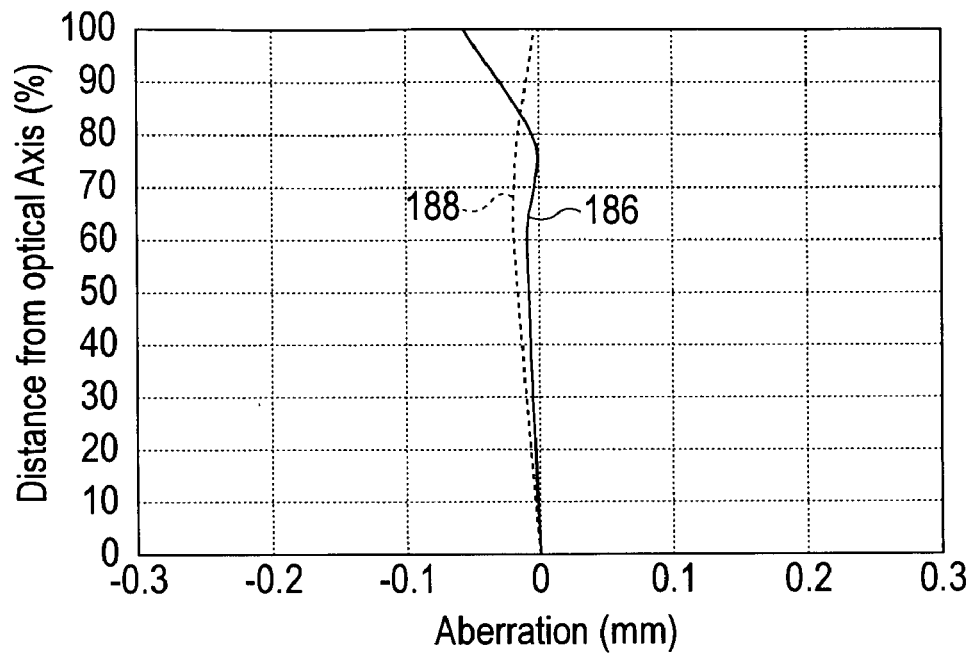
FIG. 41 is a view of astigmatism in the imaging lens of the tenth embodiment.
Figure 42:
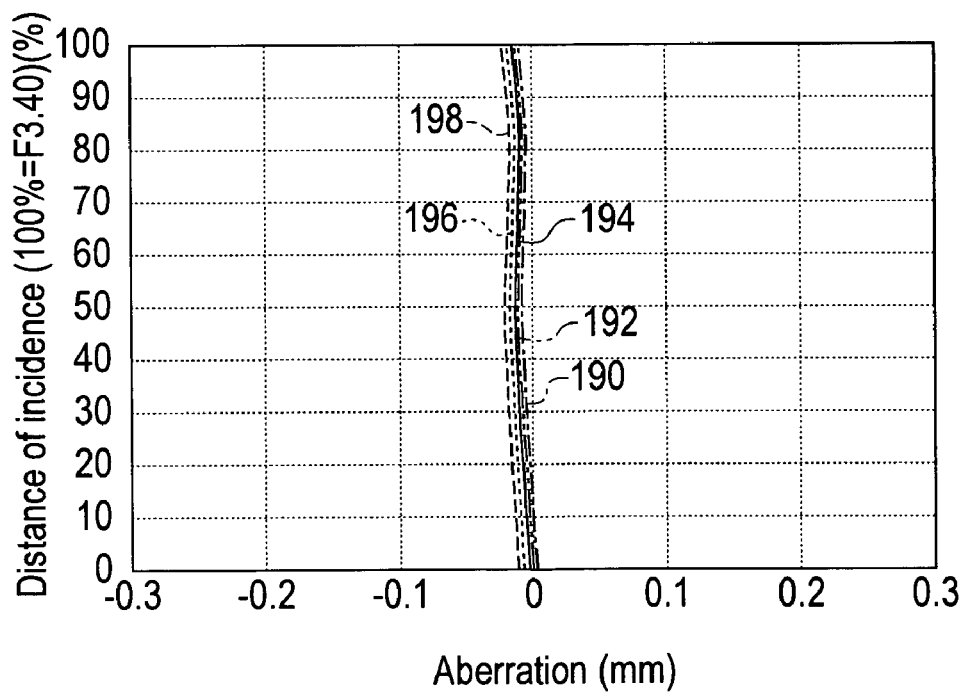
FIG. 42 is a view of chromatic and spherical aberration in the imaging lens of the tenth embodiment.

The distortion curve 184 shown in FIG. 40, the astigmatism curve (the aberration curve 186 relative to the meridional plane and the aberration curve 188 relative to the sagittal plane) shown in FIG. 41, and the chromatic and spherical aberration curve (the aberration curve 190 relative to the C line, the aberration curve 192 relative to the d line, the aberration curve 194 relative to the e line, the aberration curve 196 relative to the F line, and the aberration curve 198 relative to the g line) shown in FIG. 42 are respectively illustrated by graphs.

The ordinate of the aberration curves in FIGS. 40 and 41 illustrate the image height as a percentage of the distance from the optical axis. In FIGS. 40 and 41, 100% corresponds to 0.620 mm. The ordinate of the aberration curve in FIG. 42 indicates the incidence height h (F number), corresponding at its maximum to 3.40. The abscissa in FIG. 42 shows the magnitude of the aberration.

As regards distortion, the absolute value of the amount of aberration reaches a maximum of 1.5860% in an image height position of 80% (image height 0.496 mm), and hence within an image height range of 0.620 mm and below, the absolute value of the aberration amount is held within 1.5860%.

As for astigmatism, the absolute value of the aberration amount on the meridional plane reaches a maximum of 0.0571 mm in an image height position of 100% (image height 0.620 mm), and hence within an image height range of 0.620 mm and below, the absolute value of the aberration amount is held within 0.0571 mm.

As for chromatic and spherical aberration, the absolute value of the aberration curve 198 relative to the g line reaches a maximum of 0.0233 mm at an incidence height h of 100%, and hence the absolute value of the aberration amount is held within 0.0233 mm.

[Third Invention]

As shown in FIG. 43, an imaging lens of the third invention comprises an aperture diaphragm S1, a first lens L1, an aperture diaphragm S2, a second lens L2, and a third lens L3, wherein the aperture diaphragm S1, the first lens L1, the aperture diaphragm S2, the second lens L2, and the third lens L3 are arranged in succession from an object side toward an image side. The radius of curvature (mm units), lens surface interval (mm units), lens material refractive index, lens material Abbe number, focal distance, numerical aperture, aspherical surface coefficient, and so on of the lenses constituting the eleventh and twelfth embodiments of the imaging lens according to the third invention are listed in Tables 11 and 12, respectively.

TABLE 11

Eleventh Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.405$ | $d_2 = 0.2397$ | $N_2 = 1.5304$ | $v_2 = 56.0$ | $-7.752e-2$ | $1.525e-1$ | $-3.599e+2$ | $1.817e+4$ | $-4.186e+5$ |
| $r_3 = -0.720$ | $d_3 = 0.0000$ | | | $4.610$ | $-1.674e+1$ | $-2.019$ | $-1.738e+3$ | $-2.605e+4$ |
| $r_4 = \infty$ | $d_4 = 0.0883$ | | | | | | | |
| $r_5 = -0.146$ | $d_5 = 0.1417$ | $N_5 = 1.5839$ | $v_5 = 30.9$ | $-7.835e-1$ | $1.807e+1$ | $1.211e+2$ | $6.358e+1$ | $-1.124e+5$ |
| $r_6 = -0.315$ | $d_6 = 0.0232$ | | | $-1.826$ | $1.115e+1$ | $2.290e+2$ | $-1.725e+3$ | $-3.457e+3$ |
| $r_7 = 1.078$ | $d_7 = 0.2497$ | $N_7 = 1.5304$ | $v_7 = 56.0$ | $-1.806e+1$ | $-2.283$ | $2.526$ | $1.020e+2$ | $-3.875e+2$ |
| $r_8 = -10.794$ | $d_8 = 0.5087$ | | | $0.000$ | $-4.309$ | $1.715e+1$ | $-1.039e+2$ | $1.488e+2$ |
| $r_9 = \infty$ | | | | | | | | |

Focal Distance f = 1.00 mm  $f_1 = 0.53$ mm
Numerical Aperture $F_{no} = 2.80$  $f_2 = -0.67$ mm
Image Height 2Y = 1.26 mm  $f_3 = 1.86$ mm

TABLE 12

Twelfth Embodiment

| Radius of Curvature($r_i$) | Interval($d_i$) | Refractive Index($N_i$) | Abbe Number($v_i$) | Aspherical Surface Coefficient | | | | |
|---|---|---|---|---|---|---|---|---|
| | | | | K | $A_0$ | $B_0$ | $C_0$ | $D_0$ |
| $r_1 = \infty$ | $d_1 = 0.0000$ | | | | | | | |
| $r_2 = 0.585$ | $d_2 = 0.2342$ | $N_2 = 1.5304$ | $v_2 = 56.0$ | $-1.709$ | $-8.269e-1$ | $-8.854e+1$ | $4.249e+1$ | $-6.665e+1$ |
| $r_3 = -0.837$ | $d_3 = 0.0000$ | | | $2.542$ | $-6.963$ | $3.576e+1$ | $-1.145e+3$ | $3.985e+3$ |
| $r_4 = \infty$ | $d_4 = 0.1149$ | | | | | | | |
| $r_5 = -0.204$ | $d_5 = 0.2532$ | $N_5 = 1.5839$ | $v_5 = 30.9$ | $-7.043e-1$ | $5.317$ | $5.935e+1$ | $9.040e+2$ | $-1.407e+4$ |
| $r_6 = -0.405$ | $d_6 = 0.0146$ | | | $-4.911e-1$ | $3.275$ | $5.467e+1$ | $-2.525e+2$ | $5.711e+2$ |
| $r_7 = 1.037$ | $d_7 = 0.3952$ | $N_7 = 1.5304$ | $v_7 = 56.0$ | $2.333$ | $-8.507e-1$ | $-3.619$ | $6.302$ | $-1.153e+1$ |
| $r_8 = -14.049$ | $d_8 = 0.5191$ | | | $0.000$ | $-1.650$ | $4.711$ | $-1.558e+1$ | $1.213e+1$ |
| $r_9 = \infty$ | | | | | | | | |

Focal Distance f = 1.00 mm  $f_1 = 0.69$ mm
Numerical Aperture $F_{no} = 2.80$  $f_2 = -1.31$ mm
Image Height 2Y = 1.42 mm  $f_3 = 1.84$ mm

ELEVENTH EMBODIMENT (A) The object-side radius of curvature $r_2$ of the first lens L1 is $r_2=0.405$ mm.

(B) The image-side radius of curvature $r_3$ of the first lens L1 is $r_3=-0.720$ mm.

(C) The interval $D_3$ between the first lens L1 and second lens L2 on the optical axis. is $D_3=-0.0883$ mm,, where $D_3$ is equal to $d_3+d_4$ in FIG. 43; here, $d_3=0$ mm.

(D) The thickness $D_4$ at the center of the second lens L2 is $D_4=0.1417$ mm, where $D_4$ is equal to $d_5$ in FIG. 43.

(E) The thickness $D_6$ at the center of the third lens L3 is $D_6=0.2497$ mm, where $D_6$ is equal to $d_7$ in FIG. 43.

(F) The optical length L is L=1.252 mm.

(G) The image height (effective diagonal length of the image surface) 2Y is 2Y=1.26 mm.

(H) The back focus $b_f$ is $b_f=0.509$ mm.

(I) The aperture ratio (F number) $F_{NO}$ is $F_{NO}=2.8$.

Hence, $|r_2/r_3|=|0.405/-0.720|=0.5625$, (3-1)

$D_3/f=0.0883/1.00=0.0883$, (3-2)

$D_4/f=0.1417/1.00=0.1417$, (3-3)

$D_6/f=0.2497/1.00=0.2497$, (3-4)

$L/2Y=1.252/1.26=0.9937$, (3-5)

$b_f/f=0.509/1.00=0.509$, and (3-6)

$F_{NO}=2.8$. (3-7)

Thus the lens system of the eleventh embodiment satisfies all of the following conditional expressions (3-1) through (3-7).

$0.55<|r_2/r_3|<0.70$ (3-1)

$0.08<D_3/f<0.12$ (3-2)

$0.140 \leq d_4/f<0.270$ (3-3)

$0.24<D_6/f<0.40$ (3-4)

$0.90<L/2Y<1.10$ (3-5)

$0.40<b_f/f<0.52$ (3-6)

$2.70<F_{NO}<3.60$ (3-7)

Hereafter, the term "conditional expressions" will be used in the third invention to indicate these seven expressions (3-1) through (3-7).

As shown in Table 11, the diaphragm S1 is positioned at the intersection between the first surface (the object-side surface) of the first lens L1 and the optical axis, and the diaphragm S2 is positioned between the first lens L1 and second lens L2. In other words, the diaphragm surfaces are flat surfaces, and since $r_1=\infty$ and $r_4=\infty$ are shown in Table 11, this indicates that the diaphragm S1 is disposed in the position of the surface $r_1$ and the diaphragm S2 is disposed in the position of the surface $r_4$ (see FIG. 43). The numerical aperture (F number) is 2.8.

[When Aberrations are Calculated Using the Diaphragm S1 as an Aperture Diaphragm]

Figure 44:
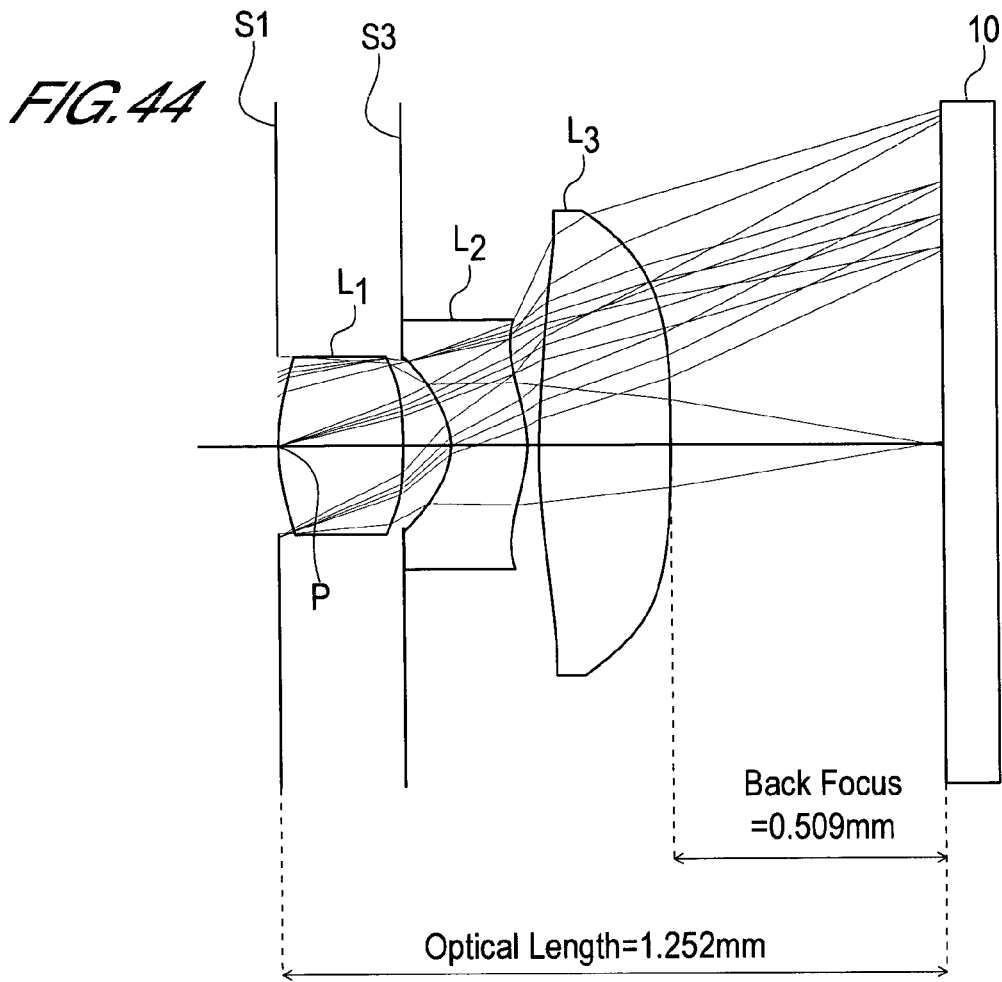
FIG. 44 is a sectional view [A] of an imaging lens of an eleventh embodiment.

A sectional view [A] of the imaging lens of the eleventh embodiment is shown in FIG. 44. The back focus in relation to a focal length of 1.00 mm is 0.509 mm, and hence a sufficient length is secured.

When the various aberrations are calculated using the diaphragm S1 as an aperture diaphragm, the aberrations are calculated on the condition that all of the principal rays entering the diaphragm S1 pass through the optical axis on which the diaphragm S1 is placed (i.e. the center of the diaphragm S1). In FIG. 44, a position denoted by a point P is the optical axis on which the diaphragm S1 is placed (the center of the diaphragm S1), and therefore the position through which the principal rays entering the diaphragm S1 pass. As shown in FIG. 44, all of the principal rays entering the diaphragm S1 pass through the point P.

When it is necessary to differentiate between a case in which the various aberrations are calculated using the diaphragm S1 as an aperture diaphragm and a case to be described below in which the various aberrations are calculated using the diaphragm S2 as an aperture diaphragm, the symbol [A] is affixed to the various aberrations, aberration curves, and aberration diagrams of the former case.

Figure 45:
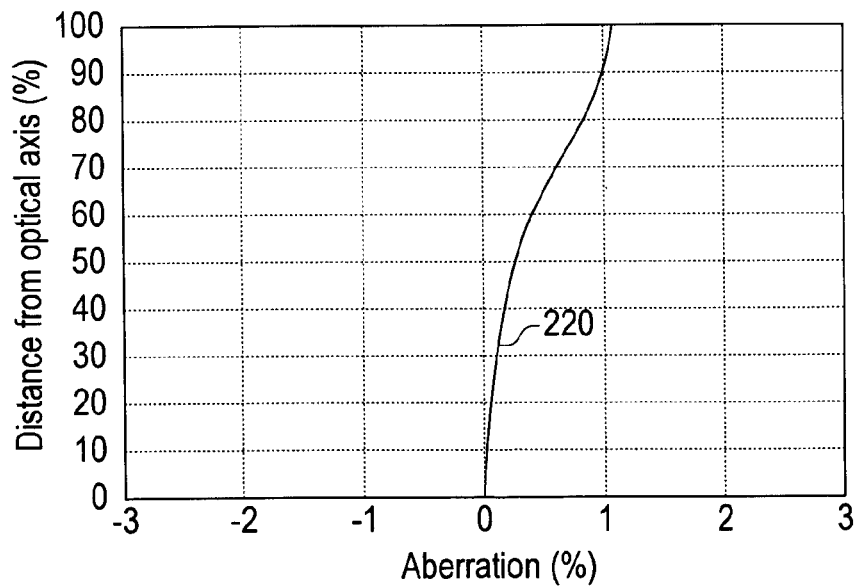
FIG. 45 is a view of distortion [A] in the imaging lens of the eleventh embodiment.
Figure 46:
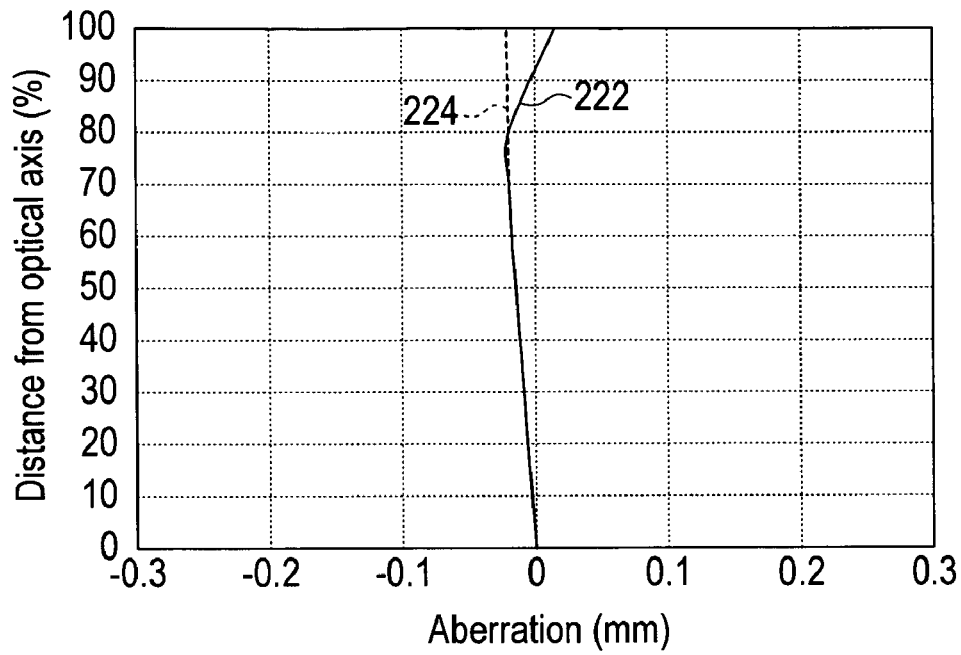
FIG. 46 is a view of astigmatism [A] in the imaging lens of the eleventh embodiment.
Figure 47:
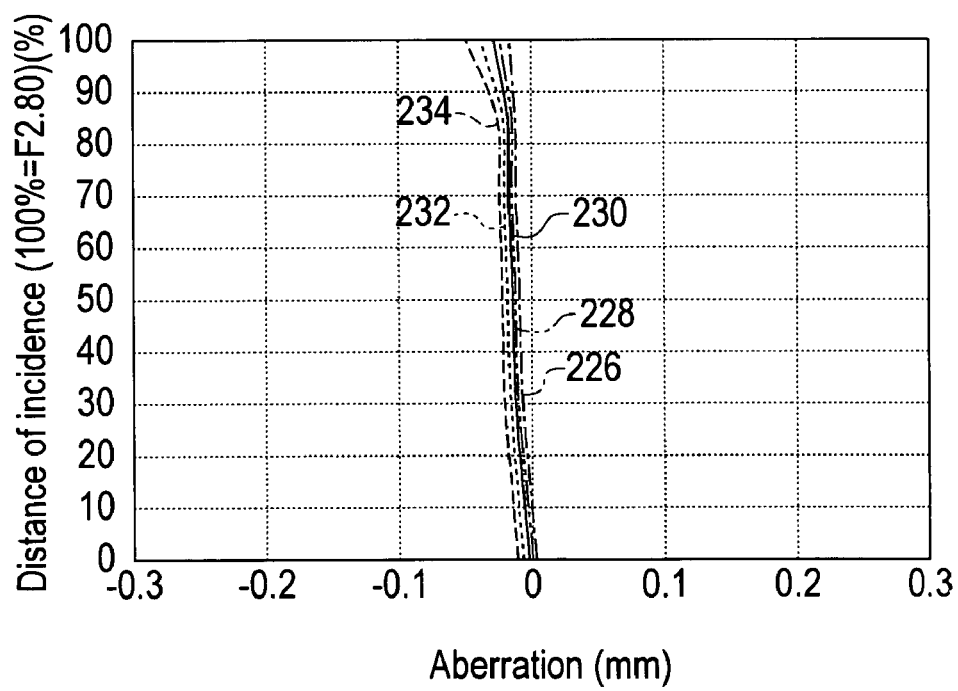
FIG. 47 is a view of chromatic and spherical aberration [A] in the imaging lens of the eleventh embodiment.

The distortion curve [A] 220 shown in FIG. 45, the astigmatism curve [A] (the aberration curve 222 relative to the meridional plane and the aberration curve 224 relative to the sagittal plane) shown in FIG. 46, and the chromatic and spherical aberration curve [A] (the aberration curve 226 relative to the C line, the aberration curve 228 relative to the d line, the aberration curve 230 relative to the e line, the aberration curve 232 relative to the F line, and the aberration curve 234 relative to the g line) shown in FIG. 47 are respectively illustrated by graphs.

The ordinate of the aberration curves [A] in FIGS. 45 and 46 illustrate the image height as a percentage of the distance from the optical axis. In FIGS. 45 and 46, 100% corresponds to 0.630 mm. The ordinate of the aberration curve [A] in FIG. 47 indicates the incidence height h (F number), corresponding at its maximum to 2.8. The abscissa in FIG. 47 shows the magnitude of the aberration.

As regards distortion [A], the absolute value of the amount of aberration reaches a maximum of 1.075% in an image height position of 100% (image height 0.630 mm), and hence within an image height range of 0.630 mm and below, the absolute value of the aberration amount is held within 1.075%.

As for astigmatism [A], the absolute value of the aberration amount on the meridional plane reaches a maximum of 0.0214 mm in an image height position of 100% (image height 0.630 mm), and hence within an image height range of 0.630 mm and below, the absolute value of the aberration amount is held within 0.0214 mm.

As for chromatic and spherical aberration [A], the absolute value of the aberration curve 234 relative to the g line reaches a maximum of 0.0491 mm at an incidence height h of 100%, and hence the absolute value of the aberration amount is held within 0.0491 mm.

[When Aberrations are Calculated Using the Diaphragm S2 as an Aperture Diaphragm]

Figure 48:
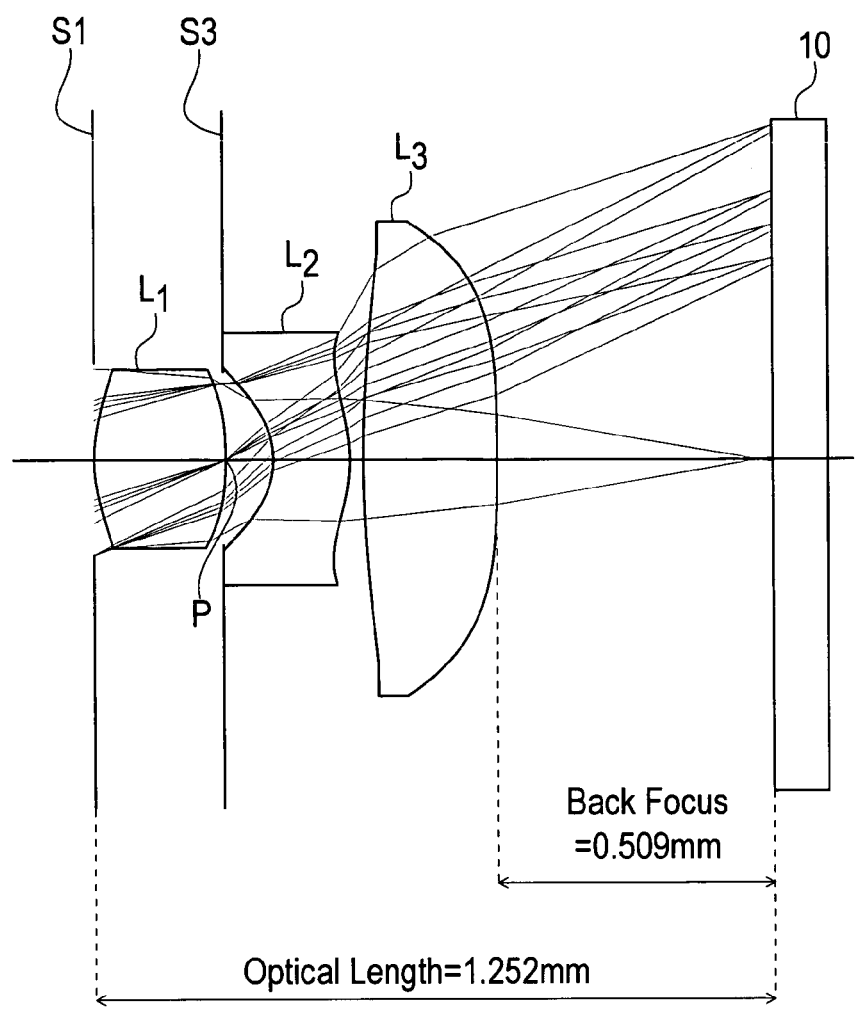
FIG. 48 is a sectional view [B] of an imaging lens of the eleventh embodiment.

A sectional view [B] of the imaging lens of the eleventh embodiment is shown in FIG. 48. This diagram is similar to FIG. 44, but the shape of the light rays is different. The back focus in relation to a focal length of 1.00 mm is 0.509 mm, and hence a sufficient length is secured.

When the various aberrations are calculated using the diaphragm S2 as an aperture diaphragm, the aberrations are calculated on the condition that all of the principal rays entering the diaphragm S2 pass through the optical axis on which the diaphragm S2 is placed (i.e. the center of the diaphragm S2) In FIG. 48, a position denoted by a point P is the optical axis on which the diaphragm S2 is placed (the center of the diaphragm S2), and therefore the position through which the principal rays entering the diaphragm S2 pass. As shown in FIG. 48, all of the principal rays entering the diaphragm S2 pass through the point P.

When it is necessary to differentiate between the case described above, in which the various aberrations are calculated using the diaphragm S1 as an aperture diaphragm, and a case in which the various aberrations are calculated using the diaphragm S2 as an aperture diaphragm, the symbol [B] is affixed to the various aberrations, aberration curves, and aberration diagrams of the latter case.

Figure 49:
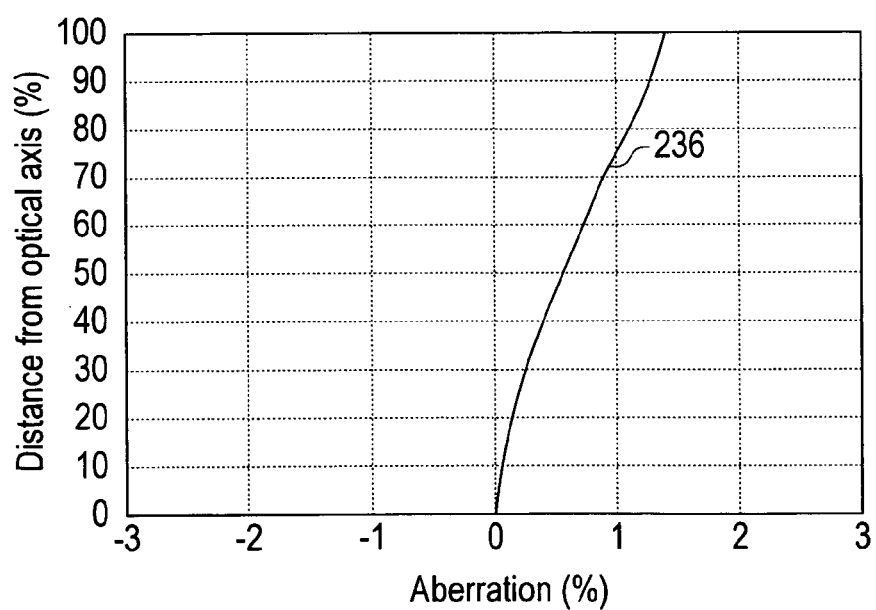
FIG. 49 is a view of distortion [B] in the imaging lens of the eleventh embodiment.
Figure 50:
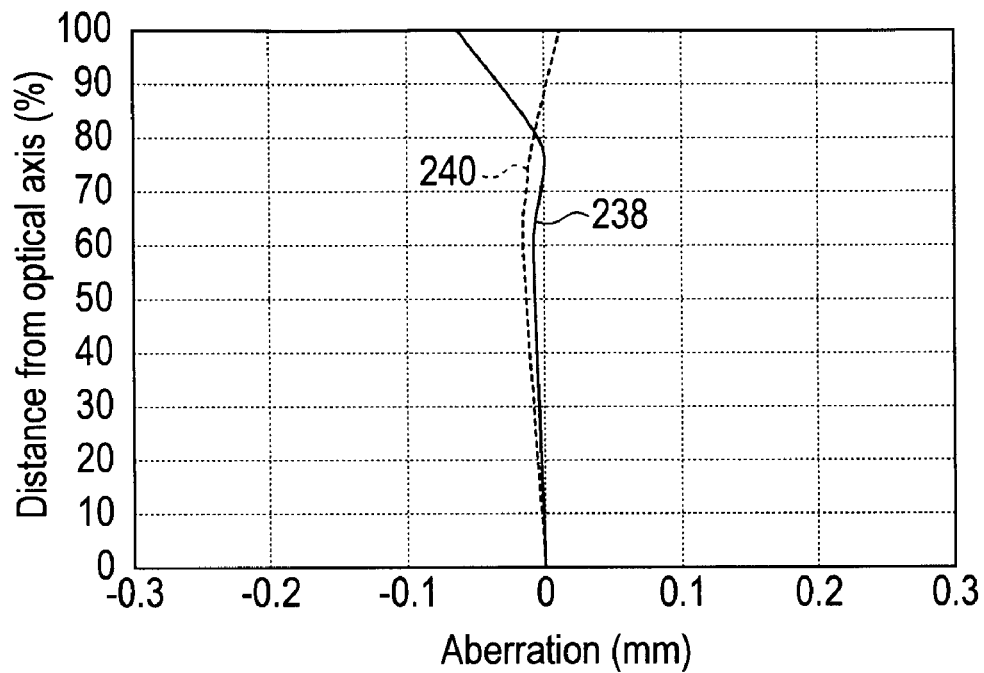
FIG. 50 is a view of astigmatism [B] in the imaging lens of the eleventh embodiment.
Figure 51:
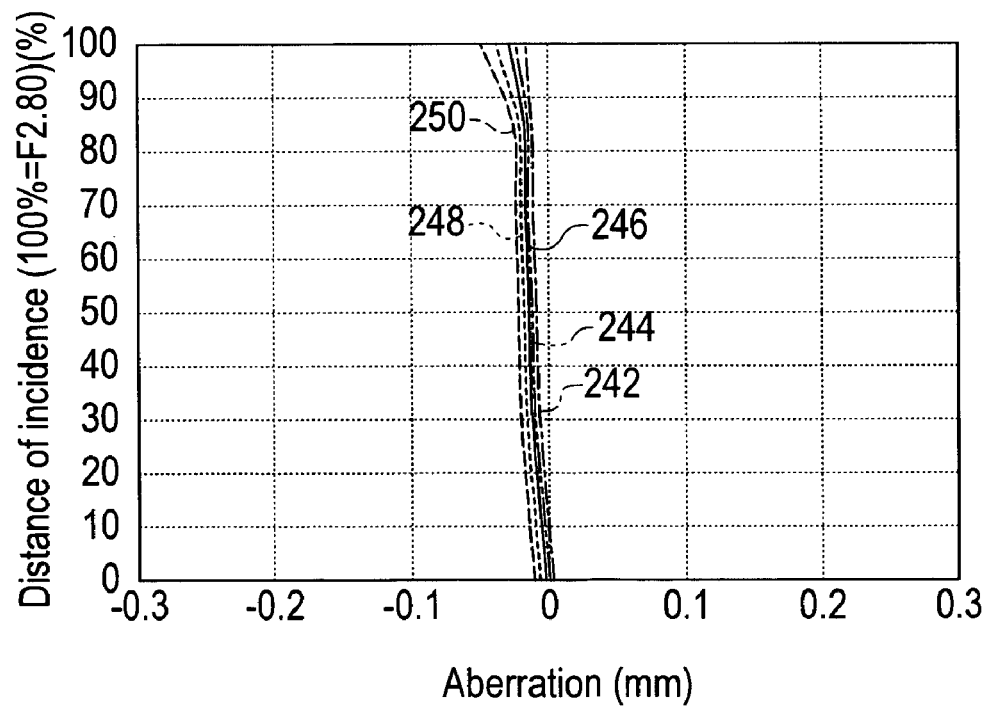
FIG. 51 is a view of chromatic and spherical aberration [B] in the imaging lens of the eleventh embodiment.

The distortion curve [B] 236 shown in FIG. 49, the astigmatism curve [B] (the aberration curve 238 relative to the meridional plane and the aberration curve 240 relative to the sagittal plane) shown in FIG. 50, and the chromatic and spherical aberration curve [B] (the aberration curve 242 relative to the C line, the aberration curve 244 relative to the d line, the aberration curve 246 relative to the e line, the aberration curve 248 relative to the F line, and the aberration curve 250 relative to the g line) shown in FIG. 51 are respectively illustrated by graphs.

The ordinate of the aberration curves [B] in FIGS. 49 and 50 illustrate the image height as a percentage of the distance from the optical axis. In FIGS. 49 and 50, 100% corresponds to 0.630 mm. The ordinate of the aberration curve [B] in FIG. 51 indicates the incidence height h (F number), corresponding at its maximum to 2.8. The abscissa in FIG. 51 shows the magnitude of the aberration.

As regards distortion [B], the absolute value of the amount of aberration reaches a maximum of 1.3965% in an image height position of 100% (image height 0.630 mm), and hence within an image height range of 0.630 mm and below, the absolute value of the aberration amount is held within 1.3965%.

As for astigmatism [B], the absolute value of the aberration amount on the meridional plane reaches a maximum of 0.0631 mm in an image height position of 100% (image height 0.630 mm), and hence within an image height range of 0.630 mm and below, the absolute value of the aberration amount is held within 0.0631 mm.

As for chromatic and spherical aberration [B], the absolute value of the aberration curve 250 relative to the g line reaches a maximum of 0.0491 mm at an incidence height h of 100%, and hence the absolute value of the aberration amount is held within 0.0491 mm.

TWELFTH EMBODIMENT (A) The object-side radius of curvature $r_2$ of the first lens L1 is $r_2$=0.585 mm.

(B) The image-side radius of curvature $r_3$ of the first lens L1 is $r_3$=−0.837 mm.

(C) The interval $D_3$ between the first lens L1 and second lens L2 on the optical axis is $D_3$=0.1149 mm, where $D_3$ is equal to $d_3+d_4$ in FIG. 43; here, $d_3$=0 mm.

(D) The thickness $D_4$ at the center of the second lens L2 is $D_4$=0.2532 mm, where $D_4$ is equal to $d_5$ in FIG. 43.

(E) The thickness $D_6$ at the center of the third lens L3 is $D_6$=0.3952 mm, where $D_6$ is equal to $d_7$ in FIG. 43.
(F) The optical length L is L=1.531 mm.
(G) The image height (effective diagonal length of the image surface) 2Y is 2Y=1.42 mm.
(H) The back focus $b_f$ is $b_f$=0.519 mm.
(I) The aperture ratio (F number) $F_{NO}$ is $F_{NO}$=2.8.
Hence, $$|r_2/r_3|=|0.585/-0.837|=0.6989, \quad (3\text{-}1)$$

$$D_3/f=0.1149/1.00=0.1149, \quad (3\text{-}2)$$

$$D_4/f=0.2532/1.00=0.2532, \quad (3\text{-}3)$$

$$D_6/f=0.3952/1.00=0.3952, \quad (3\text{-}4)$$

$$L/2Y=1.531/1.42=1.0782, \quad (3\text{-}5)$$

$$b_f/f=0.519/1.00=0.519, \text{ and} \quad (3\text{-}6)$$

$$F_{NO}=2.8. \quad (3\text{-}7)$$

Thus the lens system of the twelfth embodiment satisfies all of the following conditional expressions (3-1) through (3-7).

$$0.55<|r_2/r_3|<0.70 \quad (3\text{-}1)$$

$$0.08<D_3/f<0.12 \quad (3\text{-}2)$$

$$0.140 \leq d_4/f<0.270 \quad (3\text{-}3)$$

$$0.24<D_6/f<0.40 \quad (3\text{-}4)$$

$$0.9<L/2Y<1.1 \quad (3\text{-}5)$$

$$0.4<b_f/f<0.52 \quad (3\text{-}6)$$

$$2.70<F_{NO}<3.60 \quad (3\text{-}7)$$

Hereafter, the term "conditional expressions" will be used in the third invention to indicate these seven expressions (3-1) through (3-7).

As shown in Table 12, the diaphragm S1 is positioned at the intersection between the first surface (the object-side surface) of the first lens L1 and the optical axis, and the diaphragm S2 is positioned between the first lens L1 and second lens L2. In other words, the diaphragm surfaces are flat surfaces, and since $r_1=\infty$ and $r_4=\infty$ are shown in Table 12, this indicates that the diaphragm S1 is disposed in the position of the surface $r_1$ and the diaphragm S2 is disposed in the position of the surface $r_4$ (see FIG. 43). The numerical aperture (F number) is 2.8.

[When Aberrations are Calculated Using the Diaphragm S1 as an Aperture Diaphragm]

Figure 52:
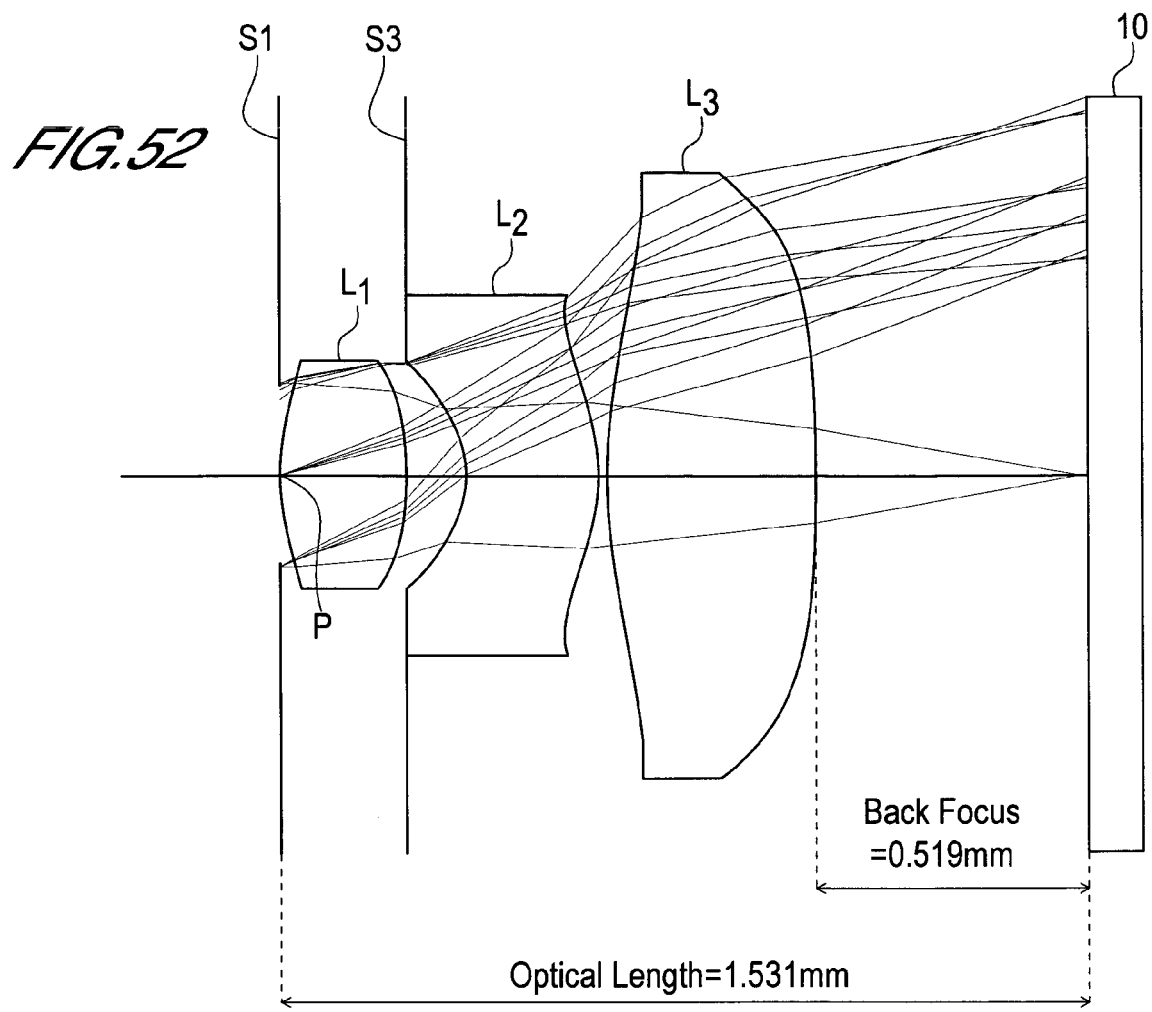
FIG. 52 is a sectional view [A] of an imaging lens of a twelfth embodiment.

A sectional view [A] of the imaging lens of the twelfth embodiment is shown in FIG. 52. The back focus in relation to a focal length of 1.00 mm is 0.519 mm, and hence a sufficient length is secured.

Similarly to the eleventh embodiment, results obtained when the various aberrations are calculated using the diaphragm S1 as an aperture diaphragm will be described. In FIG. 52, a position denoted by a point P is the optical axis on which the diaphragm S1 is placed (the center of the diaphragm S1), and therefore the position through which the principal rays entering the diaphragm S1 pass. As shown in FIG. 52, all of the principal rays entering the diaphragm S1 pass through the point P.

Likewise here, when it is necessary to differentiate between a case in which the various aberrations are calculated using the diaphragm S1 as an aperture diaphragm and a case to be described below in which the various aberrations are calculated using the diaphragm S2 as an aperture diaphragm, the symbol [A] is affixed to the various aberrations, aberration curves, and aberration diagrams of the former case.

Figure 53:
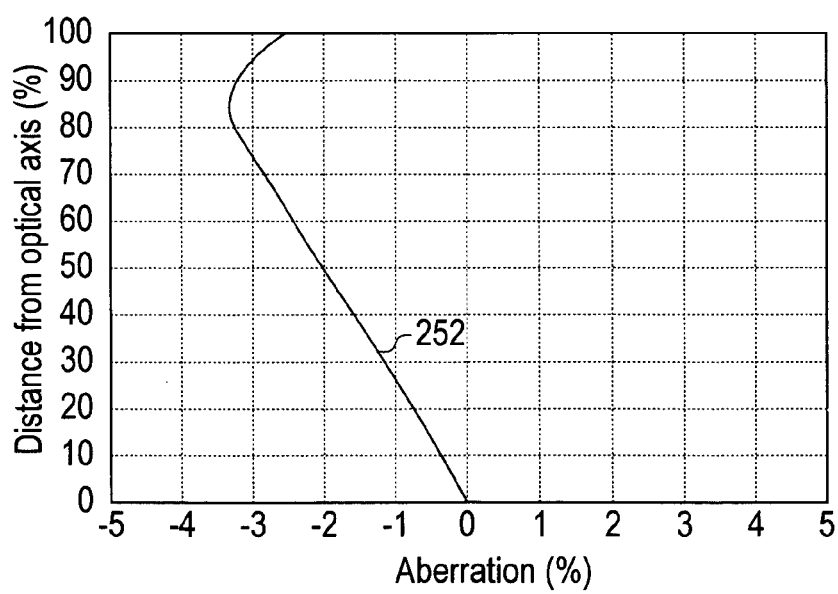
FIG. 53 is a view of distortion [A] in the imaging lens of the twelfth embodiment.
Figure 54:
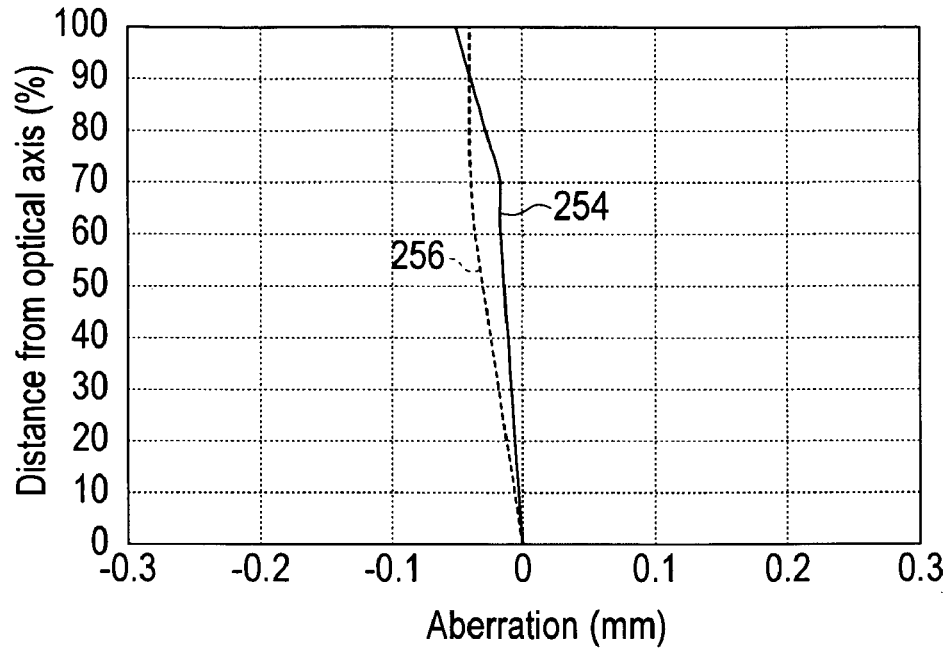
FIG. 54 is a view of astigmatism [A] in the imaging lens of the twelfth embodiment.
Figure 55:
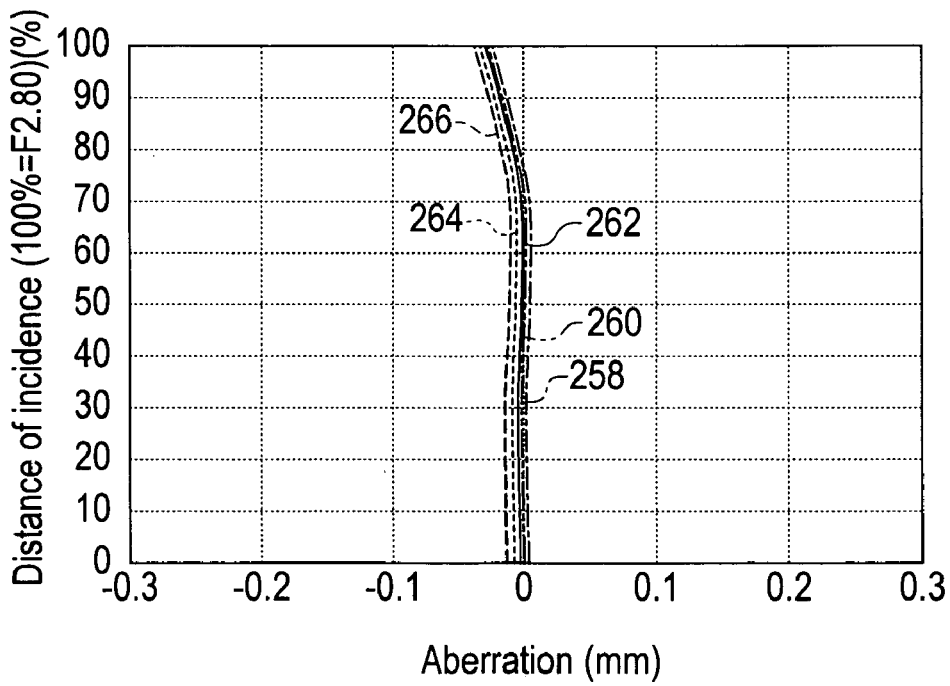
FIG. 55 is a view of chromatic and spherical aberration [A] in the imaging lens of the twelfth embodiment.

The distortion curve [A] 252 shown in FIG. 53, the astigmatism curve [A] (the aberration curve 254 relative to the meridional plane and the aberration curve 256 relative to the sagittal plane) shown in FIG. 54, and the chromatic and spherical aberration curve [A] (the aberration curve 258 relative to the C line, the aberration curve 260 relative to the d line, the aberration curve 262 relative to the e line, the aberration curve 264 relative to the F line, and the aberration curve 266 relative to the g line) shown in FIG. 55 are respectively illustrated by graphs.

The ordinate of the aberration curves [A] in FIGS. 53 and 54 illustrate the image height as a percentage of the distance from the optical axis. In FIGS. 52 and 53, 100% corresponds to 0.710 mm. The ordinate of the aberration curve [A] in FIG. 55 indicates the incidence height h (F number), corresponding at its maximum to 2.8. The abscissa in FIG. 55 shows the magnitude of the aberration.

As regards distortion [A], the absolute value of the amount of aberration reaches a maximum of 3.2531% in an image height position of 80% (image height 0.568 mm), and hence within an image height range of 0.630 mm and below, the absolute value of the aberration amount is held within 3.2531%.

As for astigmatism [A], the absolute value of the aberration amount on the meridional plane reaches a maximum of 0.0515 mm in an image height position of 100% (image height 0.710 mm), and hence within an image height range of 0.710 mm and below, the absolute value of the aberration amount is held within 0.0515 mm.

As for chromatic and spherical aberration [A], the absolute value of the aberration curve 266 relative to the g line reaches a maximum of 0.0380 mm at an incidence height h of 100%, and hence the absolute value of the aberration amount is held within 0.0380 mm.

[When Aberrations are Calculated Using the Diaphragm S2 as an Aperture Diaphragm]

Figure 56:
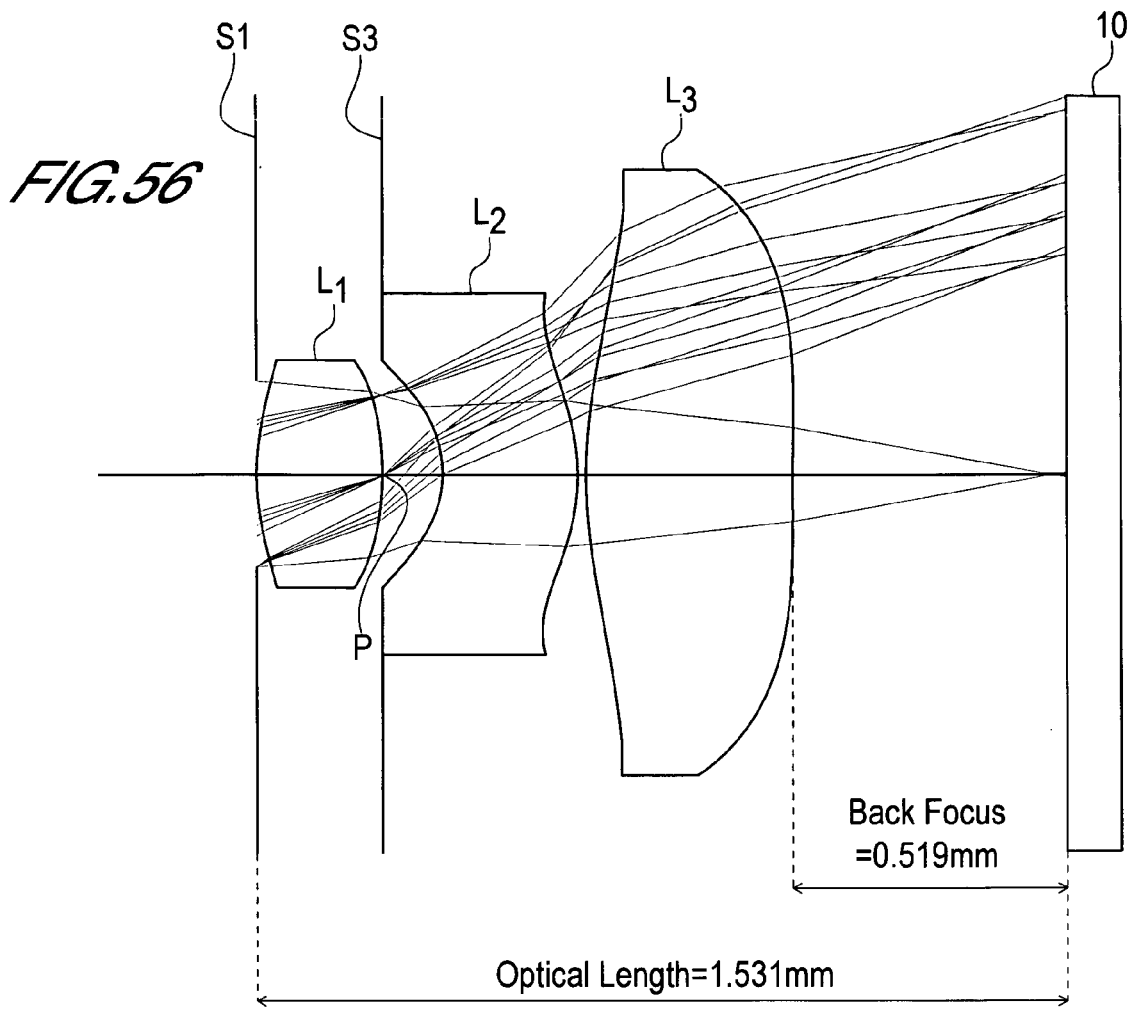
FIG. 56 is a sectional view [B] of an imaging lens of the twelfth embodiment.

A sectional view [B] of the imaging lens of the twelfth embodiment is shown in FIG. 56. This diagram is similar to FIG. 52, but the shape of the light rays is different. The back focus in relation to a focal length of 1.00 mm is 0.519 mm, and hence a sufficient length is secured.

Similarly to the eleventh embodiment, results obtained when the various aberrations are calculated using the diaphragm S2 as an aperture diaphragm will be described. In FIG. 56, a position denoted by a point P is the optical axis on which the diaphragm S2 is placed (the center of the diaphragm S2), and therefore the position through which the principal rays entering the diaphragm S2 pass. As shown in FIG. 56, all of the principal rays entering the diaphragm S2 pass through the point P.

Likewise here, when it is necessary to differentiate between the case described above, in which the various aberrations are calculated using the diaphragm S1 as an aperture diaphragm, and a case in which the various aberrations are calculated using the diaphragm S2 as an aperture diaphragm, the symbol [B] is affixed to the various aberrations, aberration curves, and aberration diagrams of the latter case.

Figure 57:
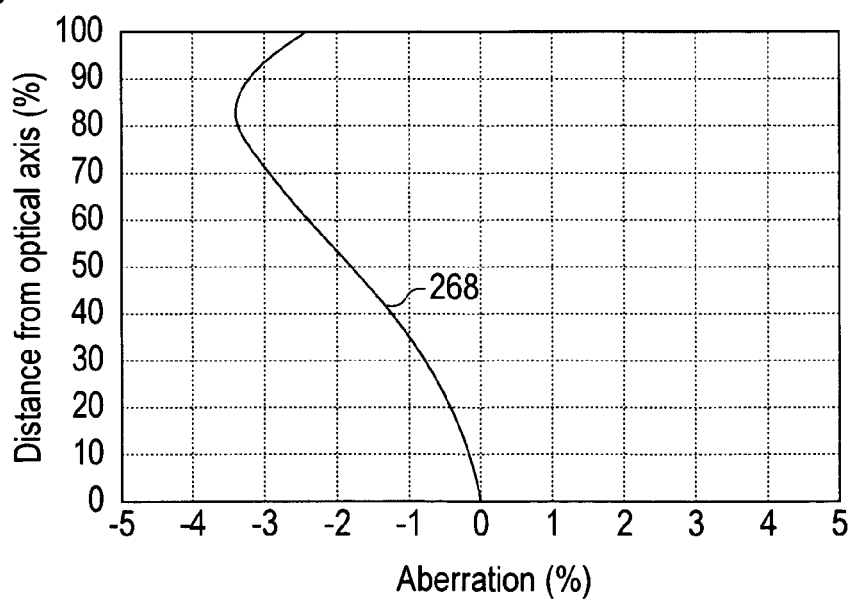
FIG. 57 is a view of distortion [B] in the imaging lens of the twelfth embodiment.
Figure 58:
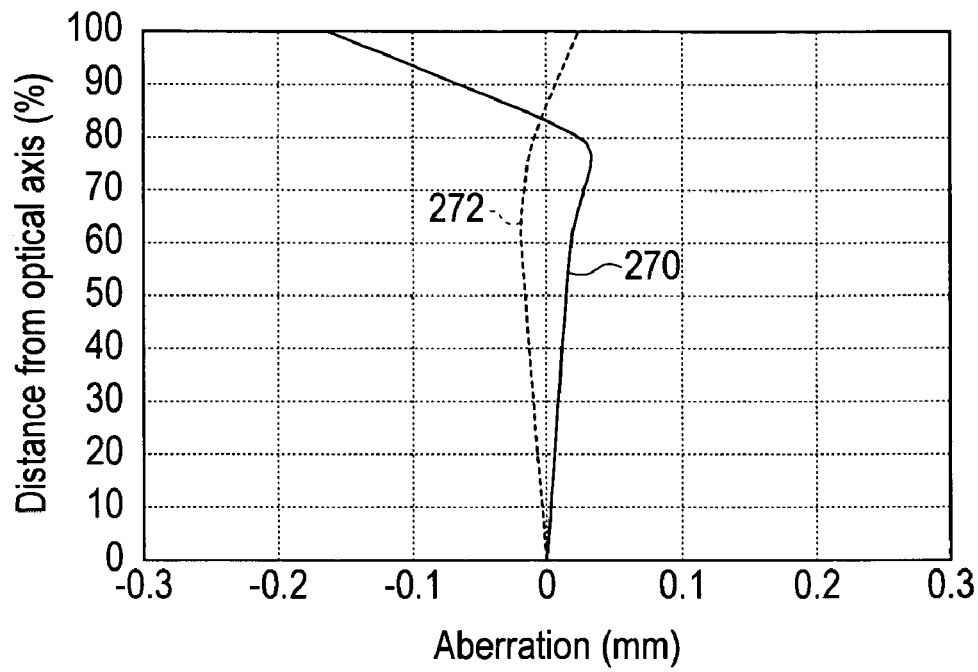
FIG. 58 is a view of astigmatism [B] in the imaging lens of the twelfth embodiment.
Figure 59:
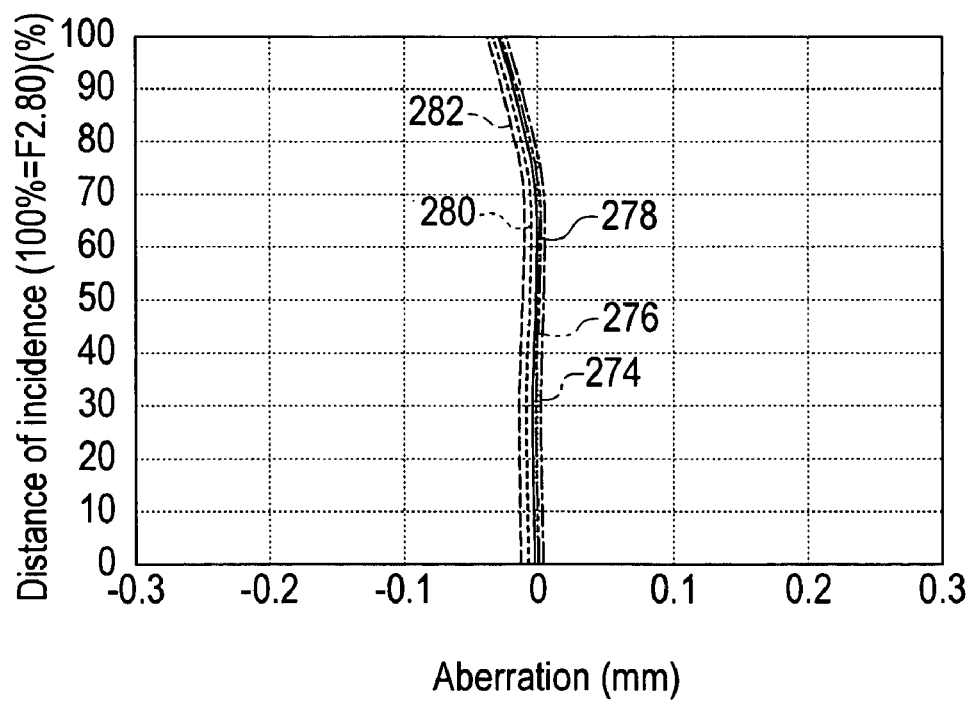
FIG. 59 is a view of chromatic and spherical aberration [B] in the imaging lens of the twelfth embodiment.

The distortion curve [B] 268 shown in FIG. 57, the astigmatism curve [B] (the aberration curve 270 relative to the meridional plane and the aberration curve 272 relative to the sagittal plane) shown in FIG. 58, and the chromatic and spherical aberration curve [B] (the aberration curve 274 relative to the C line, the aberration curve 276 relative to the d line, the aberration curve 278 relative to the e line, the aberration curve 280 relative to the F line, and the aberration curve 282 relative to the g line) shown in FIG. 59 are respectively illustrated by graphs.

The ordinate of the aberration curves [B] in FIGS. 57 and 58 illustrate the image height as a percentage of the distance from the optical axis. In FIGS. 57 and 58, 100% corresponds to 0.710 mm. The ordinate of the aberration curve [B] in FIG. 59 indicates the incidence height h (F number), corresponding at its maximum to 2.8. The abscissa in FIG. 59 shows the magnitude of the aberration.

As regards distortion [B], the absolute value of the amount of aberration reaches a maximum of 3.3733% in an image height position of 80% (image height 0.568 mm), and hence within an image height range of 0.710 mm and below, the absolute value of the aberration amount is held within 3.3733%.

As for astigmatism [B], the absolute value of the aberration amount on the meridional plane reaches a maximum of 0.1629 mm in an image height position of 100% (image height 0.710 mm), and hence within an image height range of 0.710 mm and below, the absolute value of the aberration amount is held within 0.1629 mm.

As for chromatic and spherical aberration [B], the absolute value of the aberration curve 282 relative to the g line reaches a maximum of 0.0379 mm at an incidence height h of 100%, and hence the absolute value of the aberration amount is held within 0.0379 mm.

In the imaging lens of the third invention as described above, when the shape and constitutional material of the first lens L1 through third lens L3 are identical, the intervals between the lenses are identical, and both the diaphragm S1 and the diaphragm S2 are provided, the values obtained when the various aberrations are calculated using the diaphragm S1 as an aperture diaphragm and the values obtained when the various aberrations are calculated using the diaphragm S2 as an aperture diaphragm confirm that favorable images are obtained in both cases. In other words, it is possible to realize an imaging lens simultaneously comprising an aperture diaphragm which fixes the entrance pupil and a diaphragm for preventing flare or smear.

As is evident from the above description of the imaging lenses according to the first through third inventions, by designing each of the lenses constituting the imaging lenses so as to satisfy the conditional expressions (1-1) through (1-7), the conditional expressions (2-1) through (2-7), and the conditional expressions (3-1) through (3-7), the problems to be solved by this invention are solved. In other words, various types of aberration are favorably corrected, a sufficient back focus is obtained, and the optical length is kept short.

Note that in the embodiments described above, ZEONEX E48R is used as the plastic material of the first lens L1 and third lens L3, while polycarbonate is used as the plastic material of the second lens L2, but it goes without saying that plastic materials other than those cited in the embodiments, and also non-plastic materials such as molded glass or the like, for example, may be employed as long as the various conditions described in the embodiments and so on are satisfied.

INDUSTRIAL APPLICABILITY

As described above, according to the imaging lenses of the first through third inventions, various types of aberration are favorably corrected, and despite a short optical length, favorable images can be obtained and a sufficient back focus can be secured.

As described above, the imaging lens of this invention may be used as a camera lens for installation in a portable telephone, a personal computer, or a digital camera, and may also be favorably applied as a camera lens for installation in a PDA (personal digital assistant), a camera lens for installation in a toy comprising an image recognition function, and a camera lens for installation in a monitoring, surveying, or crime-prevention apparatus or the like.

The invention claimed is:

1. An imaging lens comprising an aperture diaphragm S1, a first lens L1, a second lens L2, and a third lens L3, and constituted such that said aperture diaphragm S1, said first lens L1, said second lens L2, and said third lens L3 are arranged in succession from an object side toward an image side,
wherein said first lens L1 is a lens having a positive refractive power and convex surfaces facing said object side and said image side,
said second lens L2 is a lens having a negative refractive power, a meniscus shape, and a convex surface facing said image side, and
said third lens L3 is a lens having a positive refractive power and convex surfaces facing said object side and said image side,
both surfaces of said first lens L1 are aspherical, both surfaces of said second lens L2 are aspherical, and both surfaces of said third lens L3 are aspherical, and
said imaging lens satisfies the following conditions:

$$0.55 < |r_2/r_3| < 0.70 \tag{1-1}$$

$$0.08 < d_3/f < 0.12 \tag{1-2}$$

$$0.140 \leq d_4/f < 0.270 \tag{1-3}$$

$$0.24 < d_6/f < 0.40 \tag{1-4}$$

$$0.90 < L/2Y < 1.10 \tag{1-5}$$

$$0.40 < b_f/f < 0.52 \tag{1-6}$$

$$2.70 < F_{NO} < 3.60 \tag{1-7}$$

where
f is a combined focal length of said imaging lens,
$r_2$ is a radius of curvature (optical axial radius of curvature) of said object-side surface of said first lens L1 in the vicinity of the optical axis,
$r_3$ is a radius of curvature (optical axial radius of curvature) of said image-side surface of said first lens L1 in the vicinity of the optical axis,
$d_3$ is an interval on the optical axis between said first lens L1 and said second lens L2,
$d_4$ is a thickness at the center of said second lens L2,
$d_6$ is a thickness at the center of said third lens L3,
L is a distance on the optical axis from said object-side surface of said first lens L1 to an imaging surface (optical length),
2Y is an image height (effective diagonal length of the image surface), $b_f$ is a distance on the optical axis from said image-side surface of said third lens L3 to said imaging surface, and $F_{NO}$ is an aperture ratio (F number).

2. An imaging lens comprising a first lens L1, an aperture diaphragm S2, a second lens L2, and a third lens L3, and constituted such that said first lens L1, said aperture diaphragm S2, said second lens L2, and said third lens L3 are arranged in succession from an object side toward an image side, wherein said first lens L1 is a lens having a positive refractive power and convex surfaces facing said object side and said image side, said second lens L2 is a lens having a negative refractive power, a meniscus shape, and a convex surface facing said image side, and said third lens L3 is a lens having a positive refractive power and convex surfaces facing said object side and said image side, both surfaces of said first lens L1 are aspherical, both surfaces of said second lens L2 are aspherical, and both surfaces of said third lens L3 are aspherical, and said imaging lens satisfies the following conditions:

$$0.55 < |r_1/r_2| < 0.70 \quad (2\text{-}1)$$

$$0.08 < D_3/f < 0.12 \quad (2\text{-}2)$$

$$0.140 \leq d_4/f < 0.270 \quad (2\text{-}3)$$

$$0.24 < d_6/f < 0.40 \quad (2\text{-}4)$$

$$0.90 < L/2Y < 1.10 \quad (2\text{-}5)$$

$$0.40 < b_f/f < 0.52 \quad (2\text{-}6)$$

$$2.70 < FNO < 3.60 \quad (2\text{-}7)$$

where f is a combined focal length of said imaging lens, $r_1$ is a radius of curvature (optical axial radius of curvature) of said object-side surface of said first lens L1 in the vicinity of the optical axis, $r_2$ is a radius of curvature (optical axial radius of curvature) of said image-side surface of said first lens L1 in the vicinity of the optical axis, $D_3$ is an interval on the optical axis between said first lens L1 and said second lens L2, $d_4$ is a thickness at the center of said second lens L2, $d_6$ is a thickness at the center of said third lens L3, L is a distance on the optical axis from said object-side surface of said first lens L1 to an imaging surface (optical length), 2Y is an image height (effective diagonal length of the image surface), $b_f$ is a distance on the optical axis from said image-side surface of said third lens L3 to said imaging surface, and $F_{NO}$ is an aperture ratio (F number).

3. An imaging lens comprising an aperture diaphragm S1, a first lens L1, an aperture diaphragm S2, a second lens L2, and a third lens L3, and constituted such that said aperture diaphragm S1, said first lens L1, said aperture diaphragm S2, said second lens L2, and said third lens L3 are arranged in succession from an object side toward an image side, wherein said first lens L1 is a lens having a positive refractive power and convex surfaces facing said object side and said image side, said second lens L2 is a lens having a negative refractive power, a meniscus shape, and a convex surface facing said image side, and said third lens L3 is a lens having a positive refractive power and convex surfaces facing said object side and said image side, both surfaces of said first lens L1 are aspherical, both surfaces of said second lens L2 are aspherical, and both surfaces of said third lens L3 are aspherical, and said imaging lens satisfies the following conditions:

$$0.55 < |r_2/r_3| < 0.70 \quad (3\text{-}1)$$

$$0.08 < D_3/f < 0.12 \quad (3\text{-}2)$$

$$0.140 \leq d_4/f < 0.270 \quad (3\text{-}3)$$

$$0.24 < D_6/f < 0.40 \quad (3\text{-}4)$$

$$0.90 < L/2Y < 1.10 \quad (3\text{-}5)$$

$$0.40 < b_f/f < 0.52 \quad (3\text{-}6)$$

$$2.70 < F_{NO} < 3.60 \quad (3\text{-}7)$$

where f is a combined focal length of said imaging lens, $r_2$ is a radius of curvature (optical axial radius of curvature) of said object-side surface of said first lens L1 in the vicinity of the optical axis, $r_3$ is a radius of curvature (optical axial radius of curvature) of said image-side surface of said first lens L1 in the vicinity of the optical axis, $D_3$ is an interval on the optical axis between said first lens L1 and said second lens L2, $D_4$ is a thickness at the center of said second lens L2, $D_6$ is a thickness at the center of said third lens L3, L is a distance on the optical axis from said object-side surface of said first lens L1 to an imaging surface (optical length), 2Y is an image height (effective diagonal length of the image surface), $b_f$ is a distance on the optical axis from said image-side surface of said third lens L3 to said imaging surface, and $F_{NO}$ is an aperture ratio (F number).

4. The imaging lens according claim 1, wherein a refractive index of a material constituting said second lens L2 is higher than a refractive index of a material constituting said first lens L1 and said third lens L3, and an Abbe number of said material constituting said second lens L2 is lower than an Abbe number of said material constituting said first lens L1 and said third lens L3.

5. The imaging lens according claim 2, wherein a refractive index of a material constituting said second lens L2 is higher than a refractive index of a material constituting said first lens L1 and said third lens L3, and an Abbe number of said material constituting said second lens L2 is lower than an Abbe number of said material constituting said first lens L1 and said third lens L3.

6. The imaging lens according claim 3, wherein a refractive index of a material constituting said second lens L2 is higher than a refractive index of a material constituting said first lens L1 and said third lens L3, and an Abbe number of said material constituting said second lens L2 is lower than an Abbe number of said material constituting said first lens L1 and said third lens L3.

7. The imaging lens according claim 1, wherein said first lens L1, said second lens L2, and said third lens L3 constituting said imaging lens are formed from a material having an Abbe number within a range of thirty to sixty.

8. The imaging lens according claim 2, wherein said first lens L1, said second lens L2, and said third lens L3 constituting said imaging lens are formed from a material having an Abbe number within a range of thirty to sixty.

9. The imaging lens according claim 3, wherein said first lens L1, said second lens L2, and said third lens L3 constituting said imaging lens are formed from a material having an Abbe number within a range of thirty to sixty.

10. The imaging lens according to claim 1, wherein said first lens L1 and said third lens L3 of said imaging lens are formed using cycloolefin plastic as a material, and said second lens L2 is formed using polycarbonate as a material.

11. The imaging lens according to claim 2, wherein said first lens L1 and said third lens L3 of said imaging lens are formed using cycloolefin plastic as a material, and said second lens L2 is formed using polycarbonate as a material.

12. The imaging lens according to claim 3, wherein said first lens L1 and said third lens L3 of said imaging lens are formed using cycloolefin plastic as a material, and said second lens L2 is formed using polycarbonate as a material.

* * * * *